United States Patent
Breed

(10) Patent No.: US 8,068,942 B2
(45) Date of Patent: Nov. 29, 2011

(54) VEHICULAR HEADS-UP DISPLAY SYSTEM

(75) Inventor: David S. Breed, Miami Beach, FL (US)

(73) Assignee: Automotive Technologies International, Inc., Denville, NJ (US)

( * ) Notice: Subject to any disclaimer, the term of this patent is extended or adjusted under 35 U.S.C. 154(b) by 1031 days.

(21) Appl. No.: 11/928,090

(22) Filed: Oct. 30, 2007

(65) Prior Publication Data

US 2008/0051946 A1    Feb. 28, 2008

Related U.S. Application Data

(63) Continuation-in-part of application No. 11/082,739, filed on Mar. 17, 2005, now Pat. No. 7,421,321, which is a continuation-in-part of application No. 10/701,361, filed on Nov. 4, 2003, now Pat. No. 6,988,026, which is a continuation-in-part of application No. 09/645,709, filed on Aug. 24, 2000, now Pat. No. 7,126,583, application No. 11/928,090, which is a continuation-in-part of application No. 11/428,436, filed on Jul. 3, 2006, now Pat. No. 7,860,626, which is a continuation-in-part of application No. 09/645,709, and a continuation-in-part of application No. 11/220,139, filed on Sep. 6, 2005, now Pat. No. 7,103,460, which is a continuation-in-part of application No. 11/120,065, filed on May 2, 2005, now abandoned, application No. 11/928,090, which is a continuation-in-part of application No. 11/459,700, filed on Jul. 25, 2006, now abandoned, which is a continuation-in-part of application No. 09/645,709, and a continuation-in-part of application No. 11/220,139, which is a continuation-in-part of application No. 11/120,065, application No. 11/928,090, which is a continuation-in-part of application No. 11/552,004, filed on Oct. 23, 2006, now Pat. No. 7,920,102, which is a continuation-in-part of application No. 09/645,709.

(60) Provisional application No. 60/170,973, filed on Dec. 15, 1999.

(51) Int. Cl.
G05D 1/00 (2006.01)

(52) U.S. Cl. .................. 701/1; 701/29; 701/37; 701/45; 701/49; 701/200; 340/425.5; 340/461; 340/525; 340/815.4; 340/438; 359/838; 359/871; 359/872; 248/549; 362/503; 345/7

(58) Field of Classification Search ................ 701/1, 29, 701/37, 45, 49, 200, 211; 340/425.5, 461, 340/525, 815.4, 438, 457.1, 815.45, 988, 340/494; 248/549; 280/735, 804; 359/838, 359/871, 872; 362/503; 345/7
See application file for complete search history.

(56) References Cited

U.S. PATENT DOCUMENTS 4,421,960 A    12/1983    Arima et al.
(Continued)

FOREIGN PATENT DOCUMENTS

EP    0302193    8/1989
(Continued)

OTHER PUBLICATIONS

Abstract of EP 0302193.
(Continued)

*Primary Examiner* — James Trammell
*Assistant Examiner* — McDieunel Marc
(74) *Attorney, Agent, or Firm* — Brian Roffe

(57) ABSTRACT

Heads-up display systems for vehicles which generate a virtual display in a field of view of an occupant of the vehicle when facing outward of the vehicle. A control system is coupled to the heads-up display system and detects an action by the occupant and controls the content of the virtual display being generated by the heads-up display system based on the detected action.

22 Claims, 42 Drawing Sheets

U.S. PATENT DOCUMENTS

| | | | |
|---|---|---|---|
| 4,555,127 A * | 11/1985 | Kawai | 280/806 |
| 4,818,048 A | 4/1989 | Moss | |
| 4,962,998 A | 10/1990 | Iino | |
| 5,212,471 A | 5/1993 | McDonald | |
| 5,519,410 A | 5/1996 | Smalanskas et al. | |
| 5,576,687 A | 11/1996 | Blank et al. | |
| 5,691,695 A | 11/1997 | Lahiff | |
| 5,784,036 A | 7/1998 | Higuchi et al. | |
| 5,808,374 A | 9/1998 | Miller et al. | |
| 5,877,707 A * | 3/1999 | Kowalick | 340/988 |
| 6,009,355 A | 12/1999 | Obradovich et al. | |
| 6,025,726 A | 2/2000 | Gershenfeld et al. | |
| 6,032,089 A | 2/2000 | Buckley | |
| 6,051,981 A | 4/2000 | Gershenfeld et al. | |
| 6,087,953 A * | 7/2000 | DeLine et al. | 340/815.4 |
| 6,100,811 A | 8/2000 | Hsu et al. | |
| 6,128,571 A * | 10/2000 | Ito et al. | 701/201 |
| 6,373,472 B1 * | 4/2002 | Palalau et al. | 345/173 |
| 6,505,165 B1 * | 1/2003 | Berstis et al. | 705/6 |
| 6,553,130 B1 * | 4/2003 | Lemelson et al. | 382/104 |
| 6,739,620 B2 | 5/2004 | Derrick | |
| 6,819,990 B2 | 11/2004 | Ichinose | |
| 7,084,859 B1 | 8/2006 | Pryor | |
| 7,126,583 B1 | 10/2006 | Breed | |
| 7,414,520 B2 | 8/2008 | Mei.beta.ner | |
| 2002/0041260 A1 | 4/2002 | Grassmann | |
| 2004/0108692 A1 | 6/2004 | Heil et al. | |
| 2004/0209594 A1 | 10/2004 | Naboulsi | |
| 2006/0284839 A1 | 12/2006 | Breed et al. | |
| 2007/0057781 A1 * | 3/2007 | Breed | 340/457.1 |
| 2008/0048930 A1 | 2/2008 | Breed | |
| 2008/0158096 A1 * | 7/2008 | Breed | 345/7 |

FOREIGN PATENT DOCUMENTS

| | | |
|---|---|---|
| GB | 2365831 A | 2/2002 |
| GB | 2363769 A | 6/2003 |
| WO | 0145080 A1 | 6/2001 |

OTHER PUBLICATIONS

International Search Report for WO 01/045080.
Examination Report for GB 0117003.4 dated Sep. 9, 2002.
Examination Report for GB 0117003.4 dated Mar. 19, 2003.
Summary of Reasons for Rejection for Taiwanese Patent Application No. 2000-0126967.

* cited by examiner

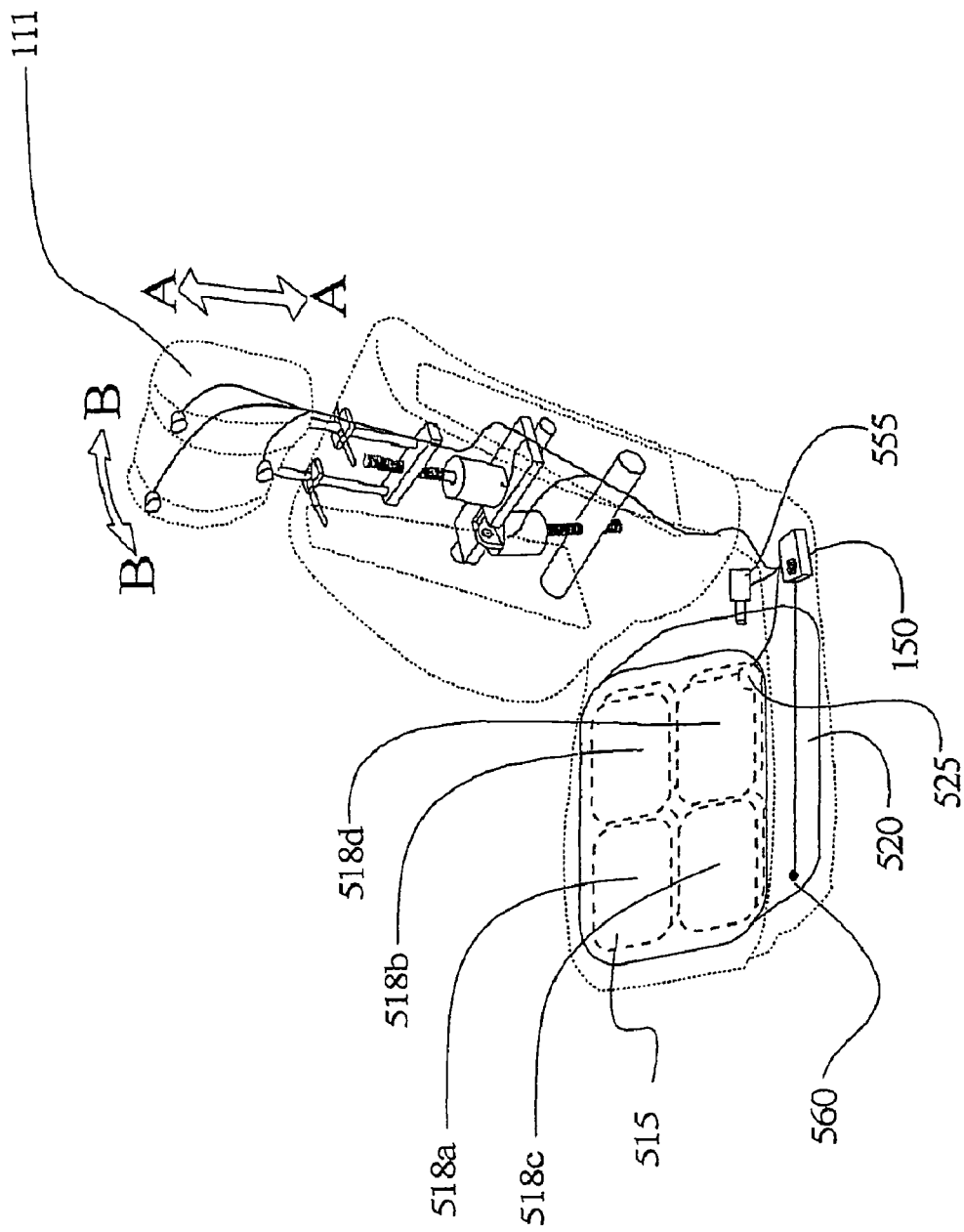

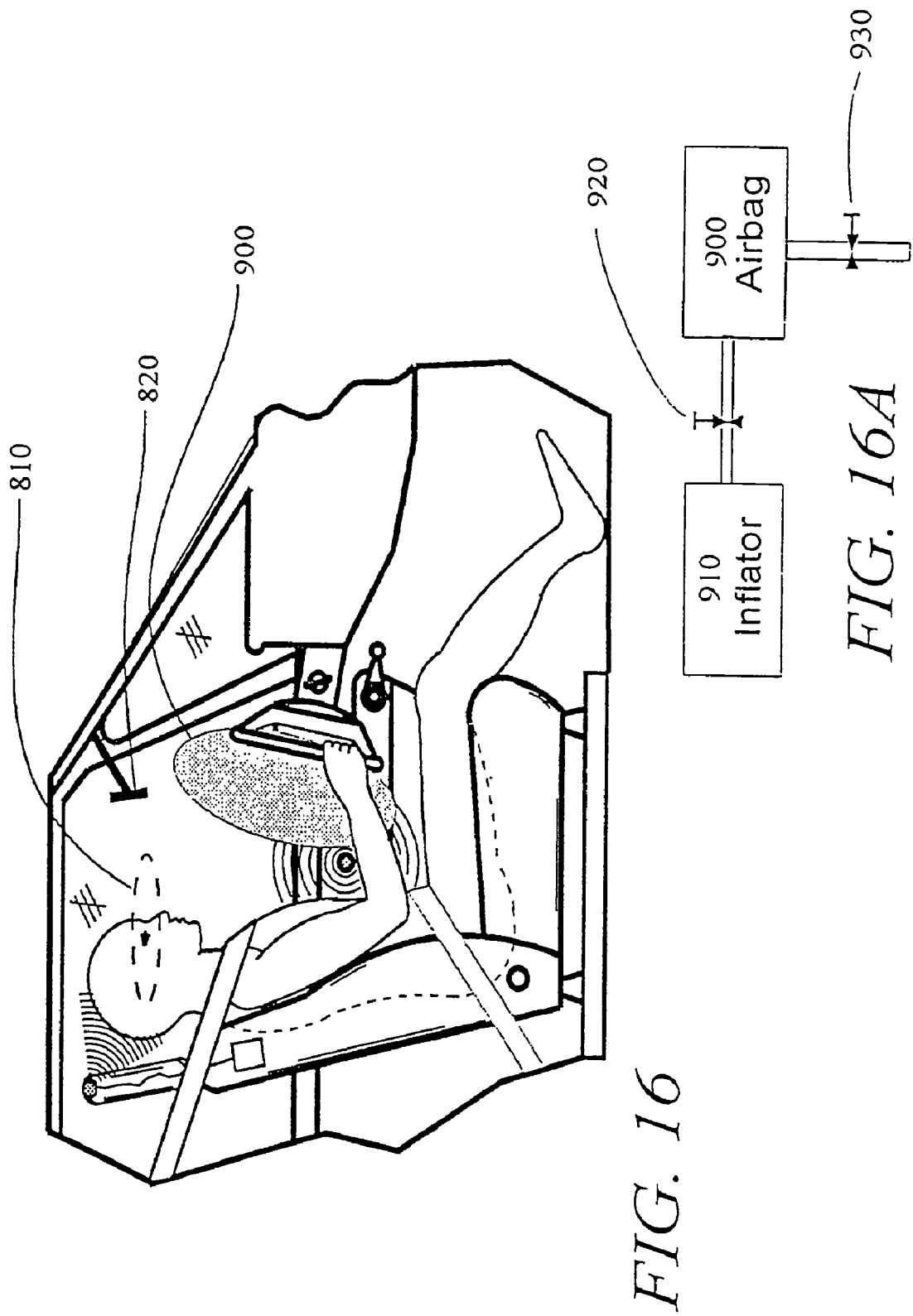

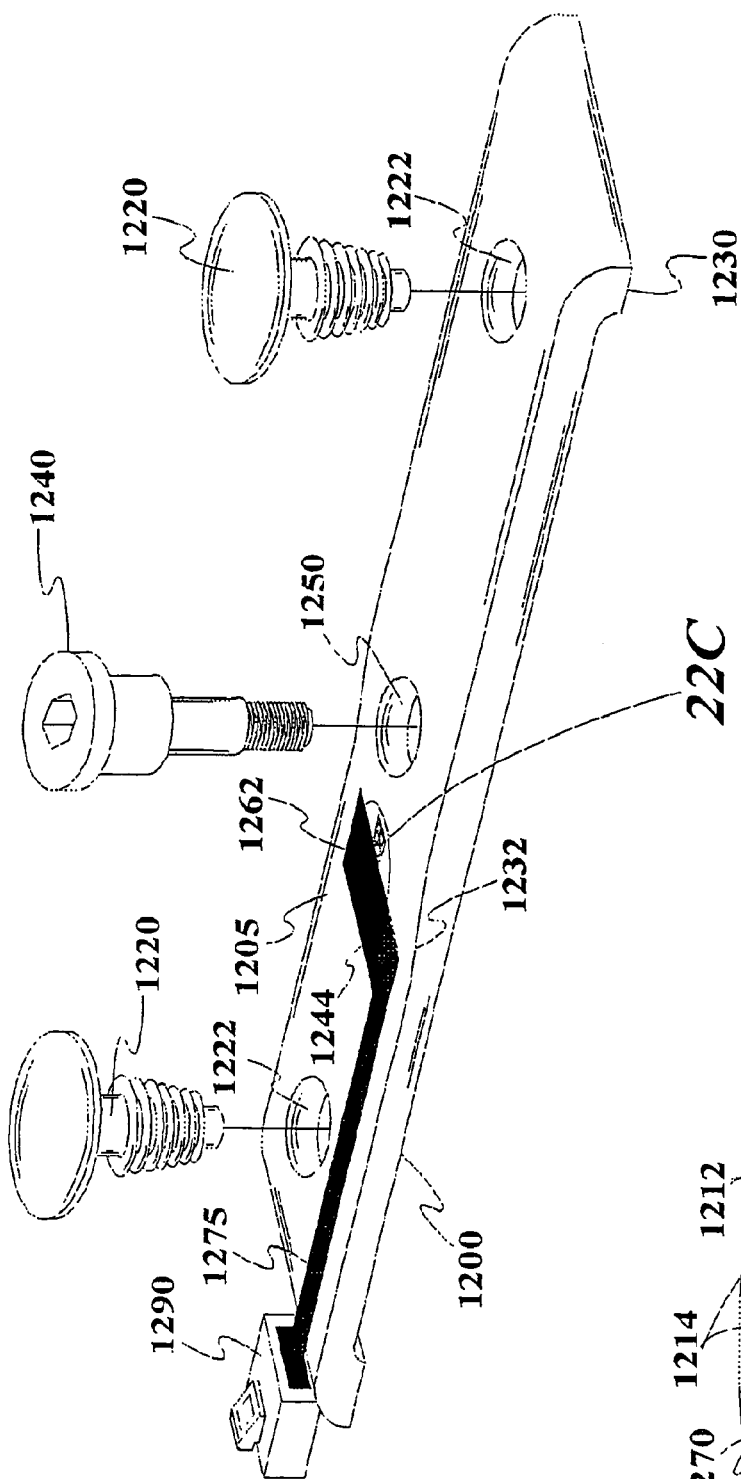
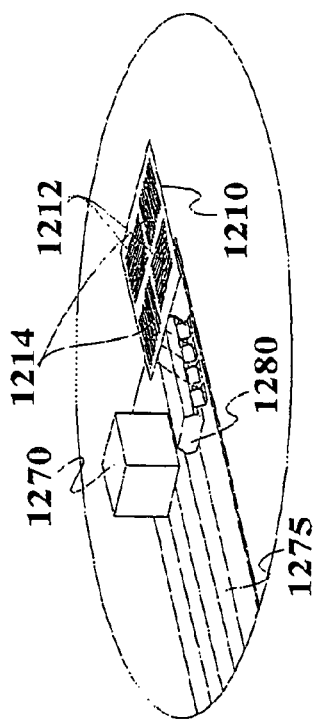
FIG. 22B
FIG. 22C

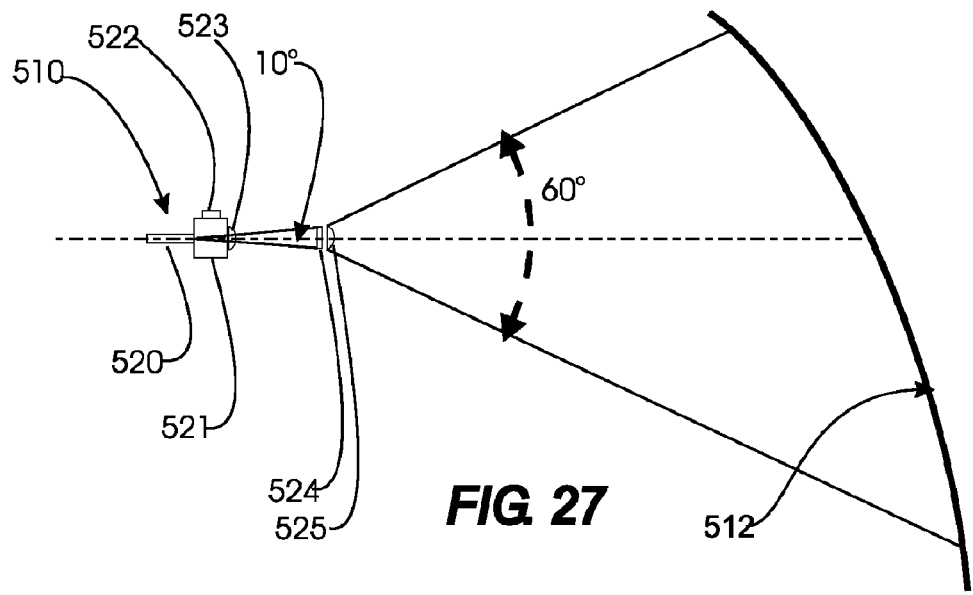
FIG. 27
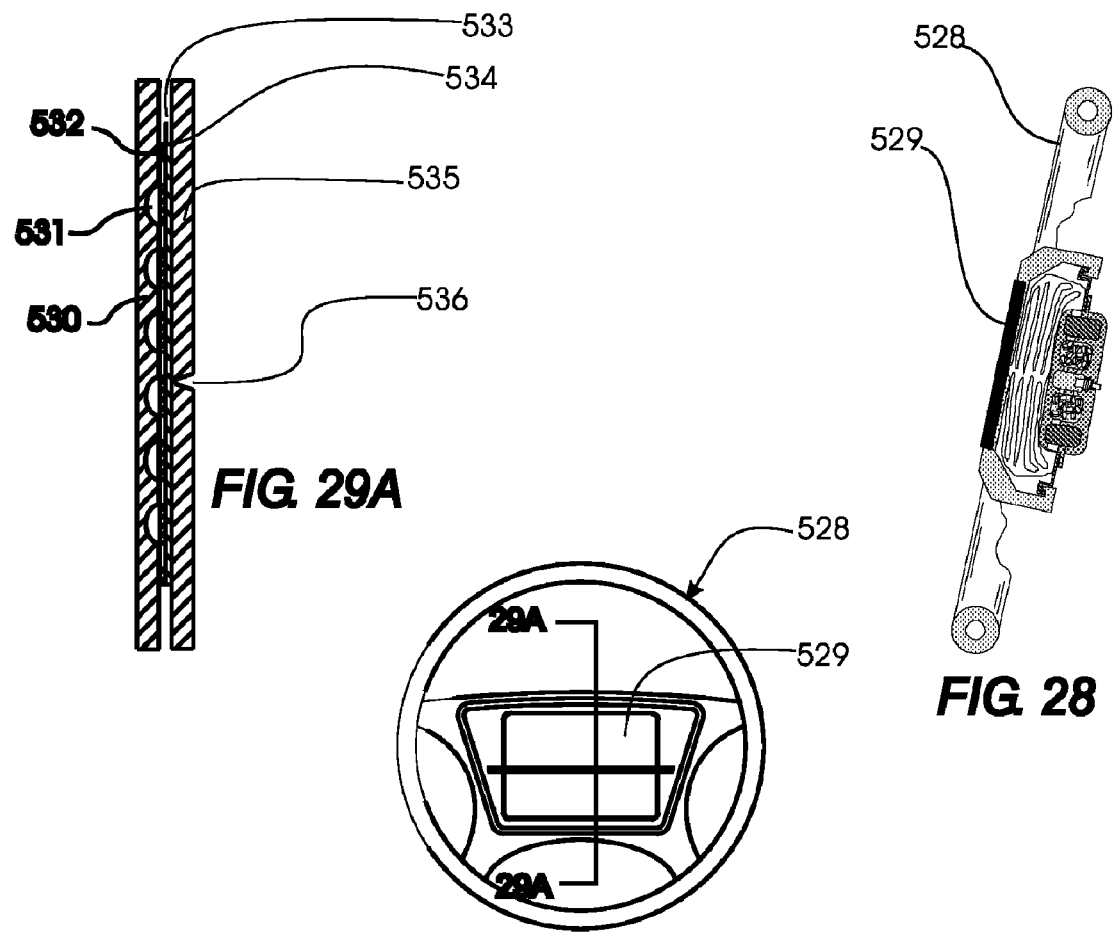
FIG. 29A
FIG. 28
FIG. 29

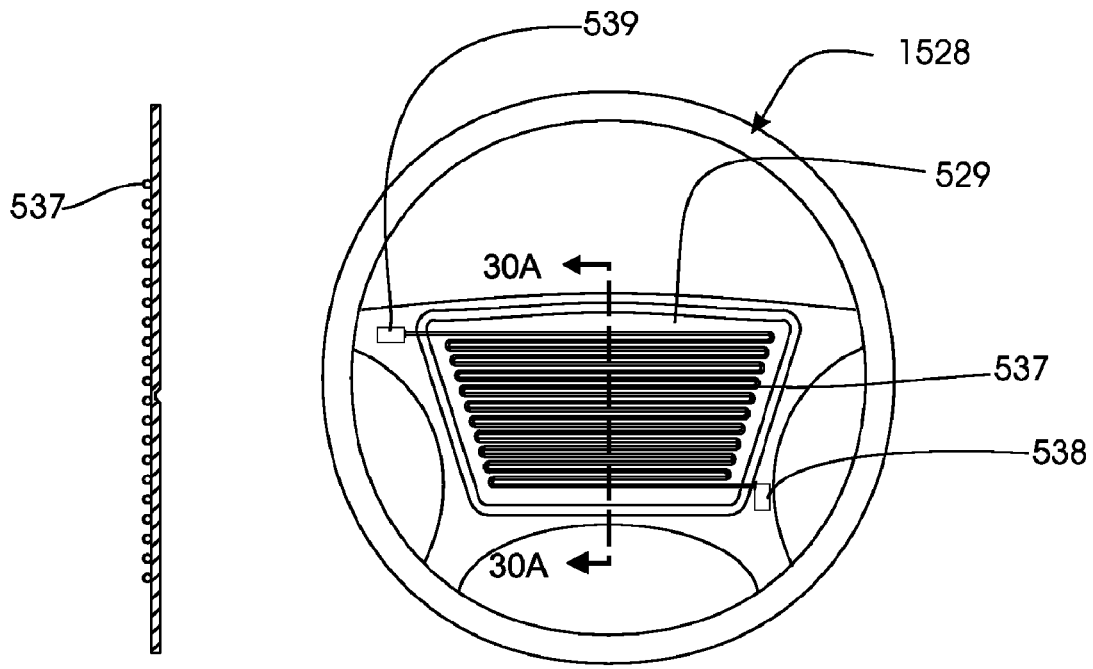
FIG. 30A   FIG. 30
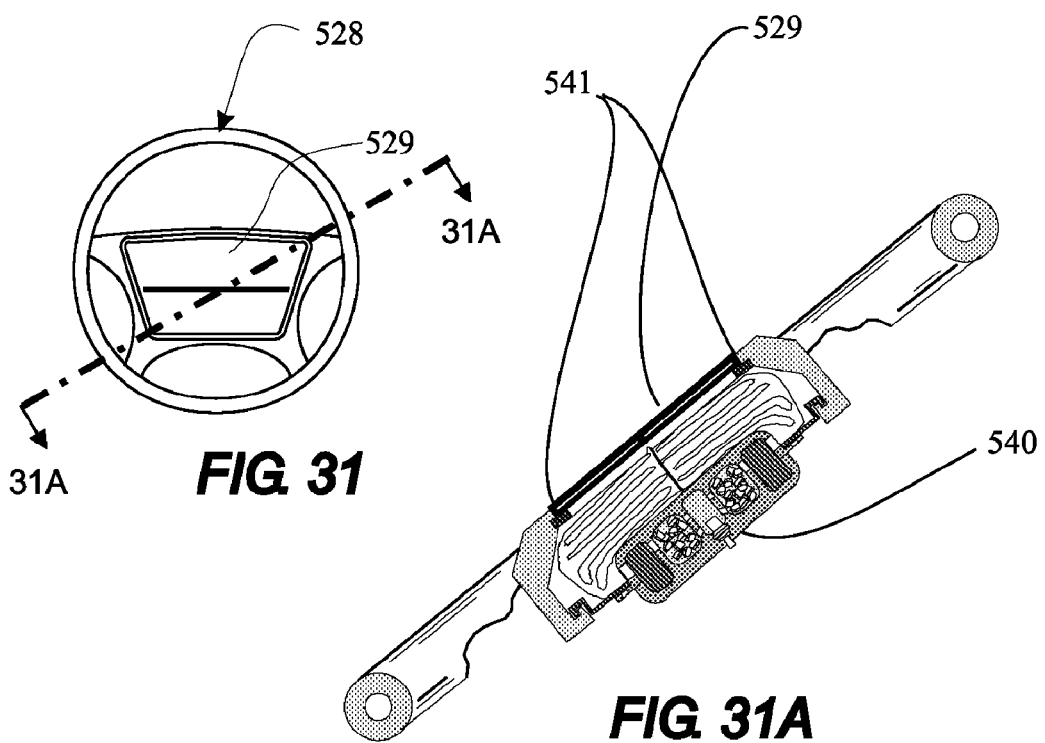
FIG. 31   FIG. 31A

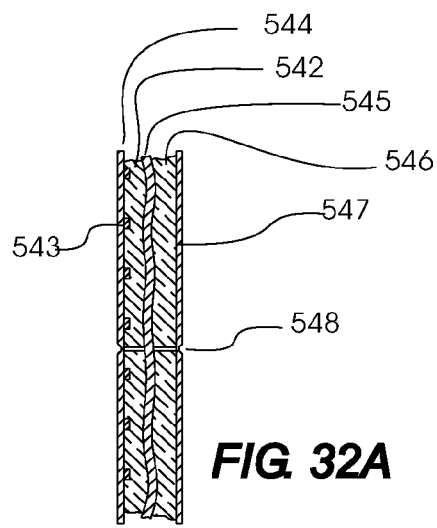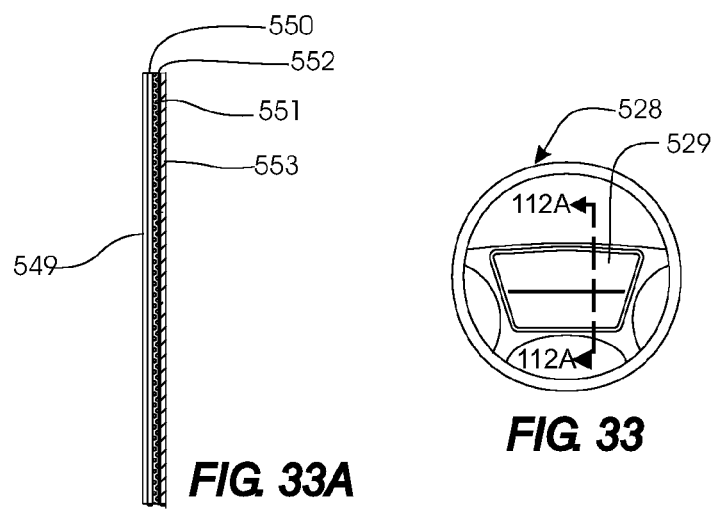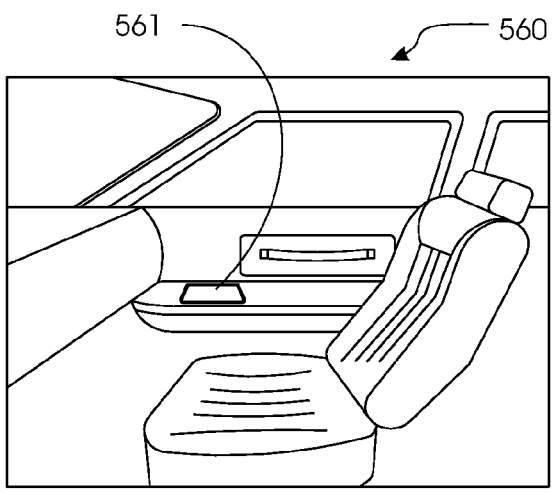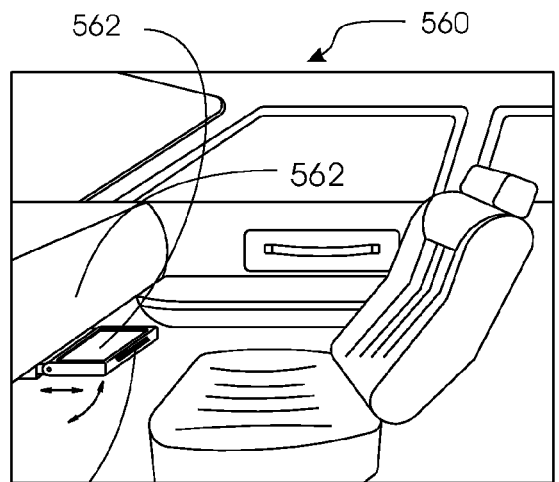
FIG. 32A  FIG. 32  FIG. 33A  FIG. 33  FIG. 34A  FIG. 34B

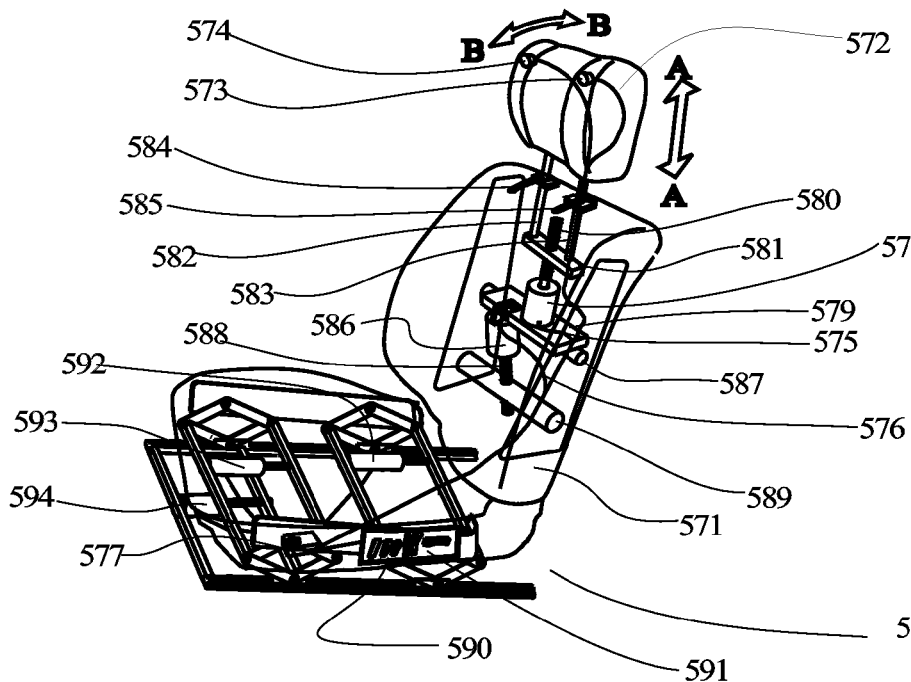
FIG. 35
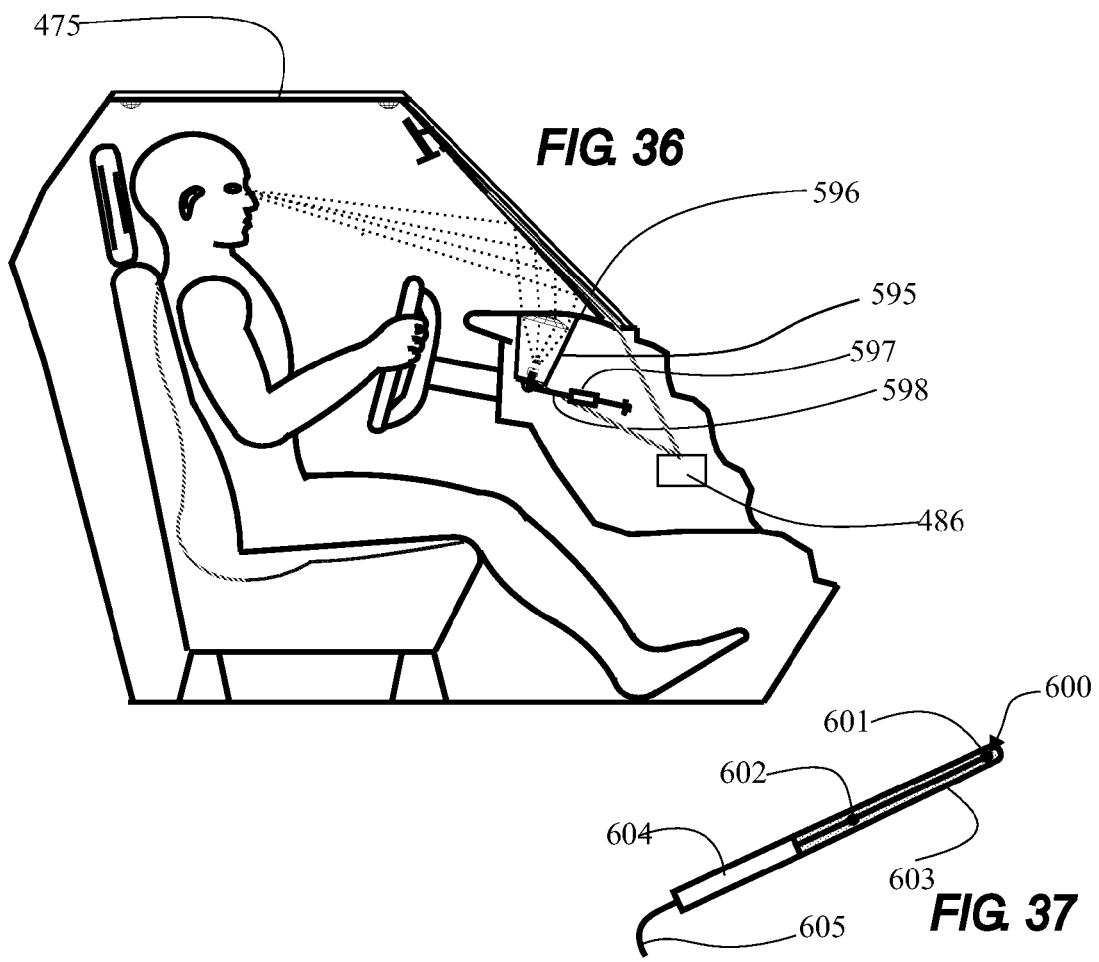
FIG. 36
FIG. 37

VEHICULAR HEADS-UP DISPLAY SYSTEM

CROSS REFERENCE TO RELATED APPLICATIONS

This application is a:
1. a continuation-in-part (CIP) of U.S. patent application Ser. No. 11/082,739 filed Mar. 17, 2005, now U.S. Pat. No. 7,421,321, which is a CIP of U.S. patent application Ser. No. 10/701,361 filed Nov. 4, 2003, now U.S. Pat. No. 6,988,026, which is a CIP of U.S. patent application Ser. No. 09/645,709 filed Aug. 24, 2000, now U.S. Pat. No. 7,126,583, which claims priority under 35 U.S.C. §119(e) of U.S. provisional patent application Ser. No. 60/170,973 filed Dec. 15, 1999, now expired; and
2. a CIP of U.S. patent application Ser. No. 11/428,436 filed Jul. 3, 2006, now U.S. Pat. No. 7,860,626, which is:
  A. a CIP of U.S. patent application Ser. No. 09/645,709 filed Aug. 24, 2000, now U.S. Pat. No. 7,126,583, which claims priority under 35 U.S.C. §119(e) of U.S. provisional patent application Ser. No. 60/170,973 filed Dec. 15, 1999; and
  B. a CIP of U.S. patent application Ser. No. 11/220,139 filed Sep. 6, 2005, now U.S. Pat. No. 7,103,460, which is a CIP of U.S. patent application Ser. No. 11/120,065 filed May 2, 2005, now abandoned; and
3. a CIP of U.S. patent application Ser. No. 11/459,700 filed Jul. 25, 2006 now abandoned which is:
  A. a CIP of U.S. patent application Ser. No. 09/645,709 filed Aug. 24, 2000, now U.S. Pat. No. 7,126,583, which claims priority under 35 U.S.C. §119(e) of U.S. provisional patent application Ser. No. 60/170,973 filed Dec. 15, 1999; and
  B. a CIP of U.S. patent application Ser. No. 11/220,139 filed Sep. 6, 2005, now U.S. Pat. No. 7,103,460, which is a CIP of U.S. patent application Ser. No. 11/120,065 filed May 2, 2005, now abandoned; and
4. a CIP of U.S. patent application Ser. No. 11/552,004 filed Oct. 23, 2006, now U.S. Pat. No. 7,920,102, which is a CIP of U.S. patent application Ser. No. 09/645,709 filed Aug. 24, 2000, now U.S. Pat. No. 7,126,583, which claims priority under 35 U.S.C. §119(e) of U.S. provisional patent application Ser. No. 60/170,973 filed Dec. 15, 1999.

This application is related to U.S. patent application Ser. No. 10/930,288 filed Aug. 31, 2004, now U.S. Pat. No. 7,164,117, and U.S. patent application Ser. No. 11/924,654 filed Oct. 26, 2007, on the grounds that they include common subject matter.

All of these applications are incorporated by reference herein.

All of the references, patents and patent applications that are mentioned herein are incorporated by reference in their entirety as if they had each been set forth herein in full. Note that this application is one in a series of applications covering safety and other systems for vehicles and other uses. The disclosure herein goes beyond that needed to support the claims of the particular invention set forth herein. This is not to be construed that the inventor is thereby releasing the unclaimed disclosure and subject matter into the public domain. Rather, it is intended that patent applications have been or will be filed to cover all of the subject matter disclosed below and in the current assignee's granted and pending applications. Also please note that the terms frequently used below "the invention" or "this invention" is not meant to be construed that there is only one invention being discussed. Instead, when the terms "the invention" or "this invention" are used, it is referring to the particular invention being discussed in the paragraph where the term is used.

FIELD OF THE INVENTION

The present invention relates to vehicles including a heads-up display system.

The present invention also relates to methods for displaying images of text and/or graphics to occupants of a vehicle.

BACKGROUND OF THE INVENTION

A heads-up display system for a driver of a vehicle which is adjustable based on the position of the driver is disclosed in U.S. Pat. No. 5,734,357 (Matsumoto). Prior to Matsumoto, the current assignee in U.S. Pat. No. 5,822,707 and U.S. Pat. No. 5,748,473, disclosed a seat adjustment system for adjusting a seat of an occupant viewing images formed by a heads-up display system based on the position of the occupant (see FIG. 8).

Detailed background on heads-up display systems is found in the parent application, U.S. patent application Ser. No. 09/645,709, now U.S. Pat. No. 7,126,583. Definitions of terms used herein can also be found in the parent applications.

OBJECTS AND SUMMARY OF THE INVENTION

It is an object of the present invention to provide new and improved adjustable heads-up display arrangements for vehicles.

It is another object of the present invention to provide new and improved adjustable heads-up display arrangements for vehicles in which the orientation of the driver is changed relative to the images being formed by a heads-up display component of the arrangement, which may entail either adjusting the seat or adjusting the heads-up display component.

It is yet another object of the present invention to provide new and improved methods for displaying text and/or graphics to occupants of vehicles.

Further objects of the present invention will become apparent from the following discussion of preferred embodiments of the invention.

In order to achieve one or more of the objects above, a vehicle in accordance with the invention includes a heads-up display system for generating a virtual display in a field of view of an occupant of the vehicle when facing outward of the vehicle and a control system coupled to the heads-up display system for detecting an action by the occupant and controlling the content of the virtual display being generated by the heads-up display system based on the detected action.

In one embodiment, the control device includes a sensor system including an antenna and an activation area arranged to be accessible to the occupant of the vehicle, and an interrogator arranged to direct a signal to the sensor system and receive a return signal with variations between the directed and received signals being convertible into an indication of the activation area being touched by the occupant. The sensor system can be arranged on a circumference of a steering wheel and can comprise a surface acoustic wave device and/or a radio frequency identification device (RFID).

The control device can also include a voice-reception system which receives vocal commands from the occupant. It can also include a gesture-detection system which detects gestures by the occupant. One such gesture-detection system includes a camera having a field of view of hands or an upper body region of an occupant expected to exercise control of the heads-up display and a processor arranged to receive images from the camera, detect movement of a head, hand or arm of the occupant in one of predetermined number of areas and perform a function based on the detection of movement in the predetermined area. The function may be to alter the content of the heads-up display or adjustment of a vehicle component.

The vehicle can include an in-vehicle signage system containing information about roads being traveled by the vehicle and signs along the roads. In this case, the control device is coupled to the in-vehicle signage system and controls the heads-up display system to display information from the in-vehicle signage system. The in-vehicle signage system can contain a map database with road signs and enable the control means to control the heads-up display system to display current signs, previous signs and future signs upon request by the occupant. The in-vehicle signage system may also be arranged to receive transmissions from road signs along the road being traveled by the vehicle and convert the transmissions into information to be displayed by the heads-up display system. If the vehicle is provided with a location determining system, the in-vehicle signage system can obtain information from the Internet based on its determined location. The in-vehicle signage system could also be arranged to translate the signs into a different language or to annunciate the content of the signs upon request by the occupant.

The vehicle can also include a route guidance system containing a map database and a location determining system for determining the location of the vehicle. In this case, the control device is coupled to the route guidance system and the location determining system and controls the heads-up display to display a map of the area around the vehicle with an indication of the vehicle's location on the map. The control device can enable remote control thereof by a remote party upon request by the occupant such that assistance with vehicle navigation is available to the occupant by the remote party, including for example, enabling display of landmarks upon request by the remote party on the heads-up display. The control device can also control the heads-up display to display a view of the road ahead at a location at which it is an overlay onto a view of the same road seen by the occupant with an indication of a path to follow to guide the vehicle. The path may be colored for emphasis and/or only displayed or colored during periods of poor visibility.

A method for controlling one of a plurality of different components in a vehicle in accordance with the invention includes generating a virtual display in a field of view of the occupant when facing outward of the vehicle, arranging at least one microphone in the vehicle to detect vocal output of the occupant, analyzing the detected vocal output to determine which component is to be controlled, controlling the component based on the detected vocal output, and adjusting the display to indicate the manner in which the component is being controlled.

A method for providing information to an occupant of a compartment of a vehicle in accordance with the invention includes generating a virtual display in a field of view of the occupant when facing outward of the vehicle, arranging at least one camera in the vehicle to obtain images of the occupant, analyzing the images to detect movement of the occupant, and controlling the display based on the detected movement of the occupant to enable the information displayed on the display to be varied based on occupant movement.

Detection of movement of the occupant may entail defining at least one predetermined of the compartment to constitute a virtual switch and detecting movement of finger of the occupant into the at least one predetermined area. It could also entail determining a direction in which the occupant's face is pointed and/or detecting the direction in which one of the occupant's fingers is pointed.

BRIEF DESCRIPTION OF THE DRAWINGS

The following drawings are illustrative of embodiments of the invention and are not meant to limit the scope of the invention as encompassed by the claims.

FIG. 12A is a view of the seat of FIG. 8 wherein the bladder contains a plurality of chambers.

FIG. 16 is a view similar to FIG. 8 showing an inflated airbag and an arrangement for controlling both the flow of gas into and the flow of gas out of the airbag during the crash where the determination is made based on a height sensor located in the headrest and a weight sensor in the seat.

FIG. 16A is a schematic of part of the arrangement of FIG. 16.

FIG. 22B is a perspective view of a simply supported beam type load cell for use with the weight measurement system of this invention as an alternate to the cantilevered load cell of FIG. 22A.

FIG. 22C is an enlarged view of the portion designated 22C in FIG. 22B.

FIG. 27 is a diagram of advantages of small heads-up display projection screen such as described in U.S. Pat. No. 5,473,466.

FIG. 28 is a cross section view of an airbag-equipped steering wheel showing a touch pad.

FIG. 29 is a front view of a steering wheel having a touch pad arranged in connection therewith.

FIG. 29A is a cross sectional view of the steering wheel shown in FIG. 29 taken along the line 29A-29A of FIG. 29.

FIG. 30 is a front view of an ultrasound-in-a-tube touch pad arranged in connection with a steering wheel.

FIG. 31A is a cross sectional view of the steering wheel shown in FIG. 30 taken along the line 30A-30A of FIG. 30.

FIG. 31 is a front view of a force sensitive touch pad arranged in connection with a steering wheel.

FIG. 31A is a cross sectional view of the steering wheel shown in FIG. 31 taken along the line 31A-31A of FIG. 31.

FIG. 32 is a front view of a capacitance touch pad arranged in connection with a steering wheel.

FIG. 32A is part of a cross sectional view of the steering wheel shown in FIG. 32 taken along the line 32A-32A of FIG. 32.

FIG. 33 is a front view of a resistance touch pad arranged in connection with a steering wheel.

FIG. 33A is a cross sectional view of the steering wheel shown in FIG. 33 taken along the line 33A-33A of FIG. 33.

FIG. 34A and FIG. 34B show other interior surfaces where touch pads can be placed such as on the armrest (FIG. 34A) or projecting out of the instrument panel (FIG. 34B).

FIG. 35 is a perspective view of an automatic seat adjustment system, with the seat shown in phantom, with a movable headrest and sensors for measuring the height of the occupant from the vehicle seat showing motors for moving the seat and a control circuit connected to the sensors and motors.

FIG. 36 illustrates how the adjustment of heads-up display can be done automatically.

FIG. 37 is a view of a directional microphone.

DETAILED DESCRIPTION OF THE PREFERRED EMBODIMENTS

Figure 1:
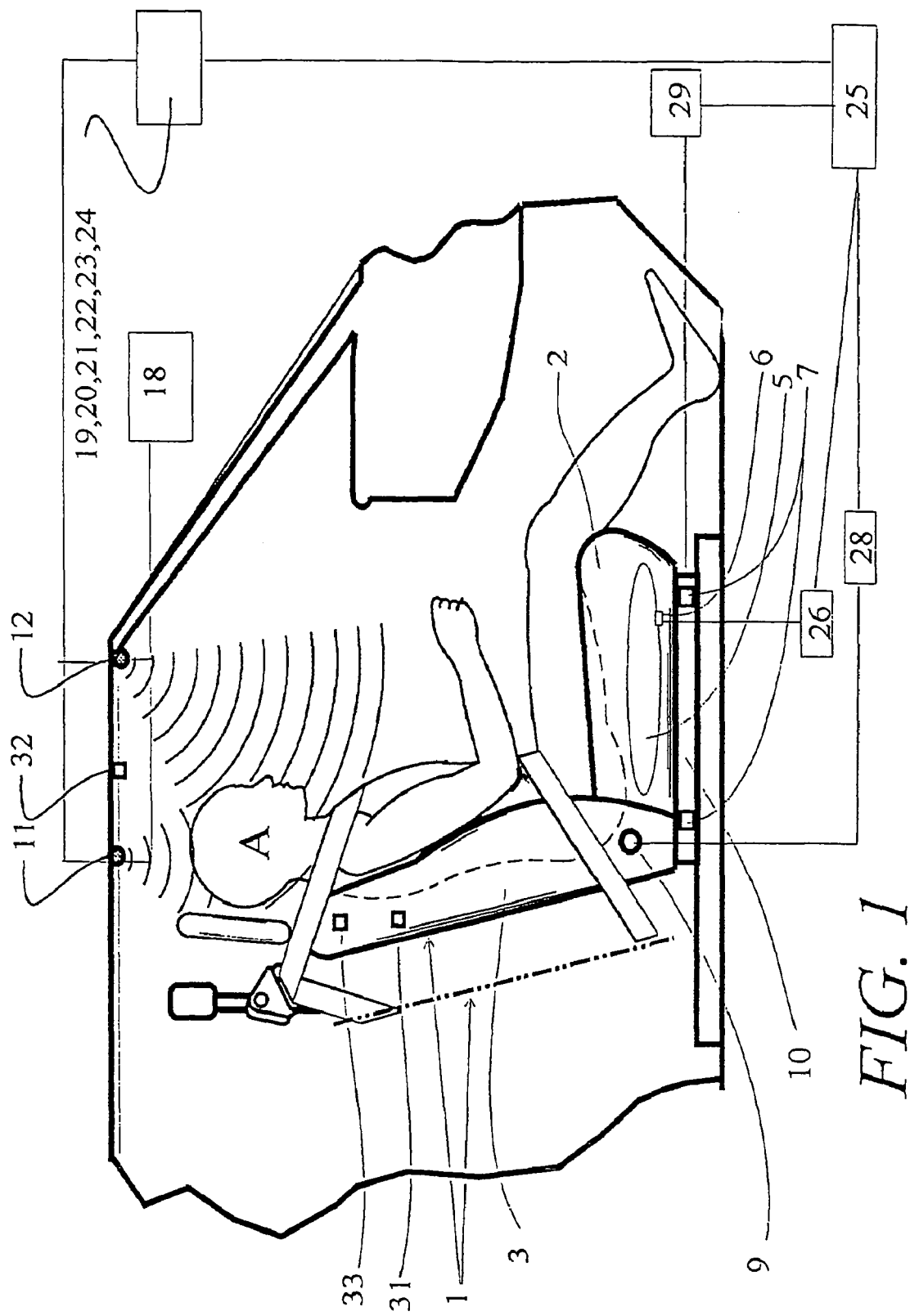
FIG. 1 shows a seated-state detecting unit in accordance with the present invention and the connections between ultrasonic or electromagnetic sensors, a weight sensor, a reclining angle detecting sensor, a seat track position detecting sensor, a heartbeat sensor, a motion sensor, a neural network, and an airbag system installed within a vehicle compartment.

Referring to the accompanying drawings wherein like reference numbers designate the same or similar elements, FIG.

1 shows a passenger seat 1 to which an adjustment apparatus including a seated-state detecting unit according to the present invention may be applied. The seat 1 includes a horizontally situated bottom seat portion 2 and a vertically oriented back portion 3. The seat portion 2 is provided with one or more weight sensors 6 and 7 that determine the weight of the object occupying the seat. The coupled portion between the seated portion 2 and the back portion 3 is provided with a reclining angle detecting sensor 9, which detects the tilted angle of the back portion 3 relative to the seat portion 2. The seat portion 2 is provided with a seat track position-detecting sensor 10. The se track position detecting sensor 10 fulfills a role of detecting the quantity of movement of the seat 1 which is moved from a back reference position, indicated by the dotted chain line. Embedded within the seatback are a heartbeat sensor 31 and a motion sensor 33. Attached to the headliner is a capacitance sensor 32. The seat 1 may be the driver seat, the front passenger seat or any other seat in a motor vehicle as well as other seats in transportation vehicles or seats in non-transportation applications.

Weight measuring means such as the sensor 6 and 7 are associated with the seat, e.g., mounted into or below the seat portion 2 or on the seat structure, for measuring the weight applied onto the seat. The weight may be zero if no occupying item is present and the sensors are optionally calibrated to only measure incremental weight. Sensor 6 and 7 may represent a plurality of different sensors which measure the weight applied onto the seat at different portions thereof or for redundancy purposes, e.g., such as by means of an airbag or fluid-filled bladder 5 in the seat portion 2. Airbag or bladder 5 may contain a single or a plurality of chambers, each of which is associated with a sensor (transducer) 6 for measuring the pressure in the chamber. Such sensors may be in the form of strain, force or pressure sensors which measure the force or pressure on the seat, a part of the seat or seat back, displacement measuring sensors which measure the displacement of the seat surface or the entire seat such as through the use of strain gages mounted on the seat structural members, such as 7, or other appropriate locations, or systems which convert displacement into a pressure wherein one or more pressure sensors can be used as a measure of weight and/or weight distribution. Sensors 7, 76 may be of the types disclosed in U.S. Pat. No. 6,242,701.

Figure 2:
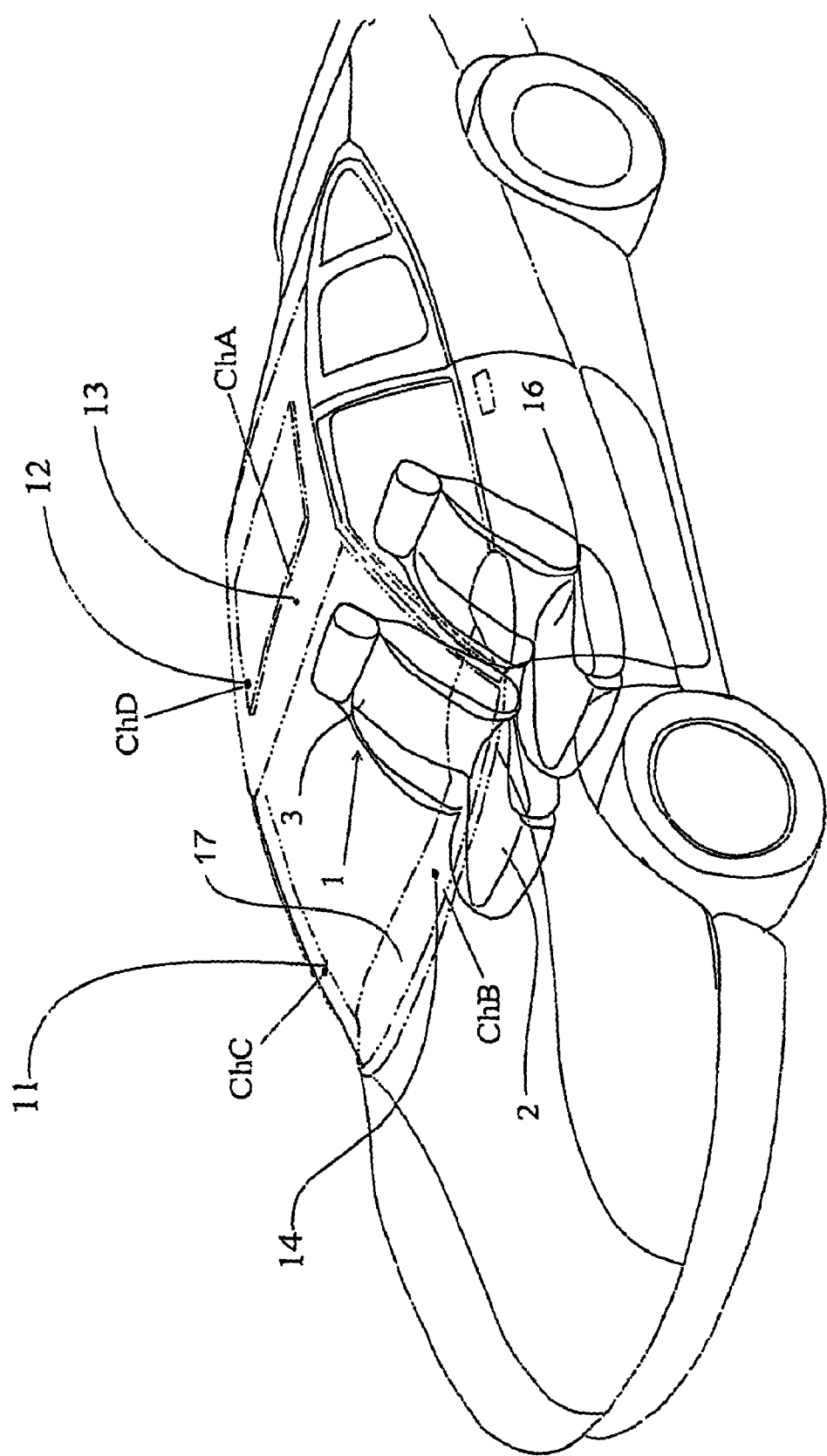
FIG. 2 is a perspective view of a vehicle showing the position of the ultrasonic or electromagnetic sensors relative to the driver and front passenger seats.

As shown in FIG. 2, there are provided four sets of wave-receiving sensor systems 11-14 mounted within the passenger compartment. Each set of sensor systems 11-14 comprises a transmitter and a receiver (or just a receiver in some cases), which may be integrated into a single unit or individual components separated from one another. In this embodiment, the sensor system 11 is mounted on the upper portion of the front pillar, A-Pillar, of the vehicle. The sensor system 12 is mounted on the upper portion of the intermediate pillar, B-Pillar. The sensor system 13 is mounted on the roof ceiling portion or the headliner (FIG. 2). The sensor system 14 is mounted near the middle of an instrument panel 17 in front of the driver's seat 16 (FIG. 2). The sensor systems are preferably ultrasonic or electromagnetic. Although sensor systems 11-14 are described as being ultrasonic or electromagnetic sensors, the invention is equally applicable for other types of sensors (other than ultrasonic or electromagnetic) which will detect the presence of an occupant from a distance including capacitive or electromagnetic sensors. Also, if the sensor systems 11-14 are passive infrared sensors, for example, then they may only comprise a wave-receiver.

Figure 3:
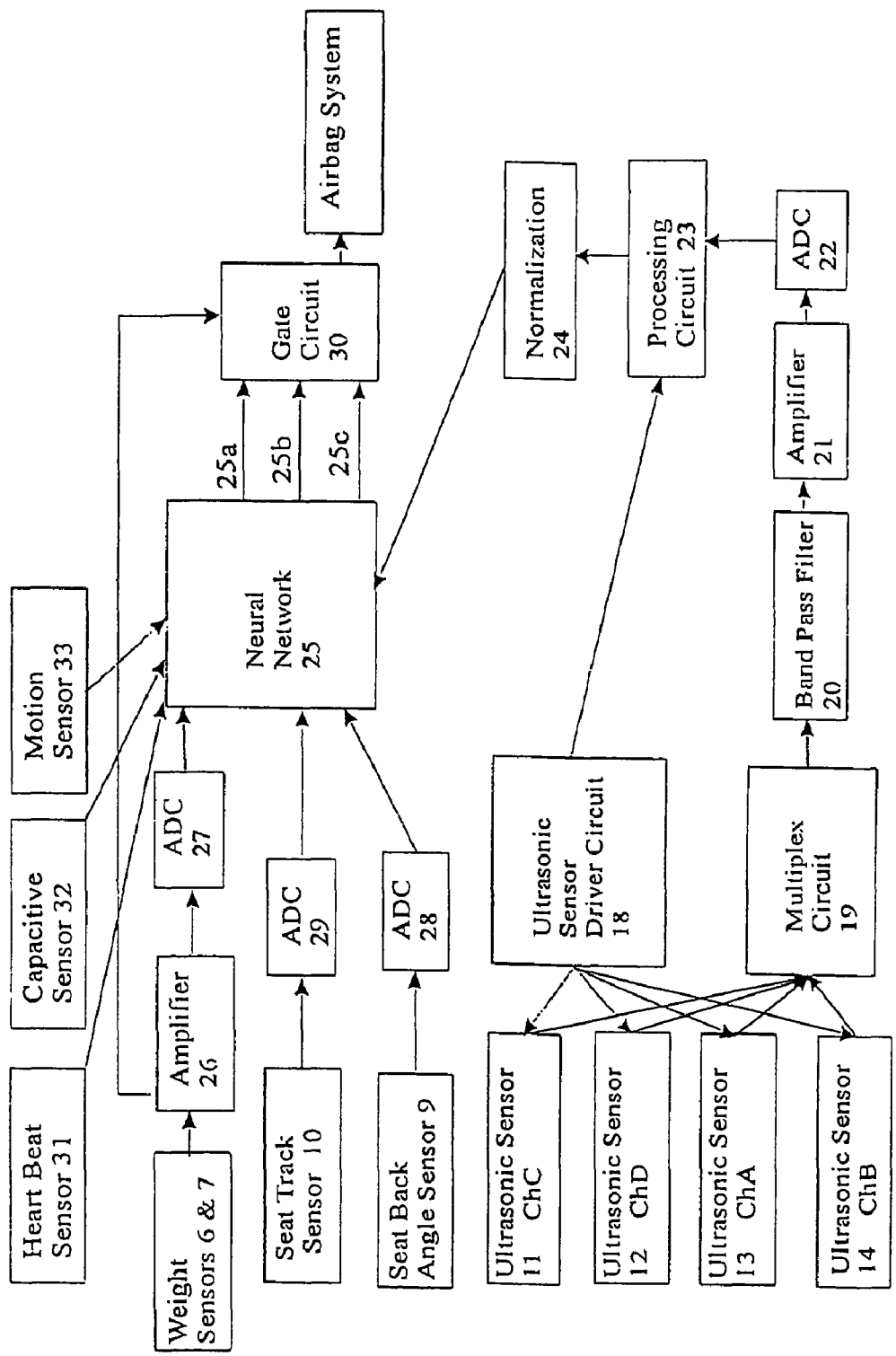
FIG. 3 is a circuit diagram of the seated-state detecting unit of the present invention.

The ultrasonic or electromagnetic sensor systems 11-14 are controlled or driven, one at a time or simultaneously, by an appropriate driver circuit such as ultrasonic or electromagnetic sensor driver circuit 18 shown in FIG. 3. The transmitters of the ultrasonic or electromagnetic sensor systems 11-14 transmit respective ultrasonic or electromagnetic waves toward the seat 1 and transmit pulses (see FIG. 4(c)) in sequence at times t1, t2, t3 and t4 (t4>t3>t2>t1) or simultaneously (t1=t2=t3=t4). The reflected waves of the ultrasonic or electromagnetic waves are received by the receivers ChA-ChD of the ultrasonic or electromagnetic sensors 11-14. The receiver ChA is associated with the ultrasonic or electromagnetic sensor system 13, the receiver ChB is associated with the ultrasonic or electromagnetic sensor system 14, the receiver ChC is associated with the ultrasonic or electromagnetic sensor system 11, and the receiver ChD is associated with the ultrasonic or electromagnetic sensor system 12.

The following discussion will apply to the case where ultrasonic sensors are used although a similar discussion can be presented relative to the use of electromagnetic sensors such as active infrared sensors, taking into account the differences in the technologies. Also, the following discussion will relate to an embodiment wherein the seat 1 is the front passenger seat. FIGS. 4(a) and 4(b) show examples of the reflected ultrasonic waves USRW that are received by receivers ChA-ChD. FIG. 4(a) shows an example of the reflected wave USRW that is obtained when an adult sits in a normally seated space on the passenger seat 1, while FIG. 4(b) shows an example of the reflected wave USRW that are obtained when an adult sits in a slouching state (one of the abnormal seated-states) in the passenger seat 1.

In the case of a normally seated passenger, as shown in FIG. 2, the location of the ultrasonic sensor system 12 is closest to the passenger A. Therefore, the reflected wave pulse P1 is received earliest after transmission by the receiver ChD as shown in FIG. 4(a), and the width of the reflected wave pulse P1 is larger. Next, the distance from the ultrasonic sensor 13 is closer to the passenger A, so a reflected wave pulse P2 is received earlier by the receiver ChA compared with the remaining reflected wave pulses P3 and P4. Since the reflected wave pauses P3 and P4 take more time than the reflected wave pulses P1 and P2 to arrive at the receivers ChC and ChB, the reflected wave pulses P3 and P4 are received as the timings shown in FIG. 4(a). More specifically, since it is believed that the distance from the ultrasonic sensor system 11 to the passenger A is slightly shorter than the distance from the ultrasonic sensor system 14 to the passenger A, the reflected wave pulse P3 is received slightly earlier by the receiver ChC than the reflected wave pulse P4 is received by the receiver ChB.

In the case where the passenger A is sitting in a slouching state in the passenger seat 1, the distance between the ultrasonic sensor system 11 and the passenger A is shortest. Therefore, the time from transmission at time t3 to reception is shortest, and the reflected wave pulse P3 is received by the receiver ChC, as shown in FIG. 4(b). Next, the distances between the ultrasonic sensor system 14 and the passenger A becomes shorter, so the reflected wave pulse P4 is received earlier by the receiver ChB than the remaining reflected wave pulses P2 and P1. When the distance from the ultrasonic sensor system 13 to the passenger A is compared with that from the ultrasonic sensor system 12 to the passenger A, the distance from the ultrasonic sensor system 13 to the passenger A becomes shorter, so the reflected wave pulse P2 is received by the receiver ChA first and the reflected wave pulse P1 is thus received last by the receiver ChD.

Figure 4:
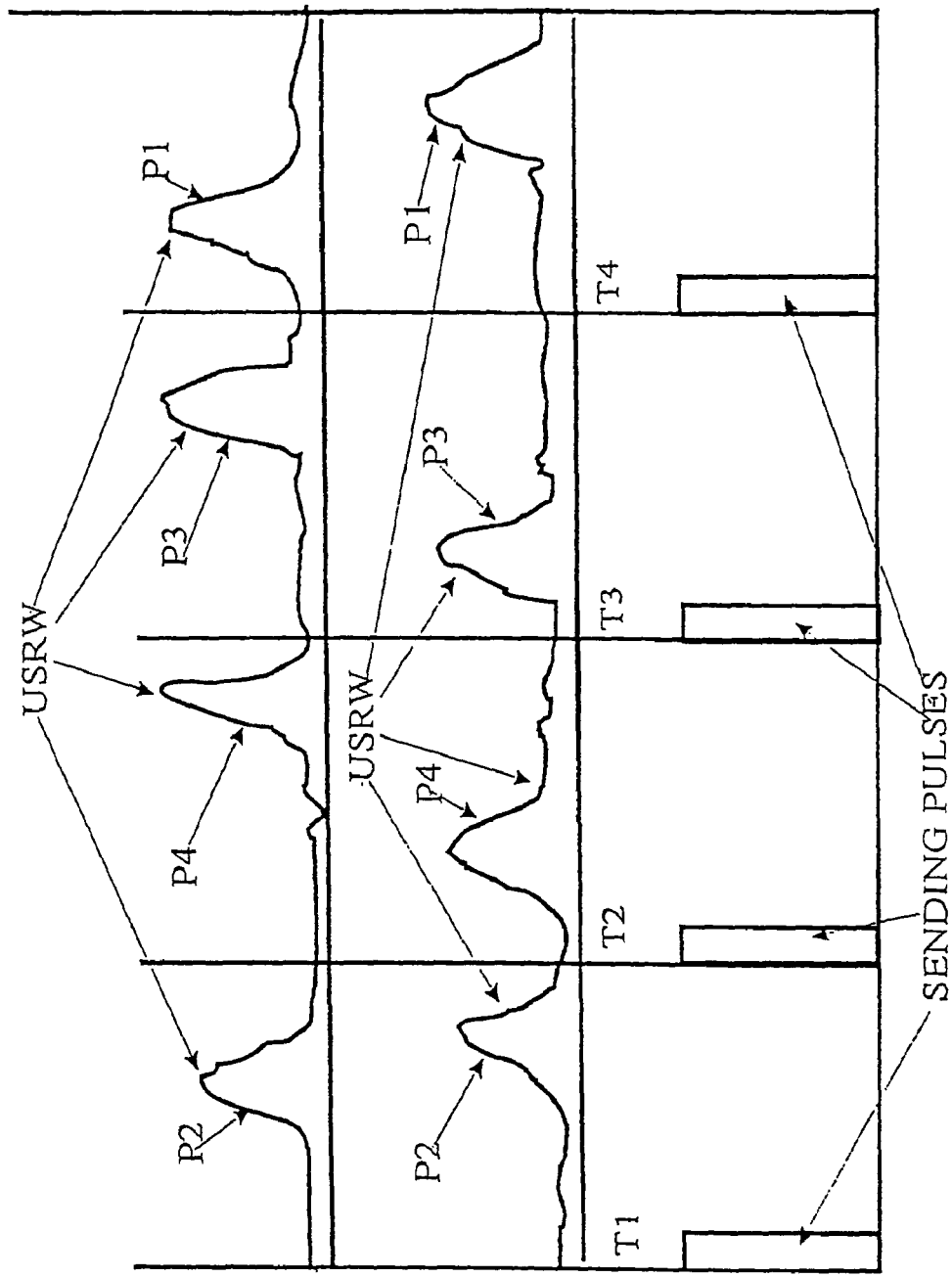
FIGS. 4(a), 4(b) and 4(c) are each a diagram showing the configuration of the reflected waves of an ultrasonic wave transmitted from each transmitter of the ultrasonic sensors toward the passenger seat, obtained within the time that the reflected wave arrives at a receiver, FIG. 4(a) showing an example of the reflected waves obtained when a passenger is in a normal seated-state, FIG. 4(b) showing an example of the reflected waves obtained when a passenger is in an abnormal seated-state (where the passenger is seated too close to the instrument panel), and FIG. 4(c) showing a transmit pulse.

The configurations of the reflected wave pulses P1-P4, the times that the reflected wave pulses P1-P4 are received, the sizes of the reflected wave pulses P1-P4 are varied depending upon the configuration and position of an object such as a passenger situated on the front passenger seat 1. FIGS. 4(*a*) and (*b*) merely show examples for the purpose of description and therefore it is a matter of course that the present invention is not limited to these examples.

The outputs of the receivers ChA-ChD, as shown in FIG. 3, are input to a band pass filter 20 through a multiplex circuit 19 which is switched in synchronization with a timing signal from the ultrasonic sensor drive circuit 18. The band pass filter 20 removes a low frequency wave component from the output signal based on each of the reflected wave USRW and also removes some of the noise. The output signal based on each of the reflected wave USRW is passed through the band pass filter 20, then is amplified by an amplifier 21. The amplifier 21 also removes the high frequency carrier wave component in each of the reflected USRW and generates an envelope wave signal. This envelope wave signal is input to an analog/digital converter (ADC) 22 and digitized as measured data. The measured data is input to a processing circuit 23, which is controlled by the timing signal which is in turn output from the ultrasonic sensor drive circuit 18.

The processing circuit 23 collects measured data at intervals of 7 ms (or at another time interval with the time interval also being referred to as a time window or time period), and 47 data points are generated for each of the ultrasonic sensor systems 11-14. For each of these reflected waves USRW, the initial reflected wave portion T1 and the last reflected wave portion T2 are cut off or removed in each time window. The reason for this will be described when the training procedure of a neural network is described later, and the description is omitted for now. With this, 32 data points, 31 data points, 37 data points, and 38 data points will be sampled by the ultrasonic sensor systems 12, 13 and 14, respectively. The reason why the number of data points differs for each of the ultrasonic sensor systems 11-14 is that the distance from the passenger seat 1 to the ultrasonic sensor systems 11-14 differ from one another.

Each of the measured data is input to a normalization circuit 24 and normalized. The normalized measured data is input to the neural network 25 as wave data.

The output of the weight sensor(s) 6 and 7 is amplified by an amplifier 26 coupled to the weight sensor(s) 6 and 7 and the amplified output is input to the analog/digital converter 27.

The reclining angle detecting sensor 9 and the seat track position-detecting sensor 10, which each may comprise a variable resistor, are connected to constant-current circuits, respectively. A constant-current is supplied from the constant-current circuit to the reclining angle detecting sensor 9, and the reclining angle detecting sensor 9 converts a change in the resistance value on the tilt of the back portion 3 to a specific voltage. This output voltage is input to an analog/digital converter 28 as angle data, i.e., representative of the angle between the back portion 3 and the seat portion 2. Similarly, a constant current is supplied from the constant-current circuit to the seat track position-detecting sensor 10 and the seat track position detecting sensor 10 converts a change in the resistance value based on the track position of the seat portion 2 to a specific voltage. This output voltage is input to an analog/digital converter 29 as seat track data. Thus, the outputs of the reclining angle-detecting sensor 9 and the seat track position-detecting sensor 10 are input to the analog/digital converters 28 and 29, respectively. Each digital data value from the ADCs 28,29 is input to the neural network 25. Although the digitized data of the weight sensor(s) 6 and 7 is input to the neural network 25, the output of the amplifier 26 is also input to a comparison circuit. The comparison circuit, which is incorporated in the gate circuit algorithm, determines whether or not the weight of an object on the passenger seat 1 is more than a predetermined weight, such as 60 lbs., for example. When the weight is more than 60 lbs., the comparison circuit outputs a logic 1 to the gate circuit to be described later. When the weight of the object is less than 60 lbs., a logic 0 is output to the gate circuit.

A heartbeat sensor 31 is arranged to detect a heart beat, and the magnitude thereof, of a human occupant of the seat, if such a human occupant is present. The output of the heart beat sensor 31 is input to the neural network 25. The heartbeat sensor 31 may be of the type as disclosed in McEwan (U.S. Pat. Nos. 5,573,012 and 5,766,208 which are incorporated herein in their entirety by reference). The heartbeat sensor 31 can be positioned at any convenient position relative the seat 1 where occupancy is being monitored. A preferred location is within the vehicle seatback.

A capacitive sensor 32 is arranged to detect the presence of an occupying item on the seat 1 and the output thereof is input to the neural network 25. Capacitive sensors appropriate for this function are disclosed in Kithil (U.S. Pat. Nos. 5,602,734, 5,802,479 and 5,844,486 which are incorporated herein by reference) and Jinno et al. (U.S. Pat. No. 5,948,031 which is incorporated herein by reference). Capacitive sensors can in general be mounted at locations 11-14 in FIG. 2 or as shown in FIG. 1 or in the vehicle seat and seat back, although by their nature they can occupy considerably more space than shown in the drawings.

A motion sensor 33 is arranged to detect motion of an occupying item on the seat 1 and the output thereof is input to the neural network 25. Motion sensors can utilize a micropower impulse radar (MIR) system as disclosed, for example, in McEwan (U.S. Pat. No. 5,361,070, which is incorporated herein by reference), as well as many other patents by the same inventor. Motion sensing is accomplished by monitoring a particular range from the sensor as disclosed in that patent. MIR is one form of radar which has applicability to occupant sensing and can be mounted at locations such as 11-14 in FIG. 2. It has an advantage over ultrasonic sensors in that data can be acquired at a higher speed and thus the motion of an occupant can be more easily tracked. The ability to obtain returns over the entire occupancy range is somewhat more difficult than with ultrasound resulting in a more expensive system overall. MIR has additional advantages in lack of sensitivity to temperature variation and has a comparable resolution to about 40 kHz ultrasound. Resolution comparable to higher frequency is feasible but has not been demonstrated. Additionally, multiple MIR sensors can be used when high speed tracking of the motion of an occupant during a crash is required since they can be individually pulsed without interfering with each through time division multiplexing.

The neural network 25 recognizes the seated-state of a passenger A by training as described in several books on Neural Networks referenced in the above referenced patents and patent applications. Then, after training the seated-state of the passenger A and developing the neural network weights, the system is tested. The training procedure and the test procedure of the neural network 25 will hereafter be described with a flowchart shown in FIG. 6.

Figure 6:
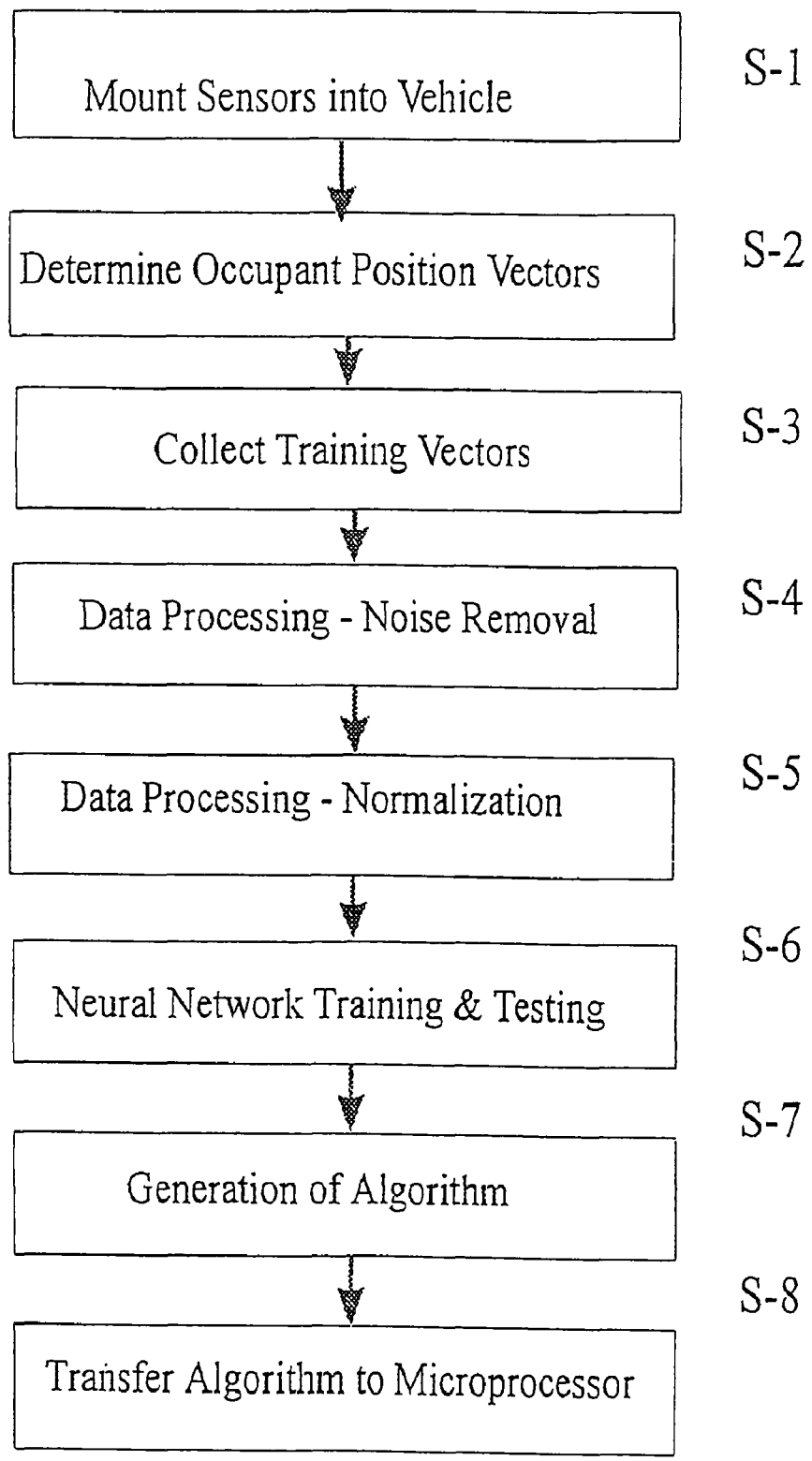
FIG. 6 is a flowchart showing the training steps of a neural network.

As diagrammed in FIG. 6, the first step is to mount the four sets of ultrasonic sensor systems 11-14, the weight sensors 6 and 7, the reclining angle detecting sensor 9, and the seat track position detecting sensor 10 into a vehicle (step S1). Next, in order to provide data for the neural network 25 to learn the patterns of seated states, data is recorded for patterns of all possible seated states and a list is maintained recording the seated states for which data was acquired. The data from the sensors/transducers 6, 7, 9-14 and 31-33, for a particular occupancy of the passenger seat is called a vector (step S2). It should be pointed out that the use of the reclining angle detecting sensor 9, seat track position detecting sensor 10, heart beat sensor 31, capacitive sensor 32 and motion sensor 33 not essential to the detecting apparatus and method in accordance with the invention. However, each of these sensors, in combination with any one or more of the other sensors enhances the evaluation of the seated-state of the seat.

For the vectors of data, adults and children each with different postures, states of windows etc. within the passenger compartment, and occupied and unoccupied child seats were selected. The selected adults include people with a variety of different physiques such as fat, lean, small, large, tall, short, and glasses wearing persons. The selected children ranged from an infant to a large child (for example, about 14 year old). In addition, the selected postures include, for example, a sitting state with legs crossed on a seat, a sitting state with legs on an instrument panel, a sitting state while reading a newspaper, a book, or a map, a sitting state while holding a cup of coffee, a cellular telephone or a dictation machine, and a slouching state with and without raised knees. Furthermore, the selected compartment states include variations in the seat track position, the window-opening amount, headrest position, and varying positions of a sun-visor. Moreover, a multitude of different models of child seats are used in the forward facing position and, where appropriate, in a rear facing position. The range of weights and the corresponding normalized values are as follows:

| Class | Weight Range | Normalized Value |
|---|---|---|
| Empty Seat | 0 to 2.2 lbs. | 0 to 0.01 |
| Rear Facing Child Seat | 2.2 to 60 lbs. | 0.01 to 0.27 |
| Forward Facing Child Seat | 2.2 to 60 lbs. | 0.01 to 0.27 |
| Normal Position Adult | 60 lbs and greater | 0.27 to 1 |

Obviously, other weight ranges may also be used in accordance with the invention and each weight range may be tailored to specific conditions, such as different vehicles. The output of the weight sensors may not correspond directly to be weight ranges in the above table. If for example strain measuring sensors are placed on each of the vehicle seat supports, such sensors will also respond to the weight of the seat itself. That weight must therefore the remove so that only the additional weight of an occupying item is measured. Similarly it may be desirable to place strain-sensing devices on only some of the vehicle seat support structures. In such cases the weight of the occupying item can be in inferred from the output of the strain sensing sensors. This will be described in greater detail below.

Various vehicle setups were prepared by a combination of these variations and, for in this embodiment, almost 500,000 or more vectors should be prepared for the patterns to be used as data for the neural network training.

Figure 5:
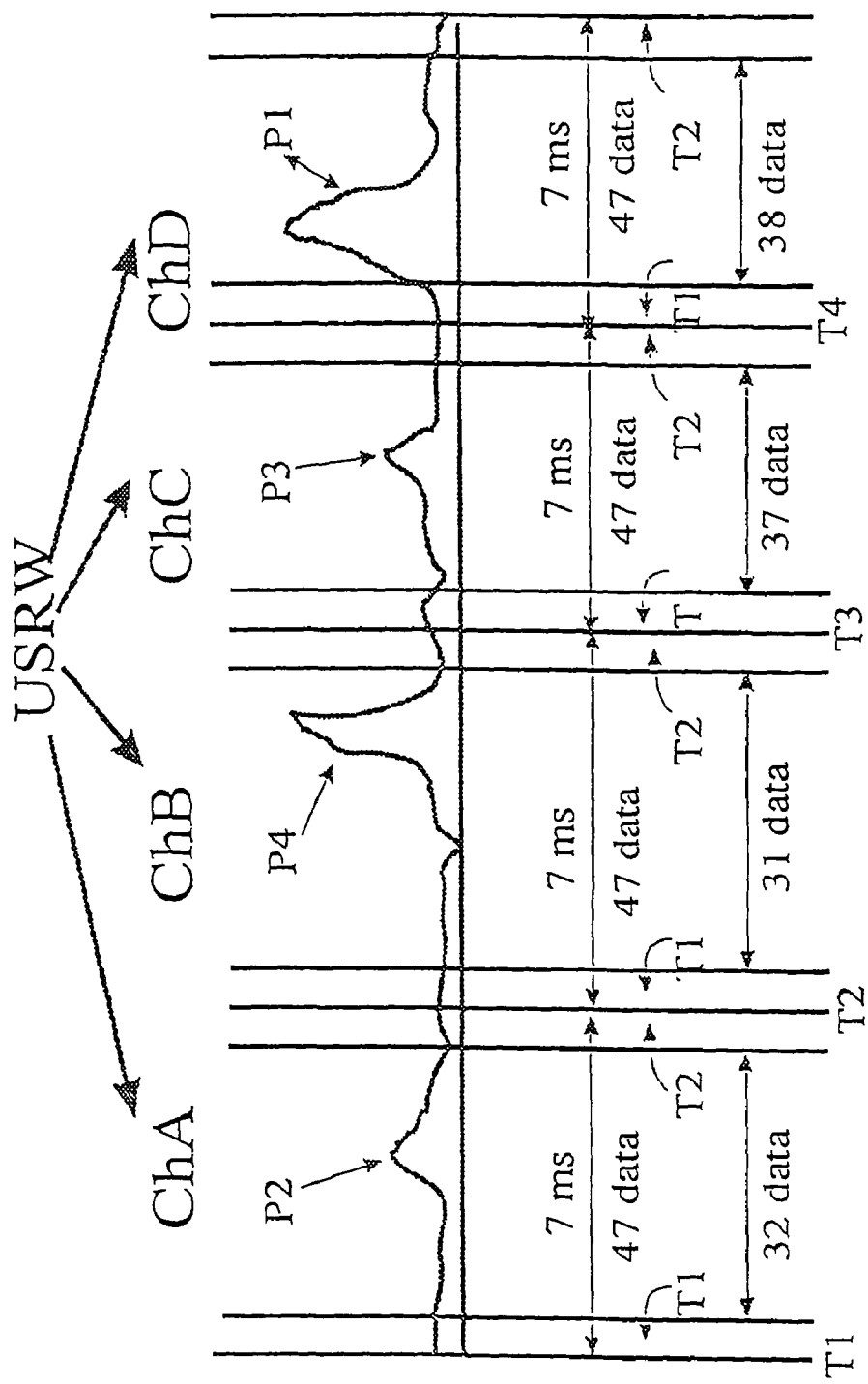
FIG. 5 is a diagram of the data processing of the reflected waves from the ultrasonic or electromagnetic sensors.

Next, based on the training data from the reflected waves of the ultrasonic sensor systems 11-14 and the other sensors 6, 7, 31-33, the vector data is collected (step S3). Next, the reflected waves P1-P4 are modified by removing the initial reflected waves from each time window with a short reflection time from an object (range gating) (period T1 in FIG. 5) and the last portion of the reflected waves from each time window with a long reflection time from an object (period P2 in FIG. 5) (step S4). It is believed that the reflected waves with a short reflection time from an object is due to cross-talk, that is, waves from the transmitters which leaks into each of their associated receivers ChA-ChD. It is also believed that the reflected waves with a long reflection time are reflected waves from an object far away from the passenger seat or from multipath reflections. If these two reflected wave portions are used as data, they will add noise to the training process. Therefore, these reflected wave portions are eliminated from the data.

Recent advances in transducer design have now permitted the use of a single transducer acting as both a sender (transmitter) and receiver. These same advances have substantially reduced the ringing of the transducer after the excitation pulse has been caused to die out to where targets as close as about 2 inches from the transducer can be sensed. Thus, the magnitude of the T1 time period has been substantially reduced.

Figure 7:
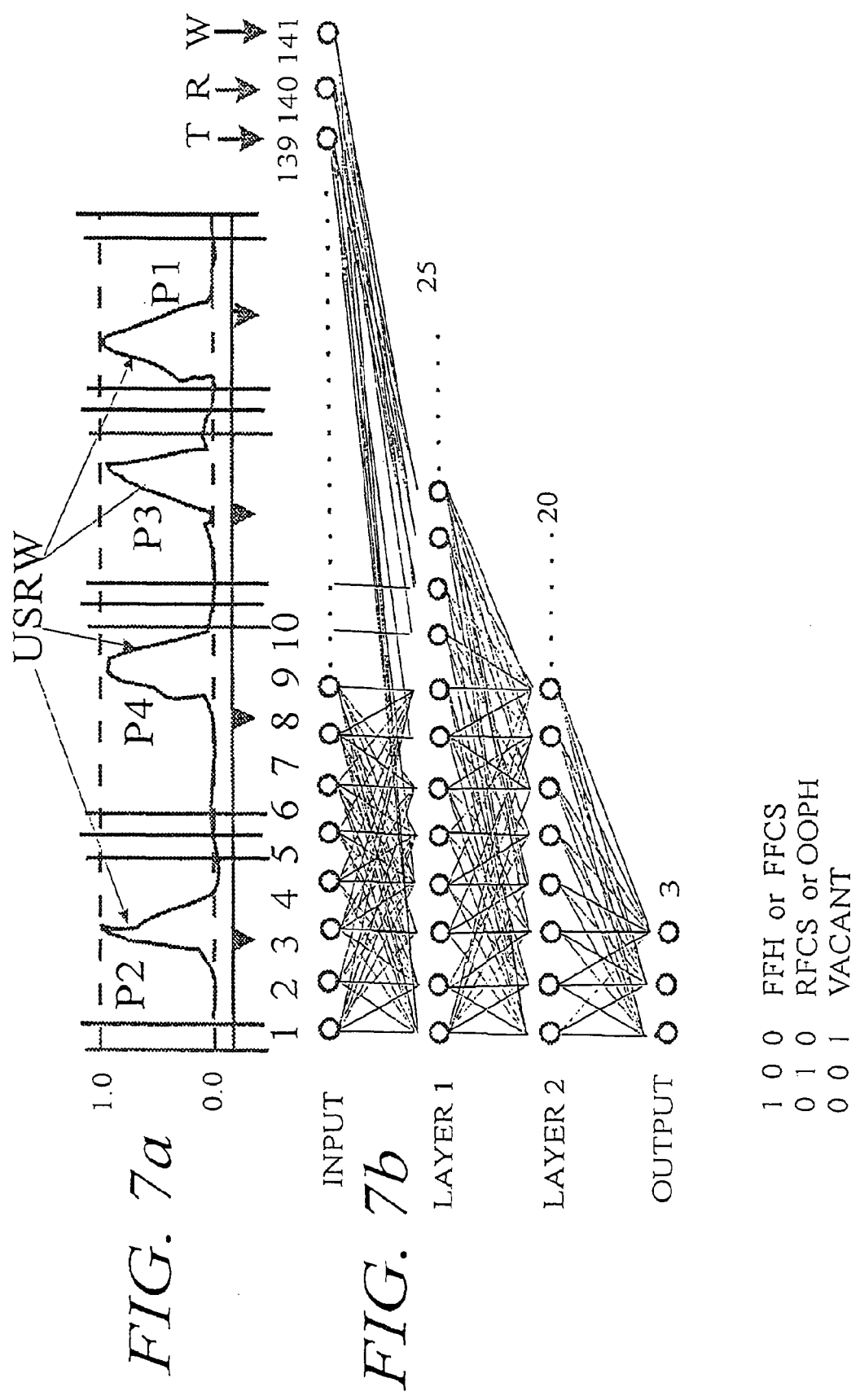
FIG. 7(a) is an explanatory diagram of a process for normalizing the reflected wave and shows normalized reflected waves.
FIG. 7(b) is a diagram similar to FIG. 7(a) showing a step of extracting data based on the normalized reflected waves and a step of weighting the extracted data by employing the data of the seat track position detecting sensor, the data of the reclining angle detecting sensor, and the data of the weight sensor.

As shown in FIG. 7(*a*), the measured data is normalized by making the peaks of the reflected wave pulses P1-P4 equal (step S5). This eliminates the effects of different reflectivities of different objects and people depending on the characteristics of their surfaces such as their clothing Data from the weight sensor, seat track position sensor and seat reclining angle sensor are also frequently normalized based typically on fixed normalization parameters.

The data from the transducers are now also preferably fed through a logarithmic compression circuit that substantially reduces the magnitude of reflected signals from high reflectivity targets compared to those of low reflectivity. Additionally, a time gain circuit is used to compensate for the difference in sonic strength received by the transducer based on the distance of the reflecting object from the transducer.

Therefore, the normalized data from the ultrasonic transducers the seat track position detecting sensor 10, the reclining angle detecting sensor 9, from the weight sensor(s) 6 and 7, from the heart beat sensor 31, the capacitive sensor 32 and the motion sensor 33 are input to the neural network 25, and the neural network 25 is then trained on this data. More specifically, the neural network 25 adds up the normalized data from the ultrasonic transducers, from the seat track position detecting sensor 10, from the reclining angle detecting sensor 9, from the weight sensor(s) 6 and 7, from the heart beat sensor 31, from the capacitive sensor 32 and from the motion sensor 33 with each data point multiplied by a associated weight according to the conventional neural network process to determine correlation function (step S6).

In this embodiment, 144 data points are appropriately interconnected at 25 connecting points of layer 1, and each data point is mutually correlated through the neural network training and weight determination process. The 144 data points consist of 138 measured data points from the ultrasonic transducers, the data (139th) from the seat track position detecting sensor 10, the data (140th) from the reclining angle detecting sensor 9, the data (141st) from the weight sensor(s) 6, the data ($142^{nd}$) from the heart beat sensor 31, the data ($143^{rd}$) from the capacitive sensor and the data ($144^{th}$) from the motion sensor. Each of the connecting points of the layer 1 has an appropriate threshold value, and if the sum of measured data exceeds the threshold value, each of the connecting points will output a signal to the connecting points of layer 2. Although the weight sensor input is shown as a single input, in general there will be a separate input from each weight sensor used. For example, if we the seat has four seat supports and if a strained measuring element is used on each support, what will be four data inputs to neural network.

The connecting points of the layer 2 comprises 20 points, and the 25 connecting points of the layer 1 are appropriately interconnected as the connecting points of the layer 2. Similarly, each data is mutually correlated through the training process and weight determination as described above and in the above referenced neural network texts. Each of the 20 connecting points of the layer 2 has an appropriate threshold value, and if the sum of measured data exceeds the threshold value, each of the connecting points will output a signal to the connecting points of layer 3.

The connecting points of the layer 3 comprises 3 points, and the connecting points of the layer 2 are interconnected at the connecting points of the layer 3 so that each data is mutually correlated as described above. If the sum of the outputs of the connecting points of layer 2 exceeds a threshold value, the connecting points of the latter 3 will output Logic values (100), (010), and (001) respectively, for example.

The threshold value of each connecting point is determined by multiplying weight coefficients and summing up the results in sequence, and the aforementioned training process is to determine a weight coefficient Wj so that the threshold value (ai) is a previously determined output.

$$ai = \Sigma Wj \cdot Xj \ (j=1 \text{ to } N)$$

wherein
Wj is the weight coefficient,
Xj is the data and
N is the number of samples.

Based on this result of the training, the neural network 25 generates the weights for the coefficients of the correlation function or the algorithm (step S7).

At the time the neural network 25 has learned a suitable number of patterns of the training data, the result of the training is tested by the test data. In the case where the rate of correct answers of the seated-state detecting unit based on this test data is unsatisfactory, the neural network is further trained and the test is repeated. In this embodiment, the test was performed based on about 600,000 test patterns. When the rate of correct test result answers was at about 98%, the training was ended.

The neural network 25 has outputs 25*a*, 25*b* and 25*c*. Each of the outputs 25*a*, 25*b* and 25*c* outputs a signal of logic 0 or 1 to a gate circuit or algorithm 30. Based on the signals from the outputs 25*a*, 25*b* and 25*c*, any one of these combination (100), (010) and (001) is obtained. In another preferred embodiment, all data for the empty seat was removed from the training set and the empty seat case was determined based on the output of the weight sensor alone. This simplifies the neural network and improves its accuracy.

In this embodiment, the output (001) correspond to a vacant seat, a seat occupied by an inanimate object or a seat occupied by a pet (VACANT), the output (010) corresponds to a rear facing child seat (RFCS) or an abnormally seated passenger (ASP), and the output (100) corresponds to a normally seated passenger (NSP) or a forward facing child seat (FFCS).

The gate circuit (seated-state evaluation circuit) 30 can be implemented by an electronic circuit or by a computer algorithm by those skilled in the art and the details will not be presented here. The function of the gate circuit 30 is to remove the ambiguity that sometimes results when ultrasonic sensors and seat position sensors alone are used. This ambiguity is that it is sometimes difficult to differentiate between a rear facing child seat (RFCS) and an abnormally seated passenger (ASP), or between a normally seated passenger (NSP) and a forward facing child seat (FFCS). By the addition of one or more weight sensors in the function of acting as a switch when the weight is above or below 60 lbs., it has been found that this ambiguity can be eliminated. The gate circuit therefore takes into account the output of the neural network and also the weight from the weight sensor(s) as being above or below 60 lbs. and thereby separates the two cases just described and results in five discrete outputs.

Thus, the gate circuit 30 fulfills a role of outputting five kinds of seated-state evaluation signals, based on a combination of three kinds of evaluation signals from the neural network 25 and superimposed information from the weight sensor(s). The five seated-state evaluation signals are input to an airbag deployment determining circuit that is part of the airbag system and will not be described here. Naturally, as disclosed in the above reference patents and patent applications, the output of this system can also be used to activate a variety of lights or alarms to indicate to the operator of the vehicle the seated state of the passenger. Naturally, the system that has been here described for the passenger side is also applicable for the most part for the driver side.

An alternate and preferred method of accomplishing the function performed by the gate circuit is to use a modular neural network. In this case, the first level neural network is trained on determining whether the seat is occupied or vacant. The input to this neural network consists of all of the data points described above. Since the only function of this neural network is to ascertain occupancy, the accuracy of this neural network is very high. If this neural network determines that the seat is not vacant, then the second level neural network determines the occupancy state of the seat.

In this embodiment, although the neural network 25 has been employed as an evaluation circuit, the mapping data of the coefficients of a correlation function may also be implemented or transferred to a microcomputer to constitute the valuation circuit (see Step S8 in FIG. 6).

According to the seated-state detecting unit of the present invention, the identification of a vacant seat (VACANT), a rear facing child seat (RFCS), a forward facing child seat (FFCS), a normally seated adult passenger (NSP), an abnormally seated adult passenger (ASP), can be reliably performed. Based on this identification, it is possible to control a component, system or subsystem in the vehicle. For example, a regulation valve which controls the inflation or deflation of an airbag may be controlled based on the evaluated identification of the occupant of the seat. This regulation valve may be of the digital or analog type. A digital regulation valve is one that is in either of two states, open or closed. The control of the flow is then accomplished by varying the time that the valve is open and closed, i.e., the duty cycle.

Moreover, the seated-state detecting unit described above may be used in a component adjustment system and method described below when the presence of a human being occupying the seat is detected.

The component adjustment system and methods in accordance with the invention automatically and passively adjust the component based on the morphology of the occupant of the seat. As noted above, the adjustment system may include the seated-state detecting unit described above so that it will be activated if the seated-state detecting unit detects that an adult or child occupant is seated on the seat, i.e., the adjustment system will not operate if the seat is occupied by a child seat, pet or inanimate objects. Obviously, the same system can be used for any seat in the vehicle including the driver seat and the passenger seat(s). This adjustment system may incorporate the same components as the seated-state detecting unit described above, i.e., the same components may constitute a part of both the seated-state detecting unit and the adjustment system, e.g., the weight measuring means.

The adjustment system described herein, although improved over the prior art, will at best be approximate since two people, even if they are identical in all other respects, may have a different preferred driving position or other preferred adjusted component location or orientation. A system that automatically adjusts the component, therefore, must learn from its errors. Thus, when a new occupant sits in the vehicle, for example, the system automatically estimates the best location of the component for that occupant and moves the component to that location, assuming it is not already at the best location. If the occupant changes the location, the system must remember that change and incorporate it into the adjustment the next time that person enters the vehicle and is seated in the same seat. Therefore, the system need not make a perfect selection the first time but it must remember the person and the position the component was in for that person. The system, therefore, makes one, two or three measurements of morphological characteristics of the occupant and then adjusts the component based on an algorithm. The occupant will correct the adjustment and the next time that the system measures the same measurements for those measurement characteristics, it will set the component to the corrected position. As such, preferred components for which the system in accordance with the invention is most useful are those which affect a driver of the vehicle and relate to the sensory abilities of the driver, i.e., the mirrors, the seat, the steering wheel and steering column and accelerator, clutch and brake pedals.

The first characteristic used is a measurement of the height of the occupant from the vehicle seat. This can be done by a sensor in the ceiling of the vehicle but this becomes difficult since, even for the same seat location, the head of the occupant will not be at the same angle with respect to the seat and therefore the angle to a ceiling—mounted sensor is in general unknown at least as long as only one ceiling mounted sensor is used. This problem can be solved if two or three sensors are used as described in more detail below. The simplest implementation is to place the sensor in the seat. In the '320 patent mentioned above, a rear impact occupant protection apparatus is disclosed which uses sensors mounted within the headrest. This same system can also be used to measure the height of the occupant from the seat and thus, for no additional cost assuming the rear impact occupant protection system described in the '320 patent is provided, the first measure of the occupant's morphology can be achieved. For some applications, this may be sufficient since it is unlikely that two operators will use the vehicle that have the same height. For other implementations, one or more additional measurements are used.

Figure 8:
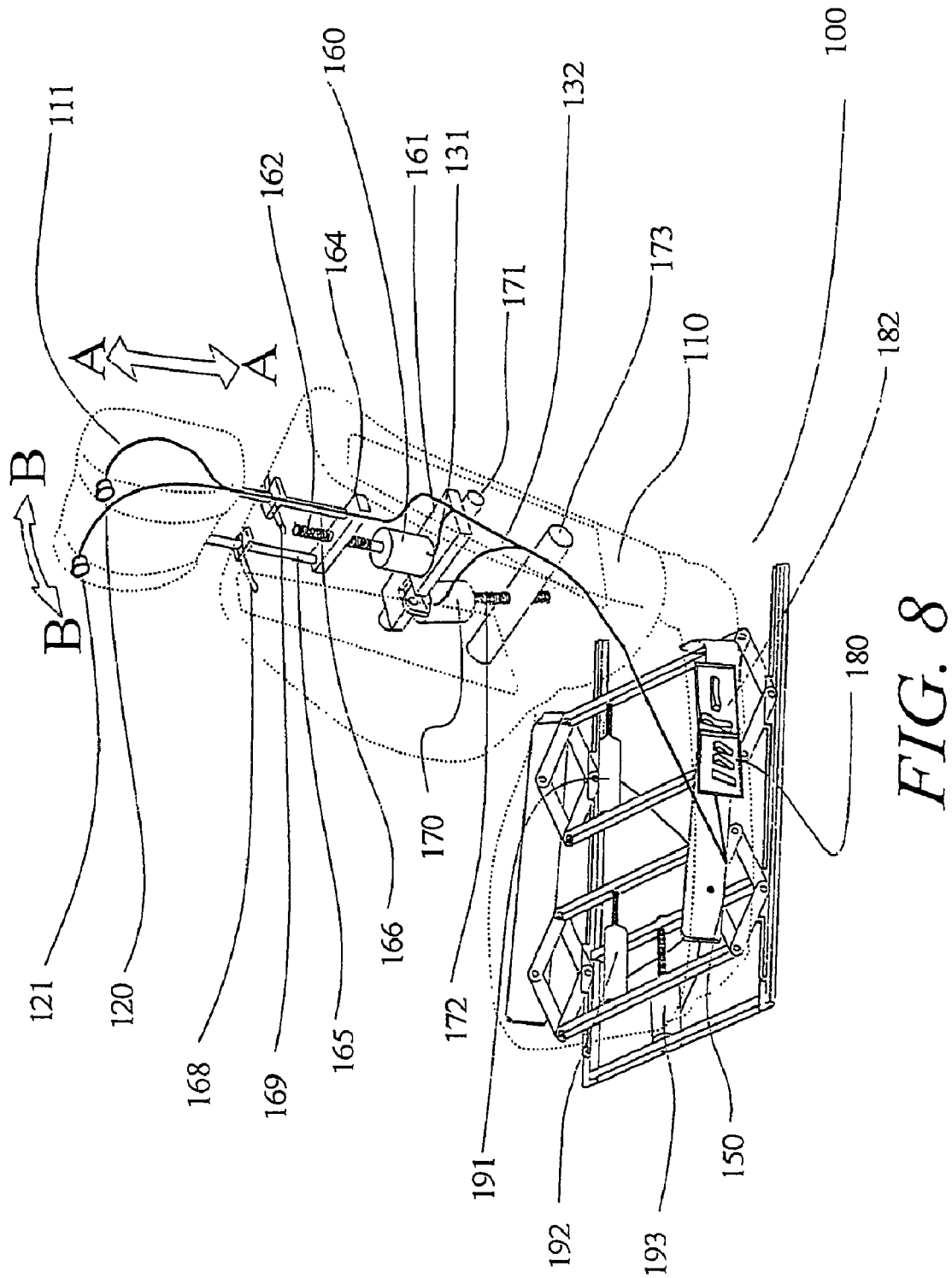
FIG. 8 is a perspective view of an automatic seat adjustment system, with the seat shown in phantom, with a movable headrest and sensors for measuring the height of the occupant from the vehicle seat showing motors for moving the seat and a control circuit connected to the sensors and motors.

Referring now to FIG. 8, an automatic adjustment system for adjusting a seat (which is being used only as an example of a vehicle component) is shown generally at 100 with a movable headrest 111 and ultrasonic sensor 120 and ultrasonic receiver 121 for measuring the height of the occupant of the seat. Power means such as motors 191, 192, and 193 connected to the seat for moving the base of the seat, control means such as a control circuit, system or module 150 connected to the motors and a headrest actuation mechanism using servomotors 160 and 170, which may be servomotors, are also illustrated. The seat 110 and headrest 111 are shown in phantom. Vertical motion of the headrest 111 is accomplished when a signal is sent from control module 150 to servomotor 160 through a wire 131. Servomotor 160 rotates lead screw 162 which engages with a threaded hole in member 164 causing it to move up or down depending on the direction of rotation of the lead screw 162. Headrest support rods 165 and 166 are attached to member 164 and cause the headrest 111 to translate up or down with member 164. In this manner, the vertical position of the headrest can be controlled as depicted by arrow A-A. Ultrasonic transmitter and receiver 120,121 may be replaced by other appropriate wave-generating and receiving devices, such as electromagnetic, active infrared transmitters and receivers.

Wire 132 leads from control module 150 to servomotor 170 which rotates lead screw 172. Lead screw 172 engages with a threaded hole in shaft 173 which is attached to supporting structures within the seat shown in phantom. The rotation of lead screw 172 rotates servo motor support 161, upon which servomotor 160 is situated, which in turn rotates headrest support rods 165 and 166 in slots 168 and 169 in the seat 110. Rotation of the servomotor support 161 is facilitated by a rod 171 upon which the servo motor support 161 is positioned. In this manner, the headrest 111 is caused to move in the fore and aft direction as depicted by arrow B-B. Naturally, there are other designs which accomplish the same effect in moving the headrest up and down and fore and aft.

The operation of the system is as follows. When an adult or child occupant is seated on a seat containing the headrest and control system described above as determined by the neural network 25, the ultrasonic transmitter 120 emits ultrasonic energy which reflects off of the head of the occupant and is received by receiver 121. An electronic circuit in control module 150 contains a microprocessor which determines the distance from the head of the occupant based on the time between the transmission and reception of an ultrasonic pulse. Control module 150 may be within the same microprocessor as neural network 25 or separate therefrom. The headrest 111 moves up and down until it finds the top of the head and then the vertical position closest to the head of the occupant and then remains at that position. Based on the time delay between transmission and reception of an ultrasonic pulse, the system can also determine the longitudinal distance from the headrest to the occupant's head. Since the head may not be located precisely in line with the ultrasonic sensors, or the occupant may be wearing a hat, coat with a high collar, or may have a large hairdo, there may be some error in this longitudinal measurement.

When an occupant sits on seat 110, the headrest 111 moves to find the top of the occupant's head as discussed above. This is accomplished using an algorithm and a microprocessor which is part of control circuit 150. The headrest 111 then moves to the optimum location for rear impact protection as described in the above referenced '320 patent. Once the height of the occupant has been measured, another algorithm in the microprocessor in control circuit 150 compares the occupant's measured height with a table representing the population as a whole and from this table, the appropriate positions for the seat corresponding to the occupant's height is selected. For example, if the occupant measured 33 inches from the top of the seat bottom, this might correspond to a 85% human, depending on the particular seat and statistical tables of human measurements.

Careful study of each particular vehicle model provides the data for the table of the location of the seat to properly position the eyes of the occupant within the "eye-ellipse", the steering wheel within a comfortable reach of the occupant's hands and the pedals within a comfortable reach of the occupant's feet, based on his or her size, etc.

Once the proper position has been determined by control circuit 150, signals are sent to motors 191, 192, and 193 to move the seat to that position, if such movement is necessary. That is, it is possible that the seat will be in the proper position so that movement of the seat is not required. As such, the position of the motors 191,192,193 and/or the position of the seat prior to occupancy by the occupant may be stored in memory so that after occupancy by the occupant and determination of the desired position of the seat, a comparison is made to determine whether the desired position of the seat deviates from the current position of the seat. If not, movement of the seat is not required. Otherwise, the signals are sent by the control circuit 150 to the motors. In this case, control circuit 150 would encompass a seat controller.

Instead of adjusting the seat to position the driver in an optimum driving position, or for use when adjusting the seat of a passenger, it is possible to perform the adjustment with a view toward optimizing the actuation or deployment of an occupant protection or restraint device. For example, after obtaining one or more morphological characteristics of the occupant, the processor can analyze them and determine one or more preferred positions of the seat, with the position of the seat being related to the position of the occupant, so that if the occupant protection device is deployed, the occupant will be in an advantageous position to be protected against injury by such deployment. In this case then, the seat is adjusted based on the morphology of the occupant view a view toward optimizing deployment of the occupant protection device. The processor is provided in a training or programming stage with the preferred seat positions for different morphologies of occupants.

Movement of the seat can take place either immediately upon the occupant sitting in the seat or immediately prior to a crash requiring deployment of the occupant protection device. In the latter case, if an anticipatory sensing arrangement is used, the seat can be positioned immediately prior to the impact, much in a similar manner as the headrest is adjusted for a rear impact as disclosed in the '320 patent referenced above.

If during some set time period after the seat has been positioned, the operator changes these adjustments, the new positions of the seat are stored in association with an occupant height class in a second table within control circuit 150. When the occupant again occupies the seat and his or her height has once again been determined, the control circuit 150 will find an entry in the second table which takes precedence over the basic, original table and the seat returns to the adjusted position. When the occupant leaves the vehicle, or even when the engine is shut off and the door opened, the seat can be returned to a neutral position which provides for easy entry and exit from the vehicle.

Figure 17A:
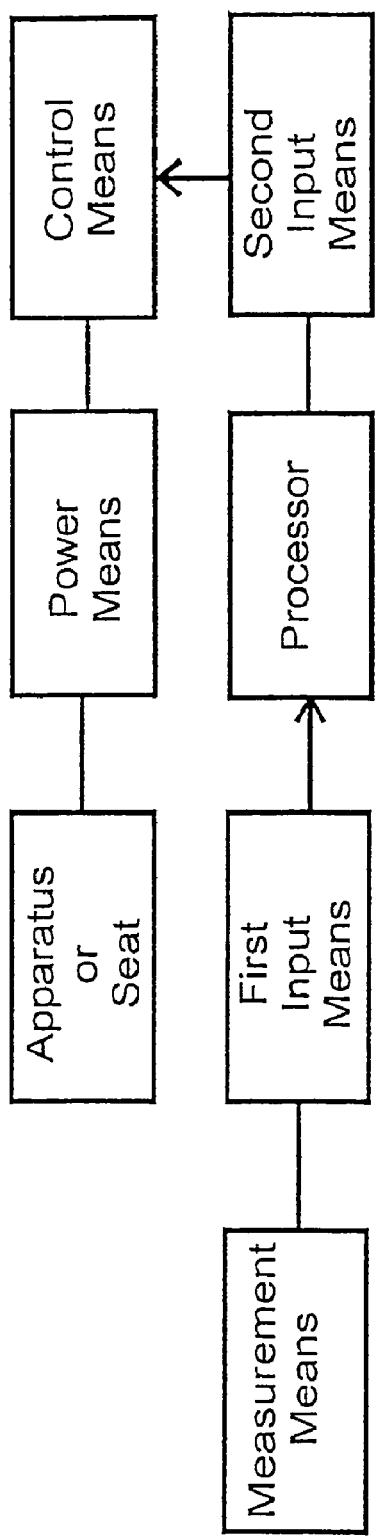
FIG. 17A is a schematic drawing of the basic embodiment of the adjustment system in accordance with the invention.
Figure 17B:
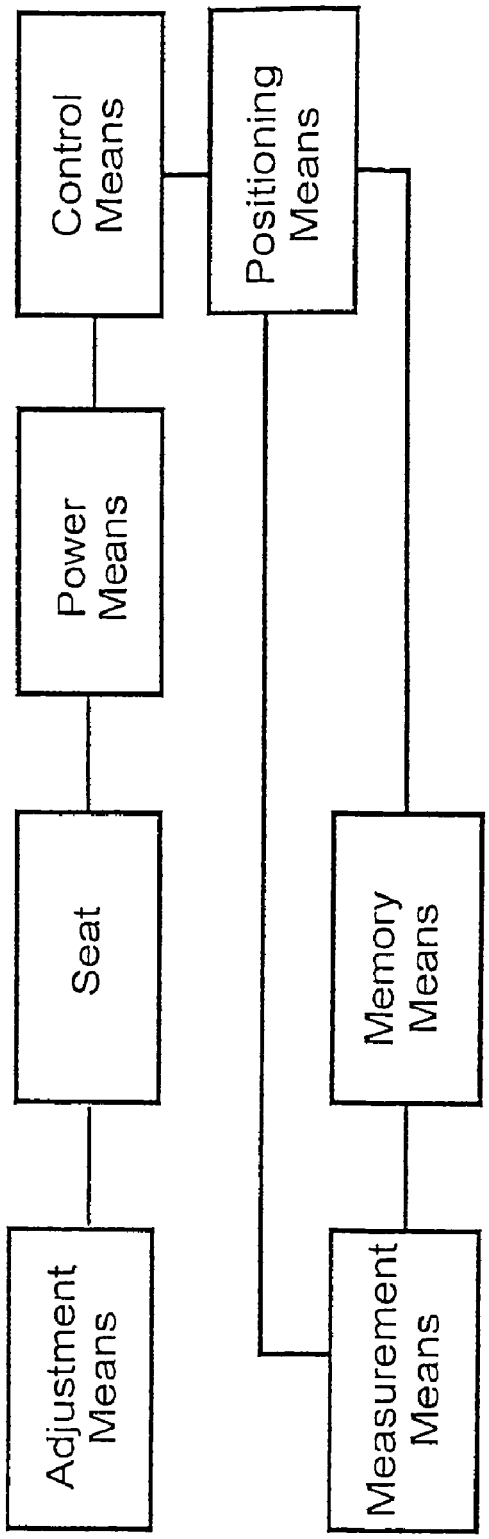
FIG. 17B is a schematic drawing of another basic embodiment of the adjustment system in accordance with the invention.

The seat 110 also contains two control switch assemblies 180 and 182 for manually controlling the position of the seat 110 and headrest 111. The seat control switches 180 permit the occupant to adjust the position of the seat if he or she is dissatisfied with the position selected by the algorithm. The headrest control switches 182 permit the occupant to adjust the position of the headrest in the event that the calculated position is uncomfortably close to or far from the occupant's head. A woman with a large hairdo might find that the headrest automatically adjusts so as to contact her hairdo. This adjustment she might find annoying and could then position the headrest further from her head. For those vehicles which have a seat memory system for associating the seat position with a particular occupant, which has been assumed above, the position of the headrest relative to the occupant's head could also be recorded. Later, when the occupant enters the vehicle, and the seat automatically adjusts to the recorded preference, the headrest will similarly automatically adjust (FIG. 17B).

Figure 9:
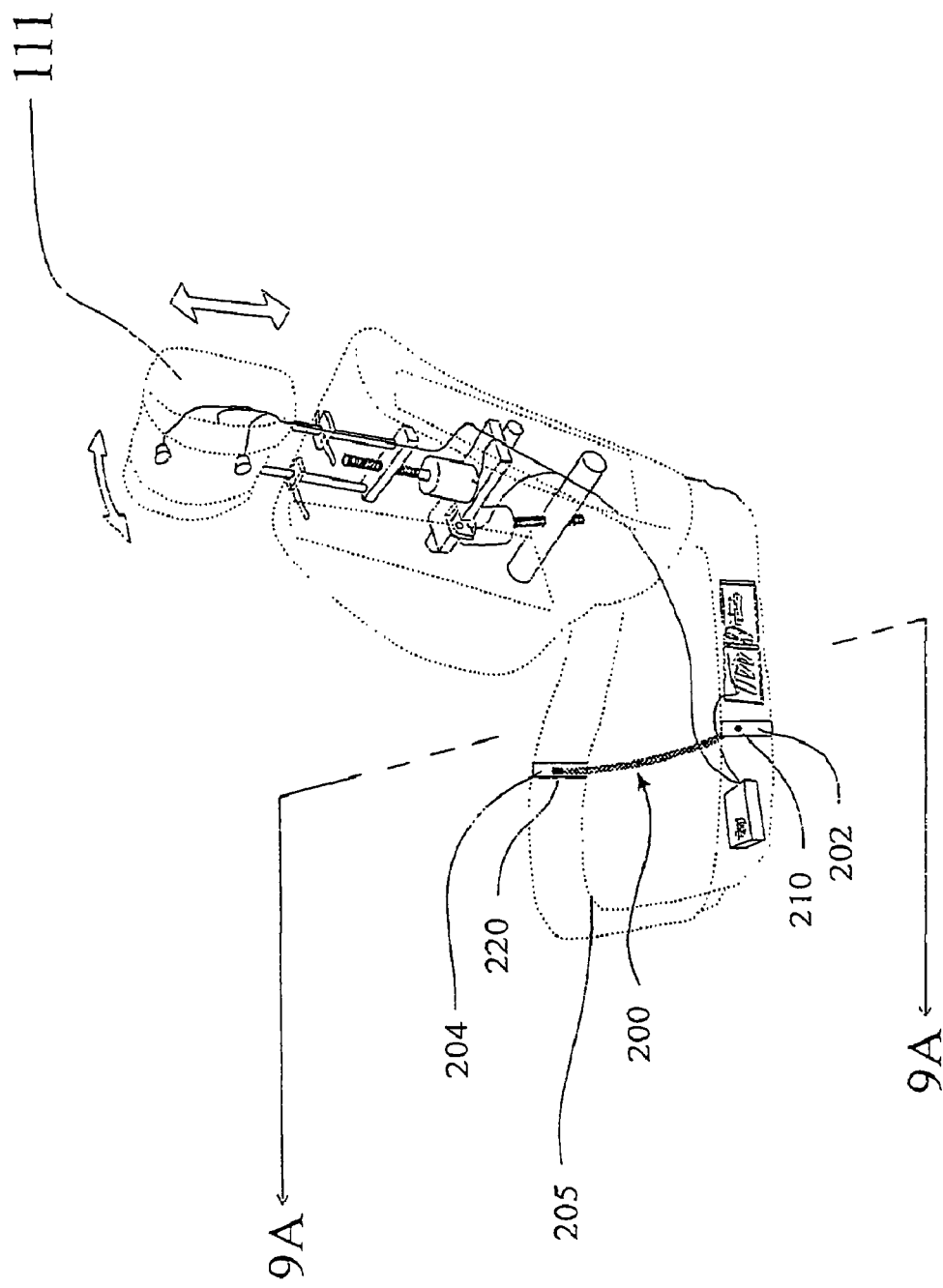
FIG. 9 is a perspective view of the seat shown in FIG. 8 with the addition of a weight sensor shown mounted onto the seat.

The height of the occupant, although probably the best initial morphological characteristic, may not be sufficient especially for distinguishing one driver from another when they are approximately the same height. A second characteristic, the occupant's weight, can also be readily determined from sensors mounted within the seat in a variety of ways as shown in FIG. 9 which is a perspective view of the seat shown in FIG. 8 with a displacement or weight sensor 200 shown mounted onto the seat. Displacement sensor 200 is supported from supports 202 and 204. In general, displacement sensor 200, or another non-displacement sensor, measures a physical state of a component affected by the occupancy of the seat. An occupying item of the seat will cause a force to be exerted downward and the magnitude of this force is representative of the weight of the occupying item. Thus, by measuring this force, information about the weight of the occupying item can be obtained. A physical state may be any force changed by the occupancy of the seat and which is reflected in the component, e.g., strain of a component, compression of a component, tension of a component.

Figure 9A:
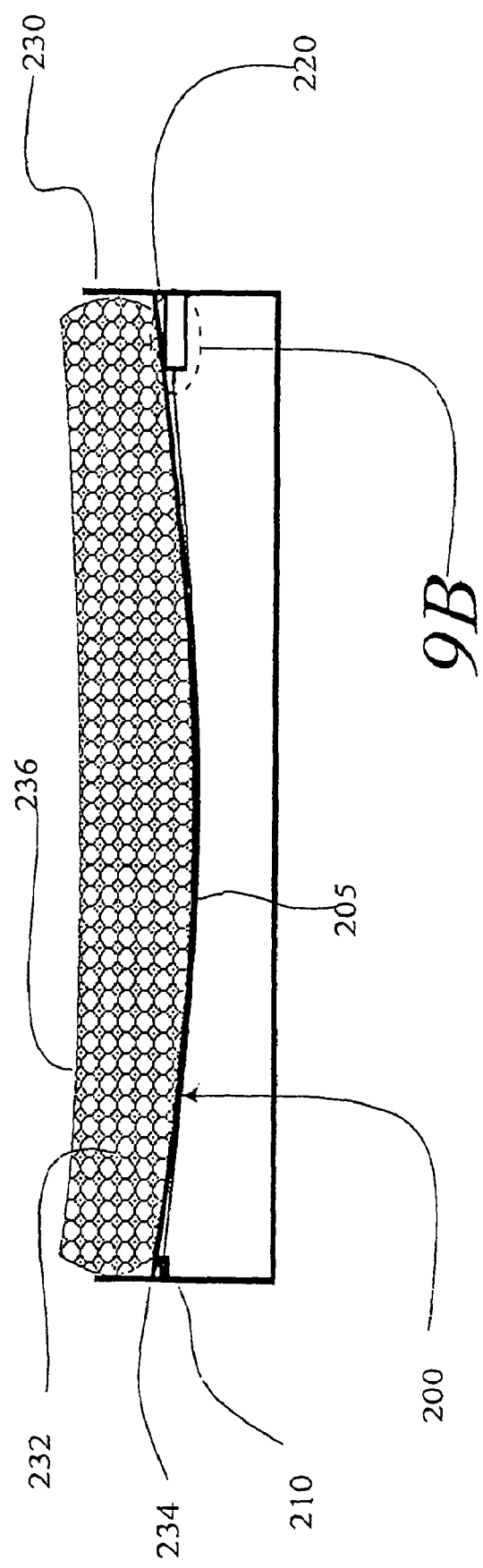
FIG. 9A is a view taken along line 9A-9A in FIG. 9.
Figure 9B:
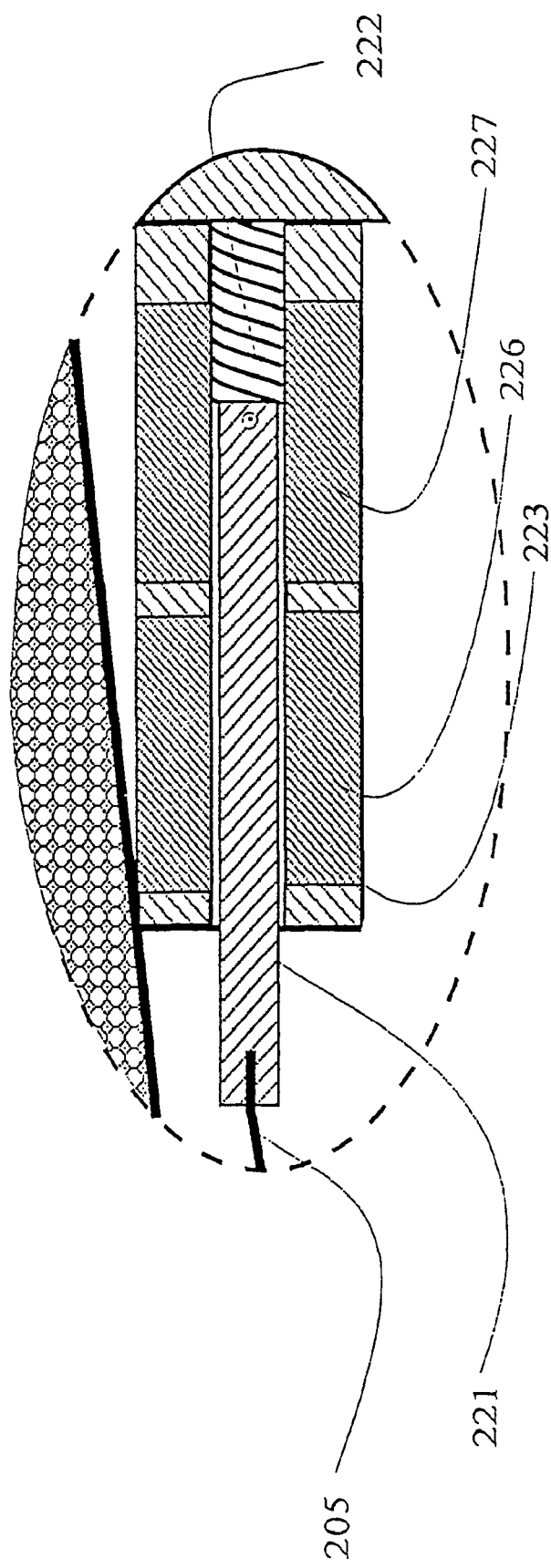
FIG. 9B is an enlarged view of the section designated 9B in FIG. 9A.
Figure 9C:
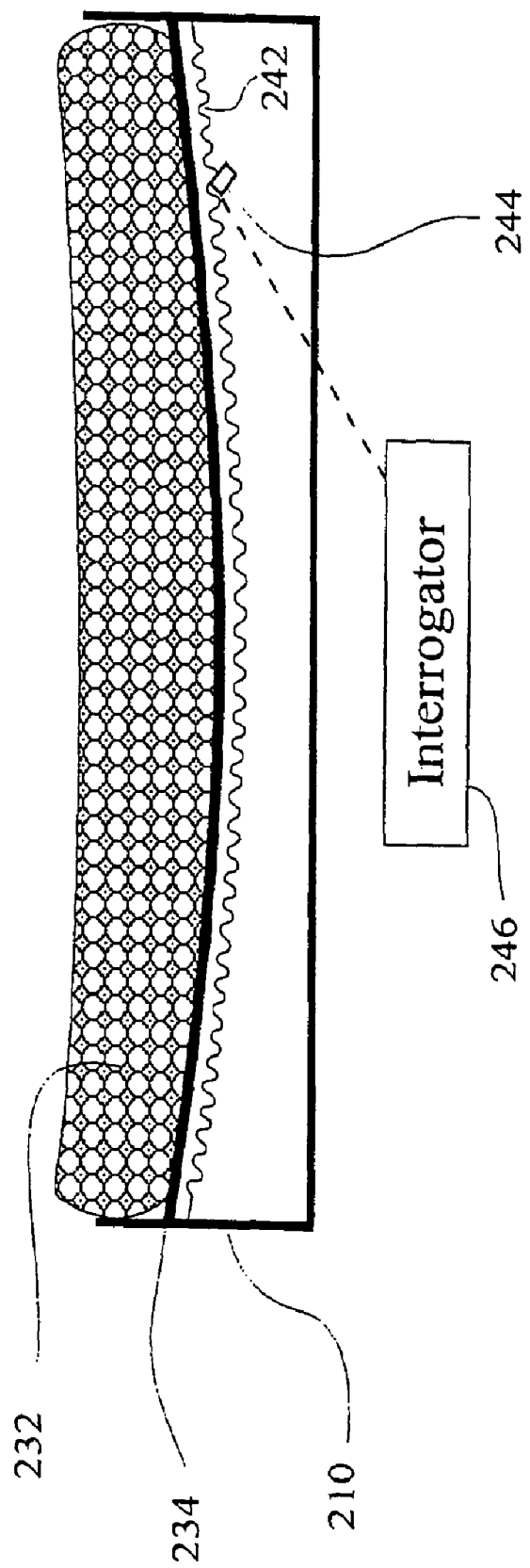
FIG. 9C is a view of another embodiment of a seat with a weight sensor similar to the view shown in FIG. 9A.

Referring now to FIG. 9A, which is a view of the apparatus of FIG. 9 taken along line 9A-9A, seat 230 is constructed from a cushion or foam layer 232 which is supported by a spring system 234 which is in contact and/or association with the displacement sensor 200. As shown, displacement sensor 200 is underneath the spring system 234 but this relative positioning is not a required feature of the invention. The displacement sensor 200 comprises an elongate cable 205 retained at one end by support 210 and a displacement sensor 220 situated at an opposite end. This displacement sensor 220 can be any of a variety of such devices including, but not limited to, a linear rheostat, a linear variable differential transformer (LVDT), a linear variable capacitor, or any other length measuring device. Alternately, as shown in FIG. 9C, the cable can be replaced with one or more springs 242 retained between supports 210 and the tension in the spring measured using a strain gage (conventional wire or foil or a SAW strain gage) or other force measuring device 244 or the strain in the seat support structure can be measured by appropriately placing strain gages on one or more of the seat supports as described in more detail below. The strain gage or other force measuring device could be arranged in association with the spring system 234 and could measure the deflection of the bottom surface of the cushion or foam layer 232.

When a SAW strain gage 244 is used as part of weight sensor 200, an interrogator 246 could be placed on the vehicle to enable wireless communication and/or power transfer to the SAW strain gage 244. As such, when it is desired to obtain the force being applied by the occupying item on the seat, the interrogator 246 sends a radio signal to the SAW strain gage causing it to transmit a return signal with the measured strain of the spring 242. Interrogator 246 is coupled to the processor used to determine the control of the vehicle component.

Figure 9D:
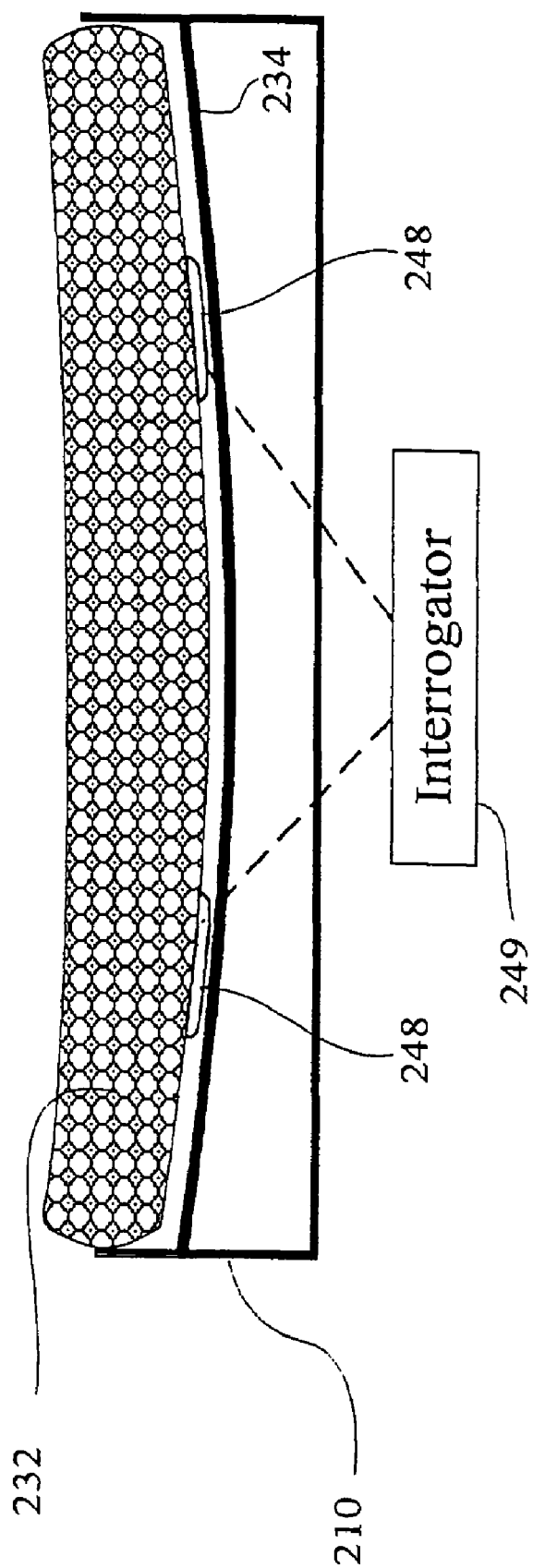
FIG. 9D is a view of another embodiment of a seat with a weight sensor in which a SAW strain gage is placed on the bottom surface of the cushion.

As shown in FIG. 9D, one or more SAW strain gages 248 could also be placed on the bottom surface of the cushion or foam layer 232 in order to measure the deflection of the bottom surface which is representative of the weight of the occupying item to the seat. An interrogator 249 could also be used in this embodiment.

One seat design is illustrated in FIG. 9. Similar weight measurement systems can be designed for other seat designs. Also, some products are available which can approximately measure weight based on pressure measurements made at or near the upper seat surface 236. It should be noted that the weight measured here will not be the entire weight of the occupant since some of the occupant's weight will be supported by his or her feet which are resting on the floor or pedals. As noted above, the weight may also be measured by the weight sensor(s) 6 and 7 described above in the seated-state detecting unit.

As weight is placed on the seat surface 236, it is supported by spring 234 which deflects downward causing cable 205 of the sensor 200 to begin to stretch axially. Using a LVDT as an example of length measuring device 220, the cable 205 pulls on rod 221 tending to remove rod 221 from cylinder 223 (FIG. 9B). The movement of rod 221 out of cylinder 223 is resisted by a spring 222 which returns the rod 221 into the cylinder 223 when the weight is removed from the seat surface 236. The amount which the rod 221 is removed from the cylinder 223 is measured by the amount of coupling between the windings 226 and 227 of the transformer as is well understood by those skilled in the art. LVDT's are commercially available devices. In this matter, the deflection of the seat can be measured which is a measurement of the weight on the seat. The exact relationship between weight and LVDT output is generally determined experimentally for this application.

SAW strain gages could also be used to determine the downward deflection of the spring 234 and the deflection of the cable 205.

By use of a combination of weight and height, the driver of the vehicle can in general be positively identified among the class of drivers who operate the vehicle. Thus, when a particular driver first uses the vehicle, the seat will be automatically adjusted to the proper position. If the driver changes that position within a prescribed time period, the new seat position will be stored in the second table for the particular driver's height and weight. When the driver reenters the vehicle and his or her height and weight are again measured, the seat will go to the location specified in the second table if one exists. Otherwise, the location specified in the first table will be used.

The system described above is based on the assumption that the occupant will be satisfied with one seat position throughout an extended driving trip. Studies have shown that for extended travel periods that the comfort of the driver can be improved through variations in the seat position. This variability can be handled in several ways. For example, the amount and type of variation preferred by an occupant of the particular morphology can be determined through case studies and focus groups. If it is found, for example, that the 50 percentile male driver prefers the seat back angle to vary by 5 degrees sinusodially with a one-hour period, this can be programmed to the system. Since the system knows the morphology of the driver it can decide from a lookup table what is the best variability for the average driver of that morphology. The driver then can select from several preferred possibilities if, for example, he or she wishes to have the seat back not move at all or follow an excursion of 10 degrees over two hours.

This system provides an identification of the driver based on two morphological characteristics which is adequate for most cases. As additional features of the vehicle interior identification and monitoring system described in the above referenced patent applications are implemented, it will be possible to obtain additional morphological measurements of the driver which will provide even greater accuracy in driver identification. Two characteristics may not be sufficient to rely on for theft and security purposes, however, many other driver preferences can still be added to seat position with this level of occupant recognition accuracy. These include the automatic selection of a preferred radio station, vehicle temperature, steering wheel and steering column position, etc.

One advantage of using only the height and weight is that it avoids the necessity of the seat manufacturer from having to interact with the headliner manufacturer, or other component suppliers, since all of the measuring transducers are in the seat. This two characteristic system is generally sufficient to distinguish drivers that normally drive a particular vehicle. This system costs little more than the memory systems now in use and is passive, i.e., it does not require action on the part of the occupant after his initial adjustment has been made.

Instead of measuring the height and weight of the occupant, it is also possible to measure a combination of any two morphological characteristics and during a training phase, derive a relationship between the occupancy of the seat, e.g., adult occupant, child occupant, etc., and the data of the two morphological characteristic. This relationship may be embodied within a neural network so that during use, by measuring the two morphological characteristics, the occupancy of the seat can be determined.

Figure 10:
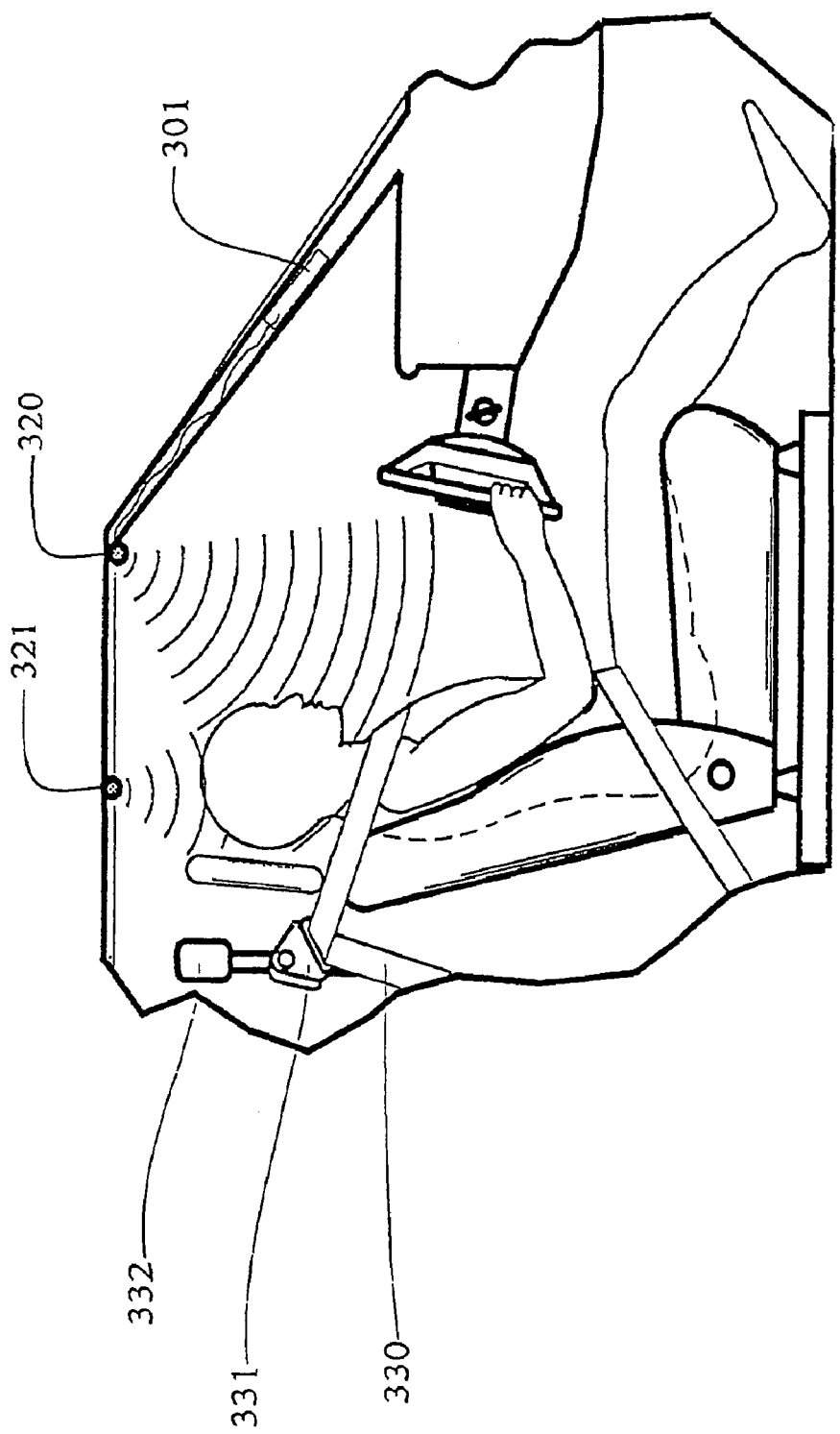
FIG. 10 is a side plan view of the interior of an automobile, with portions cut away and removed, with two occupant height measuring sensors, one mounted into the headliner above the occupant's head and the other mounted onto the A-pillar and also showing a seatbelt associated with the seat wherein the seatbelt has an adjustable upper anchorage point which is automatically adjusted based on the height of the occupant.

Naturally, there are other methods of measuring the height of the driver such as placing the transducers at other locations in the vehicle. Some alternatives are shown in FIG. 10 which is a side plan view wherein two height measuring sensors 320, 321 are shown, sensor 321 being mounted into the headliner above the occupant's head and the other sensor 320 being mounted onto the A-pillar. A sensor as used herein is the combination of two transducers (a transmitter and a receiver) or one transducer which can both transmit and receive. The headliner is the trim which provides the interior surface to the roof of the vehicle and the A-pillar is the roof-supporting member which is on either side of the windshield and on which the front doors are hinged. These transducers may already be present because of other implementations of the vehicle interior identification and monitoring system described in the above referenced patent applications. In this case, the use of both transducers provides a more accurate determination of location of the head of the driver. Using transducer 321 alone, the exact position of the head is ambiguous since the transducer measures the distance to the head regardless of what direction the head is. By knowing the distance from the head to transducer 320, the ambiguity is substantially reduced. This argument is of course dependent on the use of ultrasonic transducers. Optical transducers using CCD or CMOS arrays are now becoming price competitive and, as pointed out in the above referenced patent applications, will be the technology of choice for interior vehicle monitoring. A single CCD array of 160 by 160 pixels, for example, coupled with the appropriate pattern recognition software, can be used to form an image of the head of an occupant and accurately locate the head for the purposes of this invention.

FIG. 10 also illustrates a system where the seatbelt 330 has an adjustable upper anchorage point 331 which is automatically adjusted by a motor 332 to a location optimized based on the height of the occupant. The calculations for this feature and the appropriate control circuitry can also be located in control module 301 or elsewhere if appropriate.

Figure 11:
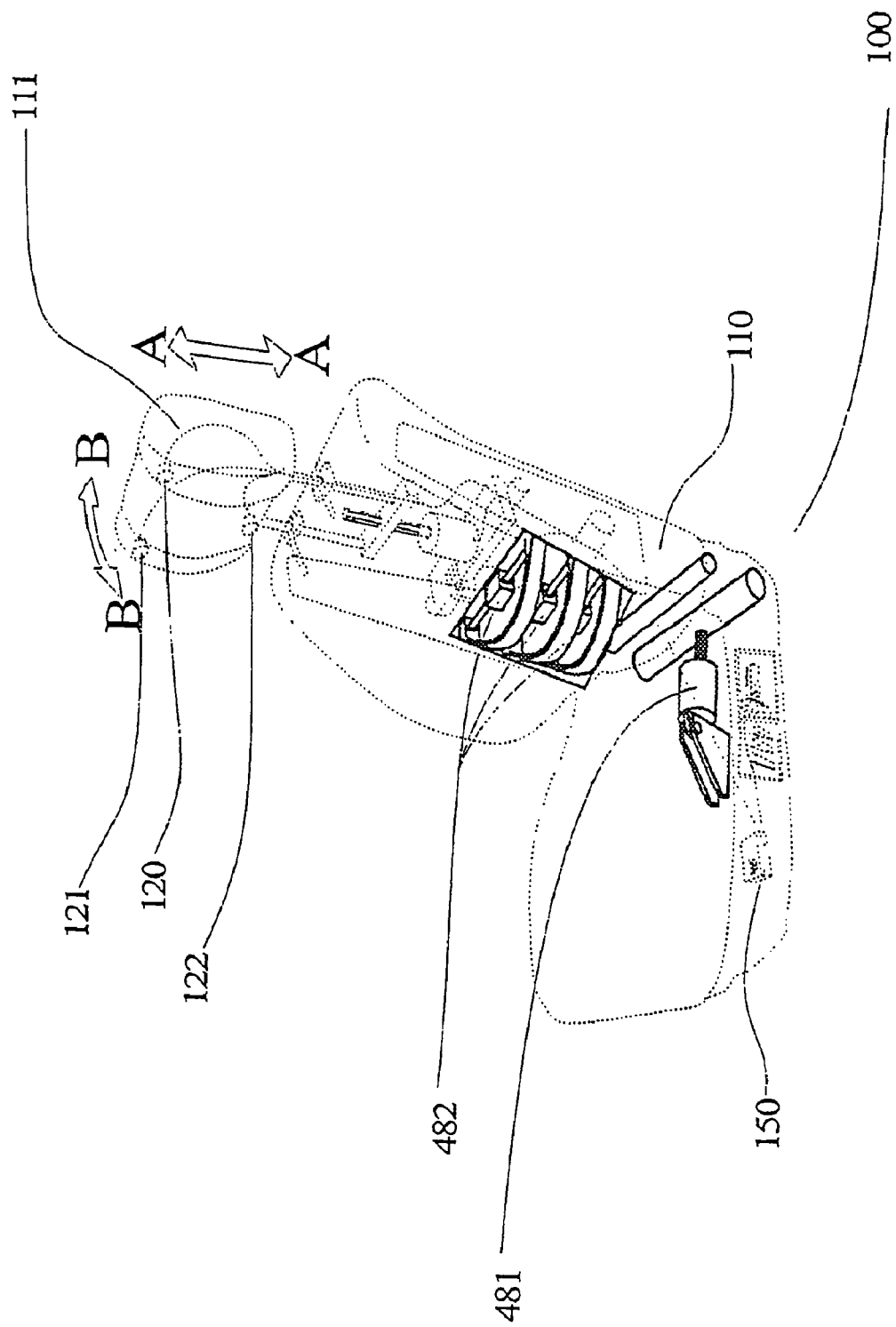
FIG. 11 is a view of the seat of FIG. 8 showing motors for changing the tilt of seat back and the lumbar support.

Many luxury automobiles today have the ability to control the angle of the seat back as well as a lumbar support. These additional motions of the seat can also be controlled by the seat adjustment system in accordance with the invention. FIG. 11 is a view of the seat of FIG. 8 showing motors 481 and 482 for changing the tilt of the seat back and the lumbar support. Three motors 482 are used to adjust the lumbar support in this implementation. The same procedure is used for these additional motions as described for FIG. 8 above.

An initial table is provided based on the optimum positions for various segments of the population. For example, for some applications the table may contain a setting value for each five percentile of the population for each of the 6 possible seat motions, fore and aft, up and down, total seat tilt, seat back angle, lumbar position, and headrest position for a total of 120 table entries. The second table similarly would contain the personal preference modified values of the 6 positions desired by a particular driver.

In FIG. 8, the ultrasonic transducers 120 and 121 were described as one being a transmitter and the other being a receiver. For some applications, it is desirable to use both transducers as both transducers and receivers. Similarly, a third combination transmitter and receiver 122 may also be utilized as shown in FIG. 11. This arrangement permits many of the advantages of a phased array system to be achieved.

The angular resolution of a transducer is proportional to the ratio of the wavelength to the diameter of the transmitter. Once three transmitters and receivers are used, the approximate equivalent single transmitter and receiver is one which has a diameter approximately equal to the shortest distance between any pair of transducers. In this case, the equivalent diameter is equal to the distance between transmitter 120 or 121 and 122. This provides far greater resolution and, by controlling the phase between signals sent by the transmitters, the direction of the equivalent ultrasonic beam can be controlled. Thus, the head of the driver can be scanned with great accuracy and a map made of the occupant's head. Using this technology plus an appropriate pattern recognition algorithm, such as a neural network, an accurate location of the driver's head can be found even when the driver's head is partially obscured by a hat, coat, or hairdo. This also provides at least one other identification morphological characteristic which can be used to further identify the occupant, namely the diameter of the driver's head.

With knowledge of the weight of an occupant, additional improvements can be made to automobile and truck seat designs. In particular, the stiffness of the seat can be adjusted so as to provide the same level of comfort for light and for heavy occupants. The damping of occupant motions, which heretofore has been largely neglected, can also be readily adjusted as shown on FIG. 12 which is a view of the seat of FIG. 8 showing one of several possible arrangements for changing the stiffness and the damping of the seat. In the seat bottom 520, there is a container 515, the conventional foam and spring design has been replaced by an inflated rectangular container very much like an air mattress which contains a cylindrical inner container 518 which is filled with an open cell urethane foam. An adjustable orifice 525 connects the two container 515,518 so that air can flow in a controlled manner therebetween. The amount of opening of orifice 525 is controlled by control circuit 150. A small air compressor 555 controls the pressure in container 515 under control of the control circuit 150. A pressure transducer 560 monitors the pressure within container 515 and inputs this information into control circuit 150.

The operation of the system is as follows. When an occupant sits on the seat, pressure initially builds up in the seat container 515 which gives an accurate measurement of the weight of the occupant. Control circuit 150, using an algorithm and a microprocessor, then determines an appropriate stiffness for the seat and adds pressure to achieve that stiffness. The pressure equalizes between the two containers 515 and 518 through the flow of air through orifice 525. Control circuit 150 also determines an appropriate damping for the occupant and adjusts the orifice 525 to achieve that damping. As the vehicle travels down the road and the road roughness causes the seat to move up and down, the inertial force on the seat by the occupant causes the air pressure to rise and fall in container 518 and also, but, much less so, in container 515 since the occupant sits mainly above container 518 and container 515 is much larger than container 518. The major deflection in the seat takes place first in container 518 which pressurizes and transfers air to container 515 through orifice 525. The size of the orifice opening determines the flow rate between the two containers and therefore the damping of the motion of the occupant. Since this opening is controlled by control circuit 150, the amount of damping can thereby also be controlled. Thus, in this simple structure, both the stiffness and damping can be controlled to optimize the seat for a particular driver. Naturally, if the driver does not like the settings made by control circuit 150, he or she can change them to provide a stiffer or softer ride.

The stiffness of a seat is the change in force divided by the change in deflection. This is important for many reasons, one of which is that it controls the natural vibration frequency of the seat occupant combination. It is important that this be different from the frequency of vibrations which are transmitted to the seat from the vehicle in order to minimize the up and down motions of the occupant. The damping is a force which opposes the motion of the occupant and which is dependent on the velocity of relative motion between the occupant and the seat bottom. It thus removes energy and minimizes the oscillatory motion of the occupant. These factors are especially important in trucks where the vibratory motions of the driver's seat, and thus the driver, have caused many serious back injuries among truck drivers.

Figure 12:
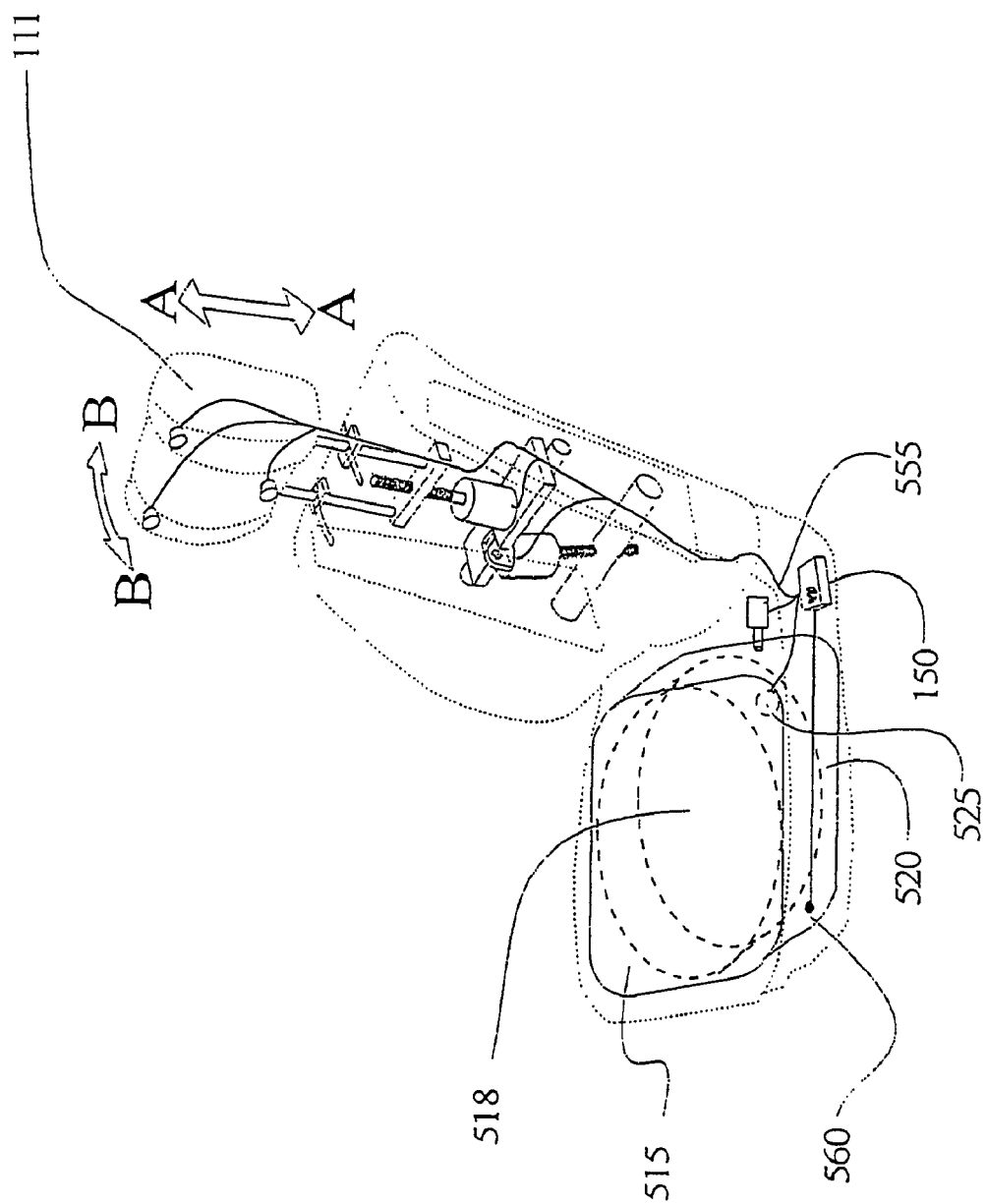
FIG. 12 is a view of the seat of FIG. 8 showing a system for changing the stiffness and the damping of the seat.

In FIG. 12, the airbag or bladder 515 which interacts with the occupant is shown with a single chamber. Naturally, bladder 515 can be composed of multiple chambers 515a, 515b, 515c, and 515d as shown in FIG. 12A. The use of multiple chambers permits the weight distribution of the occupant to be determined if a separate pressure transducer is used in each cell of the bladder. Such a scheme gives the opportunity of determining to some extent the position of the occupant on the seat or at least the position of the center of gravity of the occupant. Naturally, more than four cells could be used.

In the description above, the air was use as the fluid to fill the bladder 515. In some cases, especially where damping and natural frequency control is not needed, another fluid such as a liquid or jell could be used to fill the bladder.

Figure 13:
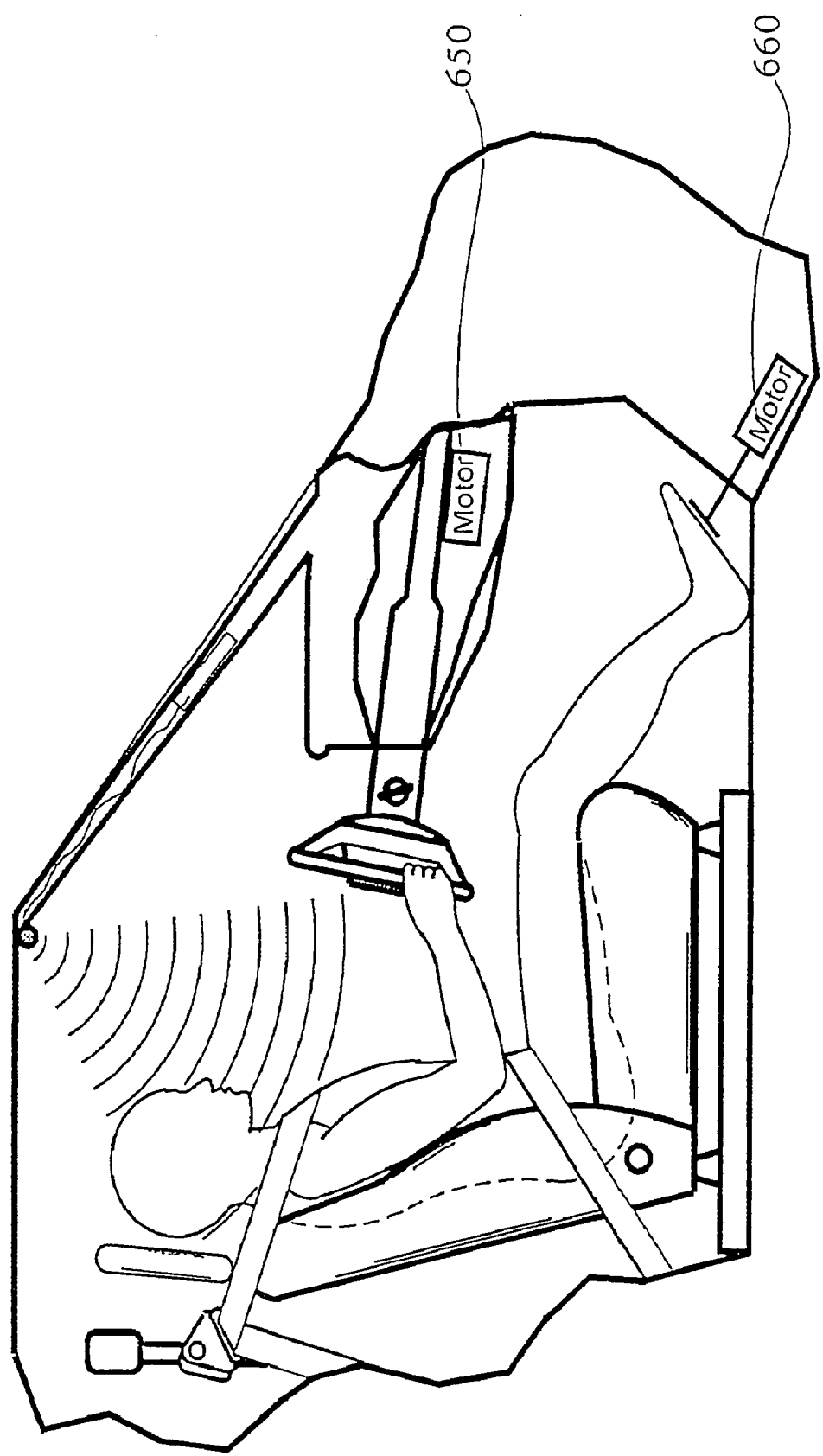
FIG. 13 is a view as in FIG. 10 showing a driver and driver seat with an automatically adjustable steering column and pedal system which is adjusted based on the morphology of the driver.

In an automobile, there is an approximately fixed vertical distance between the optimum location of the occupant's eyes and the location of the pedals. The distant from a driver's eyes to his or her feet, on the other hand, is not the same for all people. An individual driver now compensates for this discrepancy by moving the seat and by changing the angle between his or hers legs and body. For both small and large drivers, this discrepancy cannot be fully compensated for and as a result, their eyes are not appropriately placed. A similar problem exists with the steering wheel. To help correct these problems, the pedals and steering column should be movable as illustrated in FIG. 13 which is a plan view similar to that of FIG. 10 showing a driver and driver seat with an automatically adjustable steering column and pedal system which is adjusted based on the morphology of the driver. In FIG. 13, a motor 650 is connected to and controls the position of the steering column and another motor 660 is connected to and controls the position of the pedals. Both motors 650,660 are coupled to and controlled by control circuit 150 wherein now the basic table of settings includes values for both the pedals and steering column locations.

Figure 14:
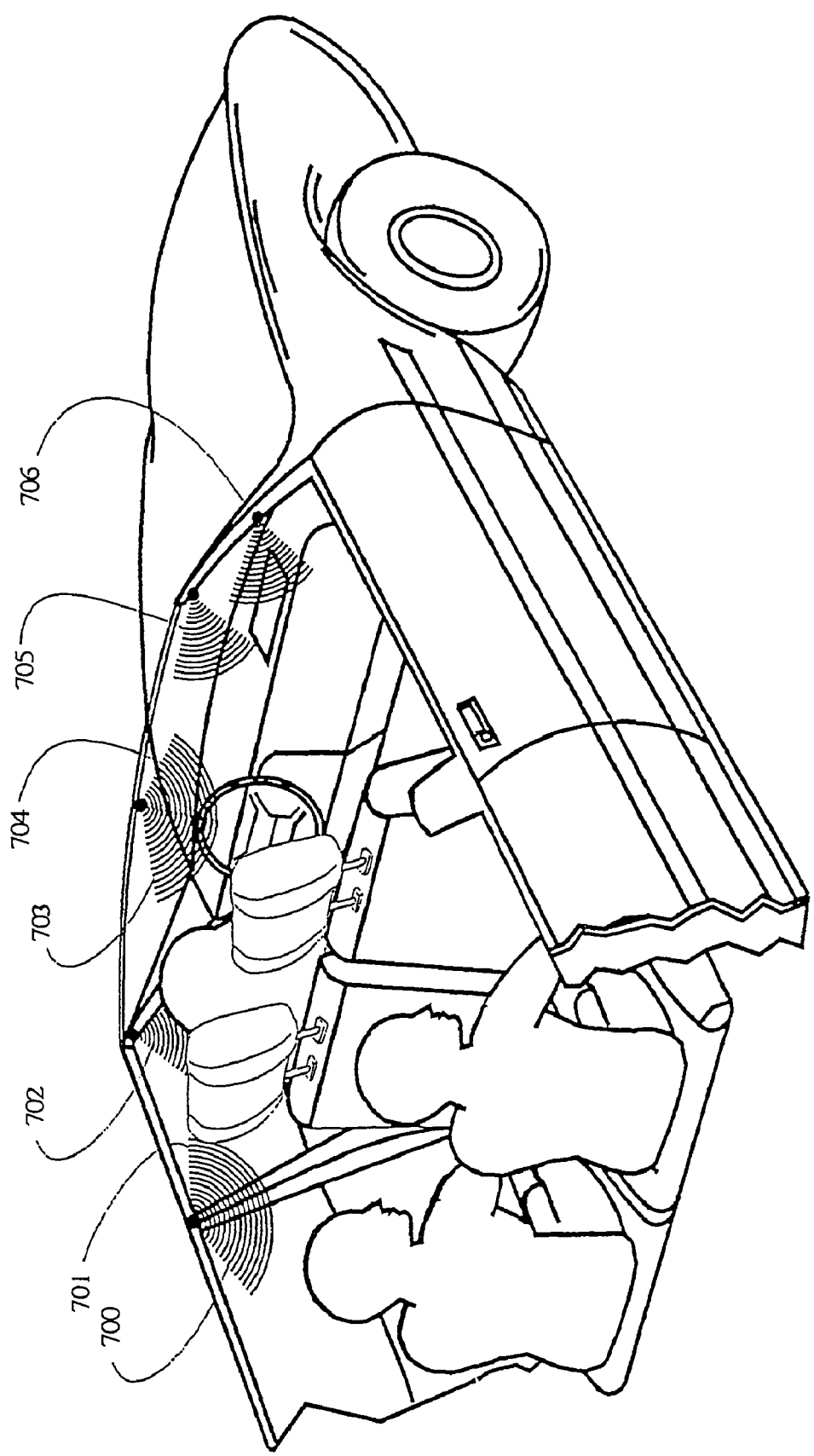
FIG. 14 is a perspective view of the interior of the passenger compartment of an automobile, with parts cut away and removed, showing a variety of transmitters that can be used in a phased array system.

As various parts of the vehicle interior identification and monitoring system described in the above reference patent applications are implemented, a variety of transmitting and receiving transducers will be present in the vehicle passenger compartment. If several of these transducers are ultrasonic transmitters and receivers, they can be operated in a phased array manner, as described above for the headrest, to permit precise distance measurements and mapping of the components of the passenger compartment. This is illustrated in FIG. 14 which is a perspective view of the interior of the passenger compartment showing a variety of transmitters and receivers, 700-706 which can be used in a phased array system. In addition, information can be transmitted between the transducers using coded signals in a ultrasonic network through the vehicle compartment airspace. If one of these sensors is an optical CCD or CMOS array, the location of the driver's eyes can be accurately determined and the results sent to the seat ultrasonically. Obviously, many other possibilities exist.

Figure 15:
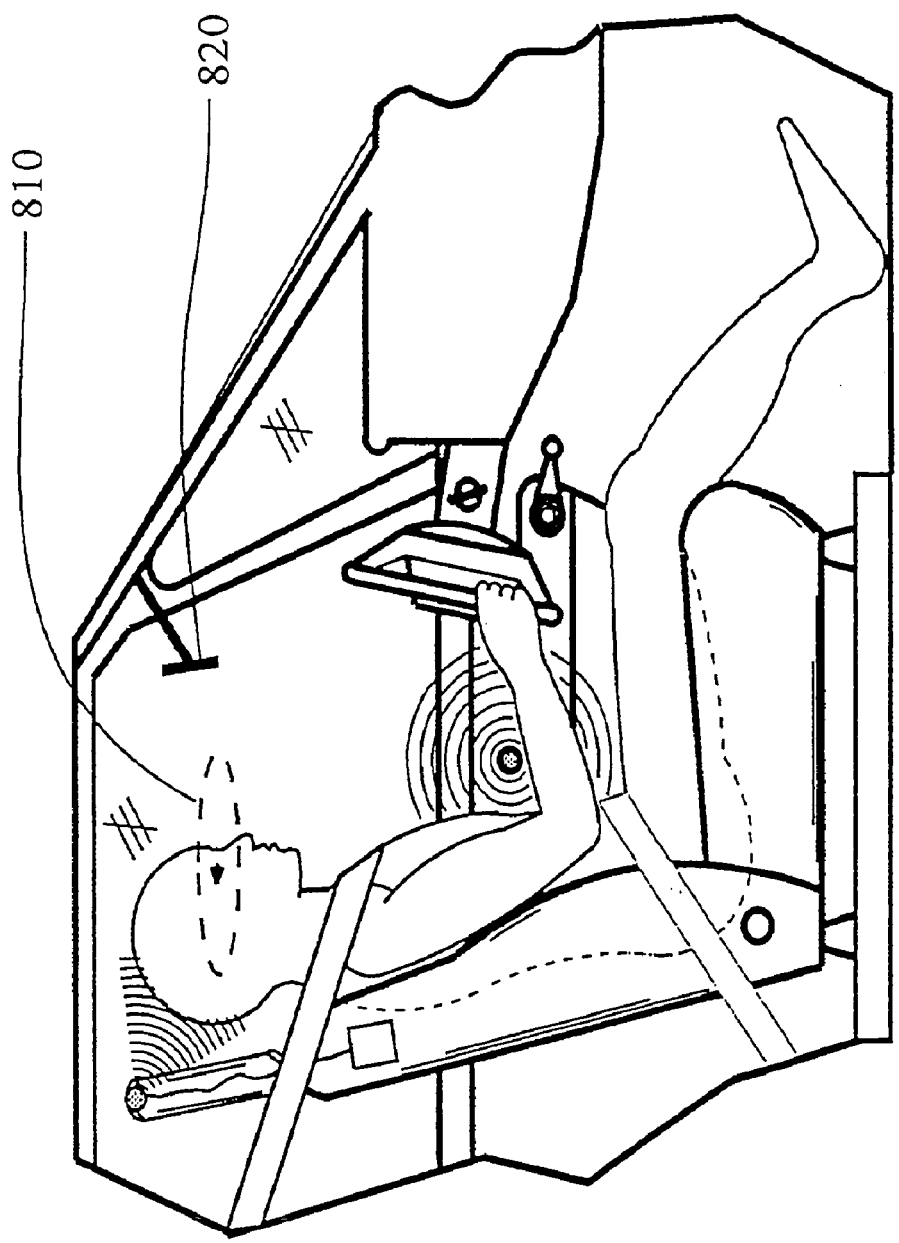
FIG. 15 is a view similar to FIG. 8 showing the occupant's eyes and the seat adjusted to place the eyes at a particular vertical position for proper viewing through the windshield and rear view mirror.

The eye ellipse discussed above is illustrated at 810 in FIG. 15, which is a view similar to FIG. 1, showing the occupant's eyes and the seat adjusted to place the eyes at a particular vertical position for proper viewing through the windshield and rear view mirror. Many systems are now under development to improve vehicle safety and driving ease. For example, night vision systems are being sold which project an enhanced image of the road ahead of the vehicle onto the windshield in a "heads-up display". The main problem with the systems now being sold is that the projected image does not precisely overlap the image as seen through the windshield. This parallax causes confusion in the driver and can only be corrected if the location of the driver's eyes is accurately known. One method of solving this problem is to use the passive seat adjustment system described herein to place the occupant's eyes at the optimum location as described above. Once this has been accomplished, in addition to solving the parallax problem, the eyes are properly located with respect to the rear view mirror 820 and little if any adjustment is required in order for the driver to have the proper view of what is behind the vehicle. Currently the problem is solved by projecting the heads-up display onto a different portion of the windshield, the bottom.

Although it has been described herein that the seat can be automatically adjusted to place the driver's eyes in the "eye-ellipse", there are many manual methods that can be implemented with feedback to the driver telling him or her when his or her eyes are properly position. At least one of the inventions disclosed herein is not limited by the use of automatic methods.

Several systems are in development for determining the location of an occupant and modifying the deployment of the airbag based of his or her position. These systems are called "smart airbags". The passive seat control system in accordance with this invention can also be used for this purpose as illustrated in FIG. 16. This figure is a view similar to FIG. 8 showing an inflated airbag 900 and an arrangement for controlling both the flow of gas into and out of the airbag during a crash. The determination is made based on height sensors 120, 121 and 122 located in the headrest, a weight sensor 200 in the seat and the location of the seat which is known by control circuit 150 (See, FIGS. 8, 9 and 9A). Other smart airbags systems rely only on the position of the occupant determined from various position sensors using ultrasonics or optical sensors.

The weight sensor coupled with the height sensor and the occupant's velocity relative to the vehicle, as determined by the occupant position sensors, provides information as to the amount of energy which the airbag will need to absorb during the impact of the occupant with the airbag. This, along with the location of the occupant relative to the airbag, is then used to determine the amount of gas which is to be injected into the airbag during deployment and the size of the exit orifices which control the rate of energy dissipation as the occupant is interacting with the airbag during the crash. For example, if an occupant is particularly heavy then it is desirable to increase the amount of gas, and thus the initial pressure, in the airbag to accommodate the larger force which will be required to arrest the relative motion of the occupant. Also, the size of the exit orifices should be reduced, since there will be a larger pressure tending to force the gas out of the orifices, in order to prevent the bag from bottoming out before the occupant's relative velocity is arrested. Similarly, for a small occupant the initial pressure would be reduced and the size of the exit orifices increased. If, on the other hand, the occupant is already close to the airbag then the amount of gas injected into the airbag needs to be reduced.

There are many ways of varying the amount of gas injected into the airbag some of which are covered in the patent literature and include, for example, inflators where the amount of gas generated and the rate of generation is controllable. For example, in a particular hybrid inflator manufactured by the Allied Signal Corporation, two pyrotechnic charges are available to heat the stored gas in the inflator. Either or both of the pyrotechnic charges can be ignited and the timing between the ignitions can be controlled to significantly vary the rate of gas flow to the airbag.

The flow of gas out of the airbag is traditionally done through fixed diameter orifices placed in the bag fabric. Some attempts have been made to provide a measure of control through such measures as blowout patches applied to the exterior of the airbag. Other systems were disclosed in U.S. patent application Ser. No. 07/541,464 filed Feb. 9, 1989, now abandoned. FIG. 16A illustrates schematically an inflator 910 generating gas to fill airbag 900 through control valve 920. The flow of gas out of airbag 900 is controlled by exit control valve 930. The valve 930 can be implemented in many different ways including, for example, a motor operated valve located adjacent the inflator and in fluid communication with the airbag or a digital flow control valve as discussed above. When control circuit 150 determines the size and weight of the occupant, the seat position and the relative velocity of the occupant, it then determines the appropriate opening for the exit valve 930, which is coupled to the control circuit 150. A signal is then sent from control circuit 150 to the motor controlling this valve which provides the proper opening.

In a like manner, other parameters can also be adjusted, such as the direction of the airbag, by properly positioning the angle and location of the steering wheel relative to the driver. If seatbelt pretensioners are used, the amount of tension in the seatbelt or the force at which the seatbelt spools out, for the case of force limiters, could also be adjusted based on the occupant morphological characteristics determined by the system of this invention.

Once the morphology of the driver and the seat position is known, many other objects in the vehicle can be automatically adjusted to conform to the occupant. An automatically adjustable seat armrest, a cup holder, the cellular phone, or any other objects with which the driver interacts can be now moved to accommodate the driver. This is in addition to the personal preference items such as the radio station, temperature, etc. discussed above.

Once the system of this invention is implemented, additional features become possible such as a seat which automatically makes slight adjustments to help alleviate fatigue or to account for a change of position of the driver in the seat, or a seat which automatically changes position slightly based on the time of day. Many people prefer to sit more upright when driving at night, for example. Other similar improvements based on knowledge of the occupant morphology will now become obvious to those skilled in the art.

In the above-described component adjustment systems and methods, one of the characteristics of the occupying item that may be measured is the weight. Several non-limiting examples of weight measuring apparatus will now be described which may be used in the above-described systems and methods.

Figure 18:
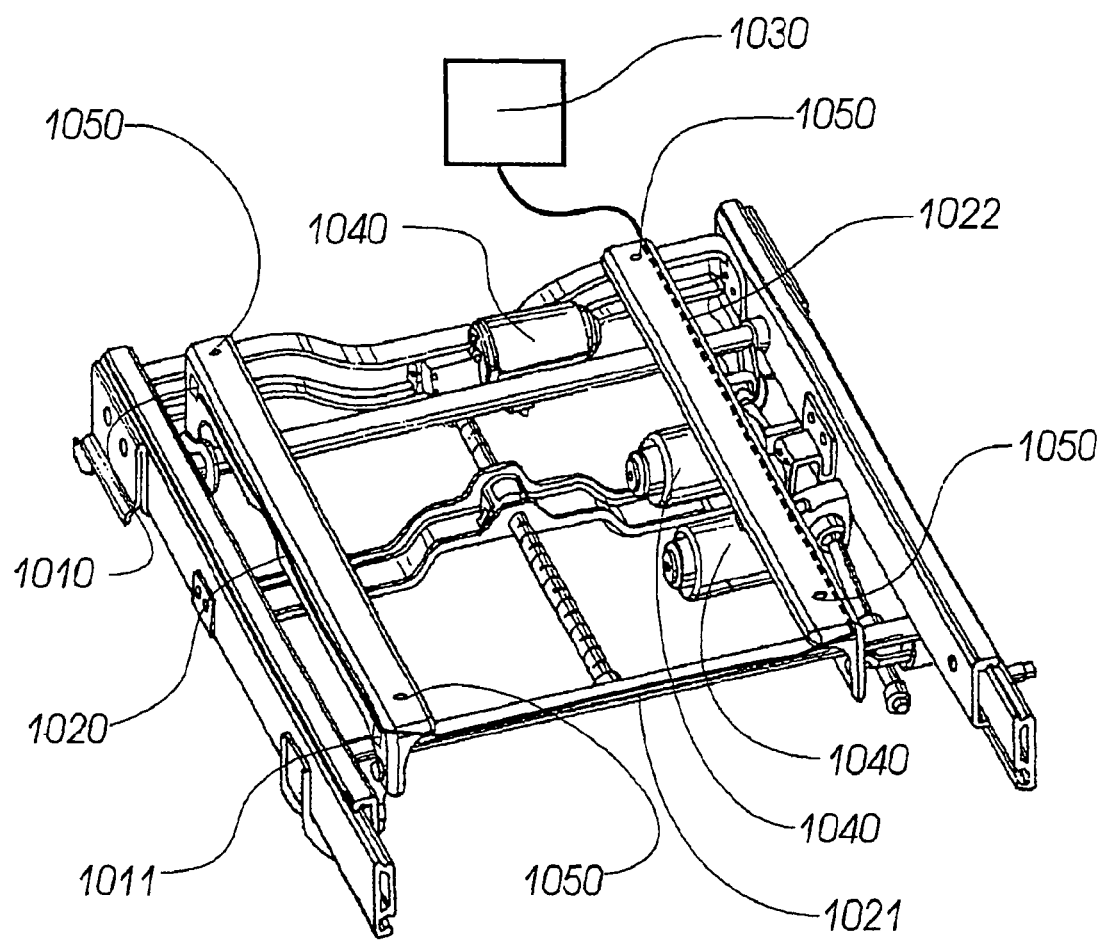
FIG. 18 is a perspective view of a one embodiment of an apparatus for measuring the weight of an occupying item of a seat illustrating weight sensing transducers mounted on a seat control mechanism portion which is attached directly to the seat.

In a first embodiment of a weight measuring apparatus shown in FIG. 18, four strain gage weight sensors or transducers are used, two being illustrated at 1010 and 1011 on one side of a bracket of the support structure of the seat and the other two being at the same locations on another bracket of the support (i.e., hidden on the corresponding locations on the other side of the support). The support structure of the seat supports the seat on a substrate such as a floor pan of the vehicle. Each of the strain gage transducers 1010,1011 also contains electronic signal conditioning apparatus, e.g., amplifiers, analog to digital converters, filters etc., which is associated such that output from the transducers is a digital signal. This electronic signal travels from transducer 1010 to transducer 1011 through a wire 1020. Similarly, wire 1021 transmits the output from transducers 1010 and 1011 to the next transducer in the sequence (one of the hidden transducers). Additionally, wire 1022 carries the output from these three transducers toward the fourth transducer (the other hidden transducer) and wire 1023 finally carries all four digital signals to an electronic control system or module 1030. These signals from the transducers 1010,1011 are time or frequency division multiplexed as is well known in the art. The seat position is controlled by motors 1040 as described in detail in U.S. Pat. No. 5,179,576, which is incorporated herein by reference. Finally, the seat is bolted onto the support structure through bolts not shown which attach the seat through holes 1050 in the brackets.

By placing the signal conditioning electronics, analog to digital converters, and other appropriate electronic circuitry adjacent the strain gage element, the four transducers can be daisy chained or otherwise attach together and only a single wire is required to connect all of the transducers to the control module 1030 as well as provide the power to run the transducers and their associated electronics.

The control system 1030, e.g., a microprocessor, is arranged to receive the digital signals from the transducers 1010,1011 and determine the weight of the occupying item of the seat based thereon. In other words, the signals from the transducers 1010,1011 are processed by the control system 1030 to provide an indication of the weight of the occupying item of the seat, i.e., the force exerted by the occupying item on the seat support structure.

Figure 19:
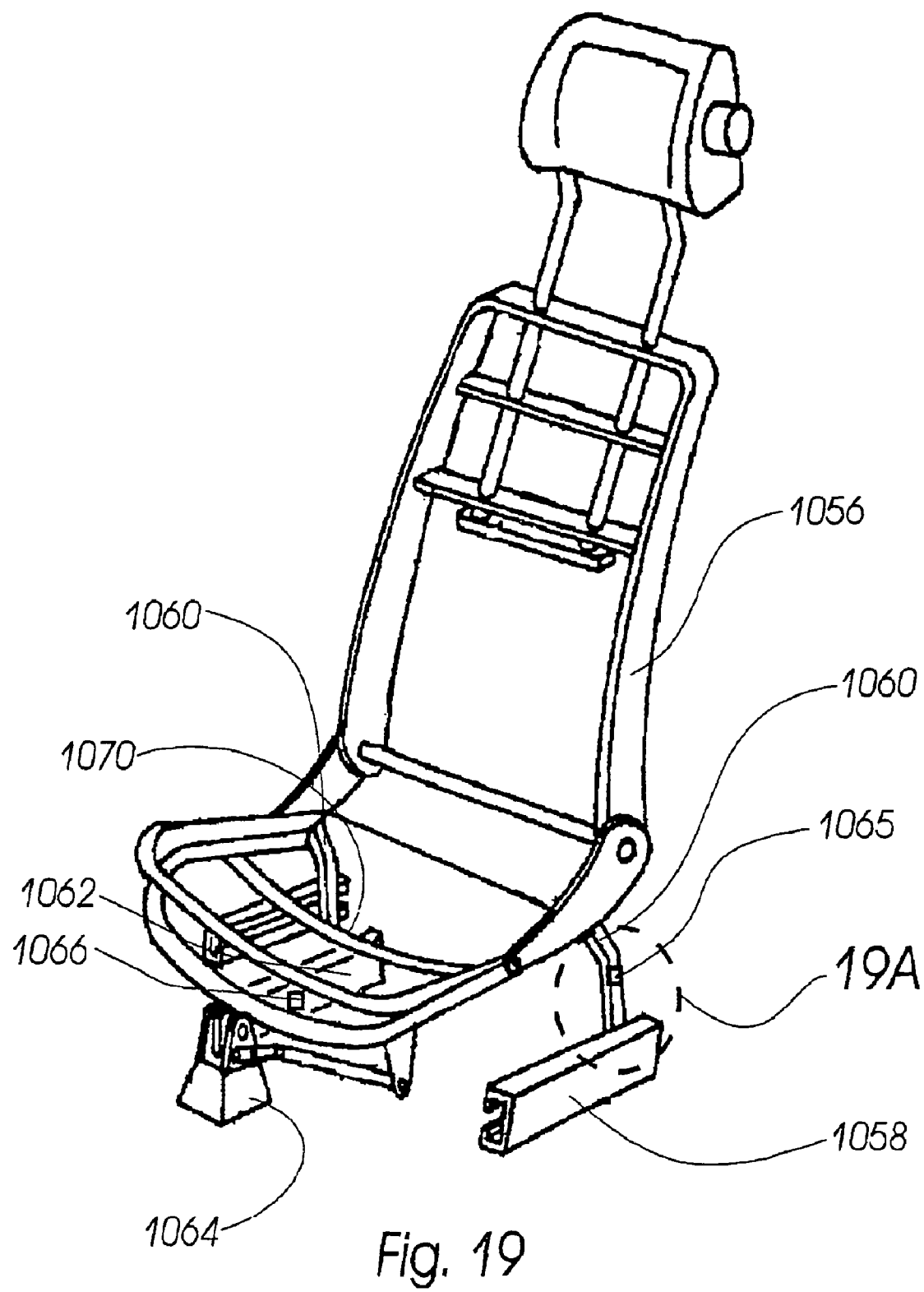
FIG. 19 illustrates a seat structure with the seat cushion and back cushion removed illustrating a three-slide attachment of the seat to the vehicle and preferred mounting locations on the seat structure for strain measuring weight sensors of an apparatus for measuring the weight of an occupying item of a seat in accordance with the invention.

A typical manually controlled seat structure is illustrated in FIG. 19 and described in greater detail in U.S. Pat. No. 4,285, 545. The seat 1056 (only the frame of which is shown) is attached to a pair of slide mechanisms 1058 in the rear thereof through support members such as rectangular tubular structures 1060 angled between the seat 1056 and the slide mechanisms 1058. The front of the seat 1056 is attached to the vehicle (more particularly to the floor pan) through another support member such as a slide member 1062, which is engaged with a housing 1064. Slide mechanisms 1058, support members 1060, slide member 1062 and housing 1064 constitute the support structure for mounting the seat on a substrate, i.e., the floor pan. Strain gage transducers are located for this implementation at 1065 and 1066, strain gage transducer 1065 being mounted on each tubular structure 1060 (only one of which is shown) and strain gage transducer 1066 being mounted on slide member 1062. When an occupying item is situated on the seat cushion (not shown), each of the support members 1060 and 1062 are deformed or strained. This strain is measured by transducers 1065 and 1066, respectively, to enable a determination of the weight of the item occupying the seat. More specifically, a control system or module or other compatible processing unit (not shown) is coupled to the strain gage transducers 1065,1066, e.g., via electrical wires (not shown), to receive the measured strain and utilize the measured strain to determine the weight of the occupying item of the seat. The determined weight, or the raw measured strain, may be used to control a vehicular component such as the airbag.

Support members 1060 are substantially vertically oriented and are preferably made of a sufficiently rigid, non-bending component.

Figure 19A:
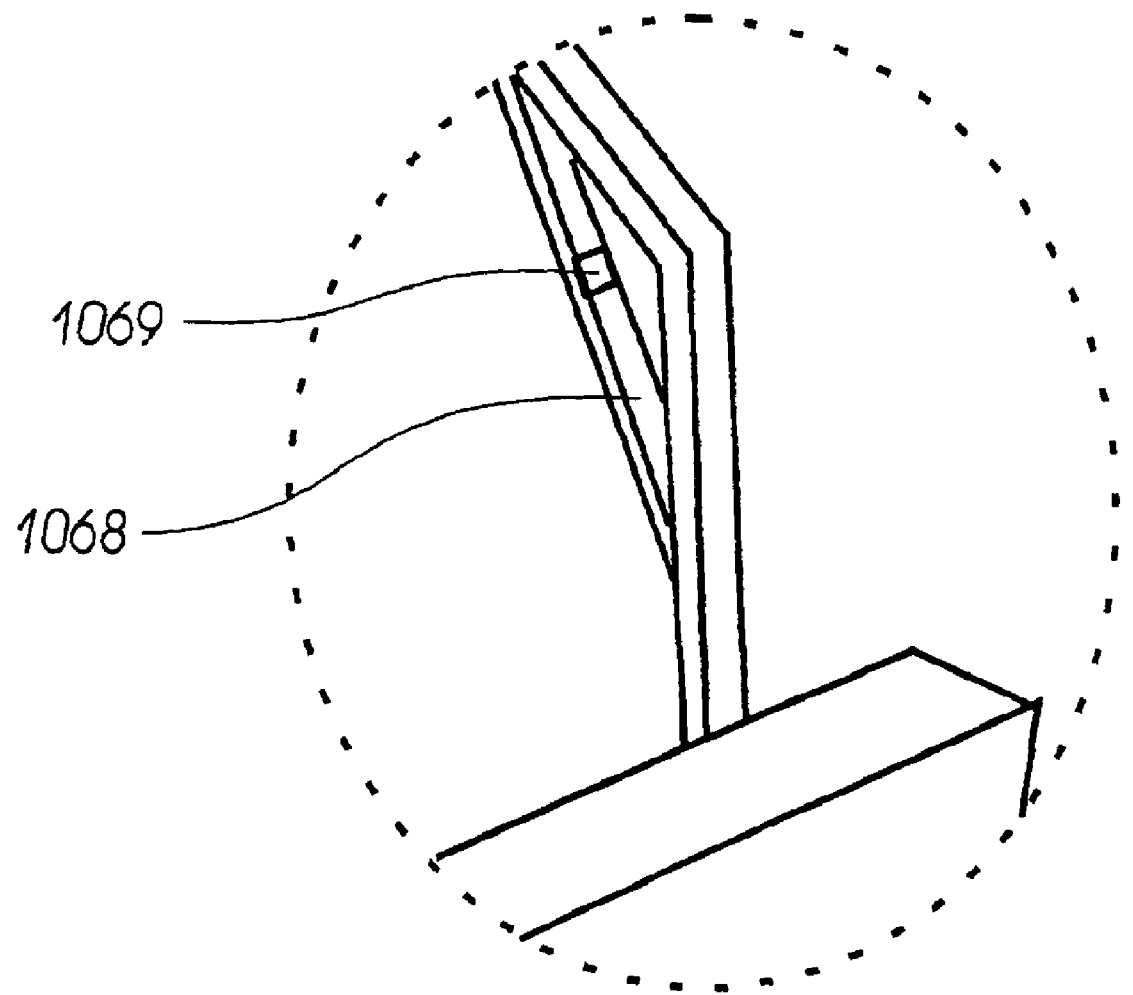
FIG. 19A illustrates an alternate view of the seat structure transducer mounting location taken in the circle A of FIG. 19 with the addition of a gusset and where the strain gage is mounted onto the gusset.

FIG. 19A illustrates an alternate arrangement for the seat support structures wherein a gusset 1068 has been added to bridge the angle on the support member 1060. Strain gage transducer 1069 is placed on this gusset 1068. Since the gusset 1068 is not a supporting member, it can be made considerably thinner than the seat support member 1060. As the seat is loaded by an occupying item, the seat support member 1060 will bend. Since the gusset 1068 is relatively weak, greater strain will occur in the gusset 1068 than in the support member 1060. The existence of this greater strain permits more efficient use of the strain gage dynamic range thus improving the accuracy of the weight measurement.

Figure 19B:
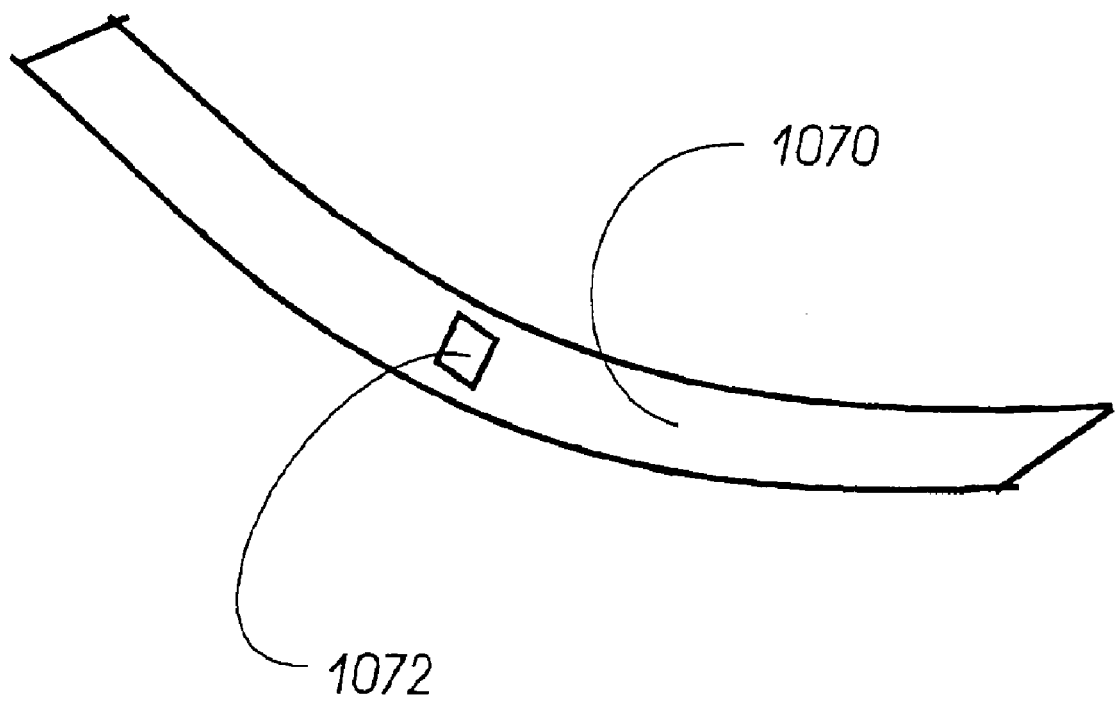
FIG. 19B illustrates a mounting location for a weight sensing transducer on a centralized transverse support member in an apparatus for measuring the weight of an occupying item of a seat in accordance with the invention.

FIG. 19B illustrates a seat transverse support member 1070 of the seat shown in FIG. 19, which is situated below the base cushion and extends between opposed lateral sides of the seat. This support member 1070 will be directly loaded by the vehicle seat and thus will provide an average measurement of the force exerted or weight of the occupying item. The deflection or strain in support member 1070 is measured by a strain gage transducer 1072 mounted on the support member 1070 for this purpose. In some applications, the support member 1070 will occupy the entire space fore and aft below the seat cushion. Here it is shown as a relatively narrow member. The strain gage transducer 1072 is coupled, e.g., via an electrical wire (not shown), to a control module or other processing unit (not shown) which utilizes the measured strain to determine the weight of the occupying item of the seat.

Figures 20A, 20B, 20C:
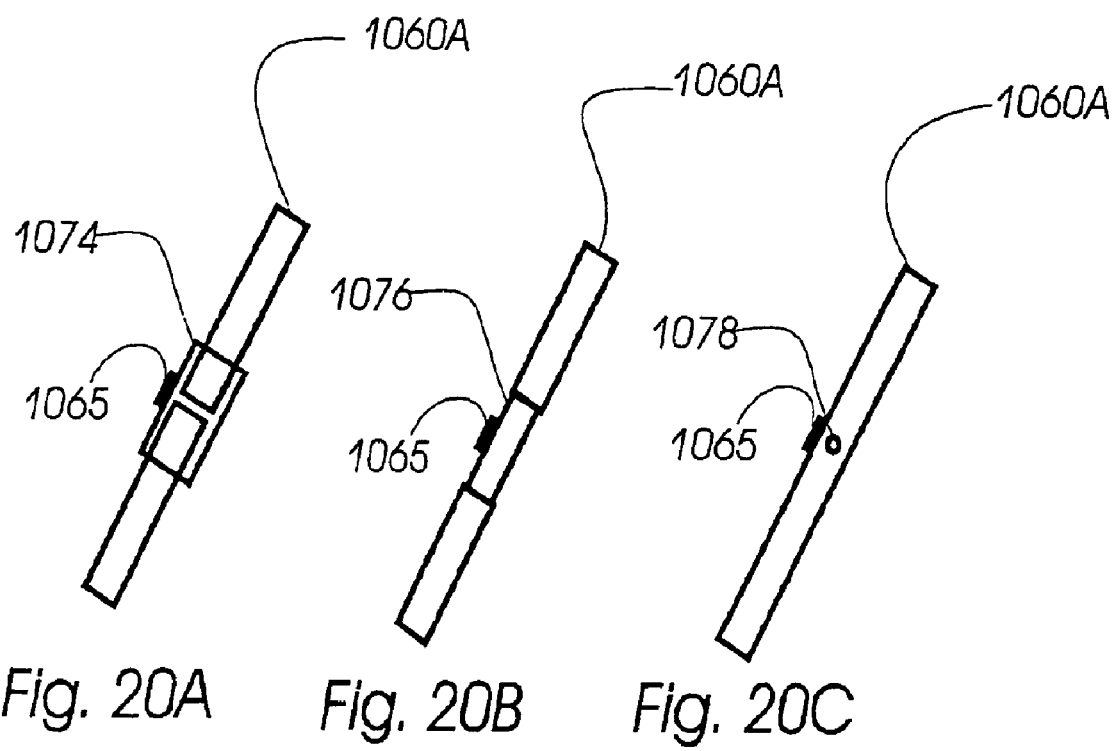
FIGS. 20A, 20B and 20C illustrate three alternate methods of mounting strain transducers of an apparatus for measuring the weight of an occupying item of a seat in accordance with the invention onto a tubular seat support structural member.

In FIG. 19, the support members 1060 are shown as rectangular tubes having an end connected to the seat 1056 and an opposite end connected to the slide mechanisms 1058. In the constructions shown in FIGS. 20A-20C, the rectangular tubular structure has been replaced by a circular tube where only the lower portion of the support is illustrated. FIGS. 20A-20C show three alternate ways of improving the accuracy of the strain gage system, i.e., the accuracy of the measurements of strain by the strain gage transducers. Generally, a reduction in the stiffness of the support member to which the strain gage transducer is mounted will concentrate the force and thereby improve the strain measurement. There are several means disclosed below to reduce the stiffness of the support member. These means are not exclusive and other ways to reduce the stiffness of the support member are included in the invention and the interpretation of the claims.

In each illustrated embodiment, the transducer is represented by 1065 and the substantially vertically oriented support member corresponding to support member 1060 in FIG. 19 has been labeled 1060A. In FIG. 20A, the tube support member 1060A has been cut to thereby form two separate tubes having longitudinally opposed ends and an additional tube section 1074 is connected, e.g., by welding, to end portions of the two tubes. In this manner, a more accurate tube section 1074 can be used to permit a more accurate measurement of the strain by transducer 1065, which is mounted on tube section 1074.

In FIG. 20B, a small circumferential cut has been made in tube support member 1060A so that a region having a smaller circumference than a remaining portion of the tube support member 1060A is formed. This cut is used to control the diameter of the tube support member 1060A at the location where strain gage transducer 1065 is measuring the strain. In other words, the strain gage transducer 1065 is placed at a portion wherein the diameter thereof is less than the diameter of remaining portions of the tube support member 1060A. The purpose of this cut is to correct for manufacturing variations in the diameter of the tube support member 1060A. The magnitude of the cut is selected so as to not significantly weaken the structural member but instead to control the diameter tolerance on the tube so that the strain from one vehicle to another will be the same for a particular loading of the seat.

In FIG. 20C, a small hole 1078 is made in the tube support member 1060A adjacent the transducer 1065 to compensate for manufacturing tolerances on the tube support member 1060A.

From this discussion, it can be seen that all three techniques have as their primary purpose to provide increase the accuracy of the strain in the support member corresponding to weight on the vehicle seat. Naturally, the preferred approach would be to control the manufacturing tolerances on the support structure tubing so that the variation from vehicle to vehicle is minimized. For some applications where accurate measurements of weight are desired, the seat structure will be designed to optimize the ability to measure the strain in the support members and thereby to optimize the measurement of the weight of the occupying item. The inventions disclosed herein, therefore, are intended to cover the entire seat when the design of the seat is such as to be optimized for the purpose of strain gage weight sensing and alternately for the seat structure when it is so optimized.

Figure 21:
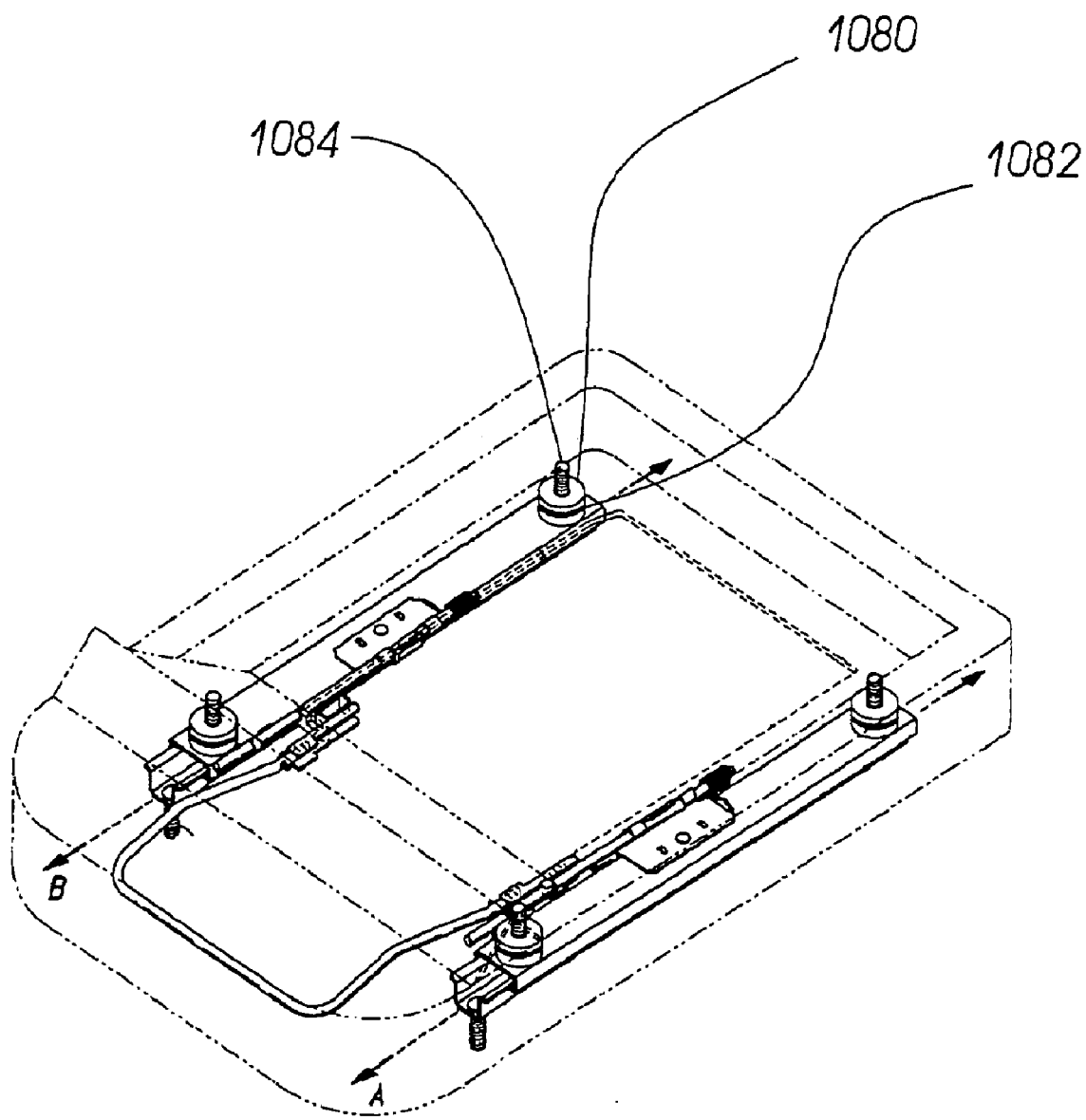
FIG. 21 illustrates an alternate weight sensing transducer utilizing pressure sensitive transducers.

Although strain measurement devices have been discussed above, pressure measurement systems can also be used in the seat support structure to measure the weight on the seat. Such a system is illustrated in FIG. 21. A general description of the operation of this apparatus is disclosed in U.S. Pat. No. 5,785,291, which is incorporated herein by reference. In that patent, the vehicle seat is attached to the slide mechanism by means of bolts 1084. Between the seat and the slide mechanism, a shock-absorbing washer has been used for each bolt. In the present invention, this shock-absorbing washer has been replaced by a sandwich construction consisting of two washers of shock absorbing material 1080 with a pressure sensitive material 1082 sandwiched in between. A variety of materials can be used for the pressure sensitive material 1082, which generally work on either the capacitance or resistive change of the material as it is compressed. The wires from this material leading to the electronic control system are not shown in this view. The pressure sensitive material is coupled to the control system, e.g., a microprocessor, and provides the control system with an indication of the pressure applied by the seat on the slide mechanism which is related to the weight of the occupying item of the seat. Generally, material 1082 is constructed with electrodes on the opposing faces such that as the material is compressed, the spacing between the electrodes is decreased. This spacing change thereby changes both the resistive and the capacitance of the sandwich which can be measured and which is a function of the compressive force on the material. Measurement of the change in capacitance of the sandwich, i.e., two spaced apart conductive members, is obtained by any method known to those skilled in the art, e.g., connecting the electrodes in a circuit with a source of alternating or direct current. The conductive members may be made of a metal. The use of such a pressure sensor is not limited to the illustrated embodiment wherein the shock absorbing material 1080 and pressure sensitive material 1082 are placed around bolt 1084. It is also not limited to the use or incorporation of shock absorbing material in the implementation.

Figure 21A:
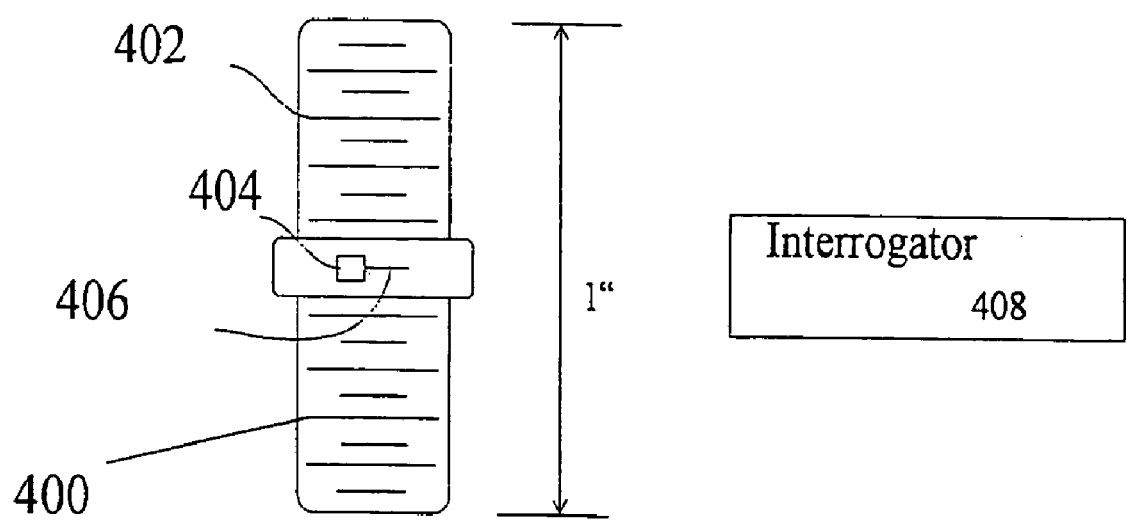
FIG. 21A illustrates a part of another alternate weight sensing system for a seat.

FIG. 21A shows a substitute construction for the bolt 1084 in FIG. 21 and which construction is preferably arranged in connection with the seat and the adjustment slide mechanism. A bolt-like member, hereinafter referred to as a stud 400, is threaded 402 on both ends with a portion remaining unthreaded between the ends. A SAW strain measuring device including a SAW strain gage 404 and antenna 406 is arranged on the center unthreaded section of the stud 400 and the stud 400 is attached at its ends to the seat and the slide mechanism using appropriate threaded nuts. Based on the particular geometry of the SAW device used, the stud 400 can result in as little as a 3 mm upward displacement of the seat compared to a normal bolt mounting system. No wires are required to attach the SAW device to the stud 400. The total length of stud 400 may be as little as 1 inch. In operation, an interrogator 408 transmits a radio frequency pulse at for example, 925 MHz which excites the antenna 406 associated with the SAW strain gage 404. After a delay caused by the time required for the wave to travel the length of the SAW device, a modified wave is re-transmitted to the interrogator 408 providing an indication of the strain and thus a representative value of the weight of an object occupying the seat. For a seat which is normally bolted to the slide mechanism with four bolts, at least four SAW strain measuring devices or sensors would be used. Each conventional bolt could thus be replaced by a stud as described above. Naturally, since the individual SAW devices are very small, multiple such devices can be placed on the stud to provide multiple redundant measurements or to permit the stud to be arbitrarily located with at least one SAW device always within direct view of the interrogator antenna.

To avoid potential problems with electromagnetic interference, the stud 400 may be made of a non-metallic, possibly composite, material which would not likely cause or contribute to any possible electromagnetic wave interference. The stud 400 could also be modified for use as an antenna.

With respect to the frequency of interrogation, if the seat is unoccupied then the frequency of interrogation can be substantially reduced in comparison to when the seat is occupied. For an occupied seat, information as to the identity and/or category and position of an occupying item of the seat can be obtained through the use of multiple weight sensors. For this reason, and due to the fact that during pre-crash event the position of an occupying item of the seat may be changing rapidly, interrogations as frequently as once every 10 milliseconds or even faster can be desirable. This would also enable a distribution of the weight being applied to the seat being obtained which provides an estimation of the position of the object occupying the seat. Using pattern recognition technology, e.g., a trained neural network, sensor fusion, fuzzy logic, etc., the identification of the object can be ascertained based on the determined weight and/or determined weight distribution.

Although each of the SAW devices can be interrogated and/or powered using wireless means, in some cases, it may be desirable to supply power to and or obtained information from such devices using wires.

Figure 22:
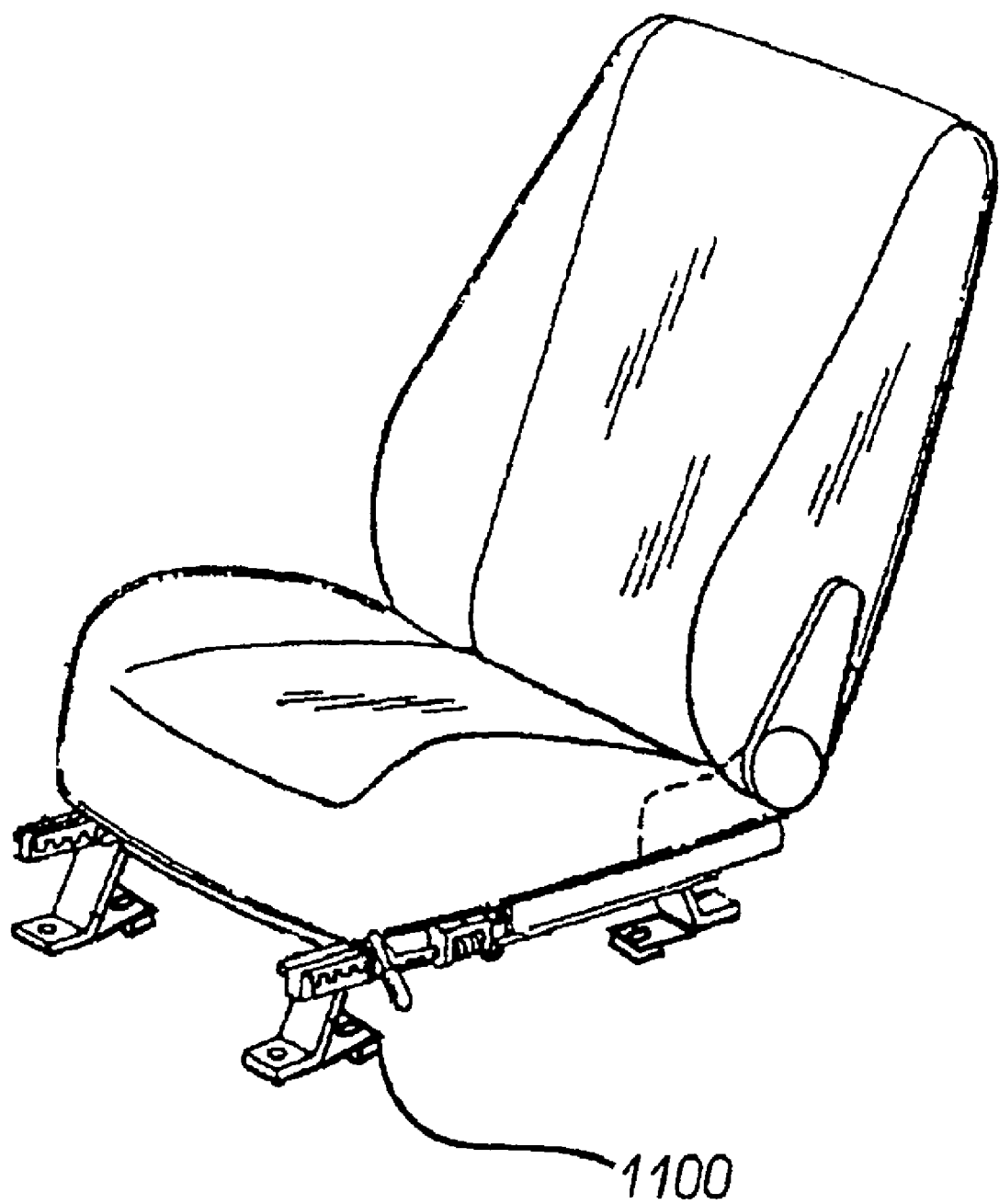
FIG. 22 illustrates an alternate seat structure assembly utilizing strain transducers.

In FIG. 22, which is a view of a seat attachment structure described in U.S. Pat. No. 5,531,503, where a more conventional strain gage load cell design designated 1100 is utilized. One such load cell design 1100 is illustrated in detail in FIG. 22A.

Figure 22A:
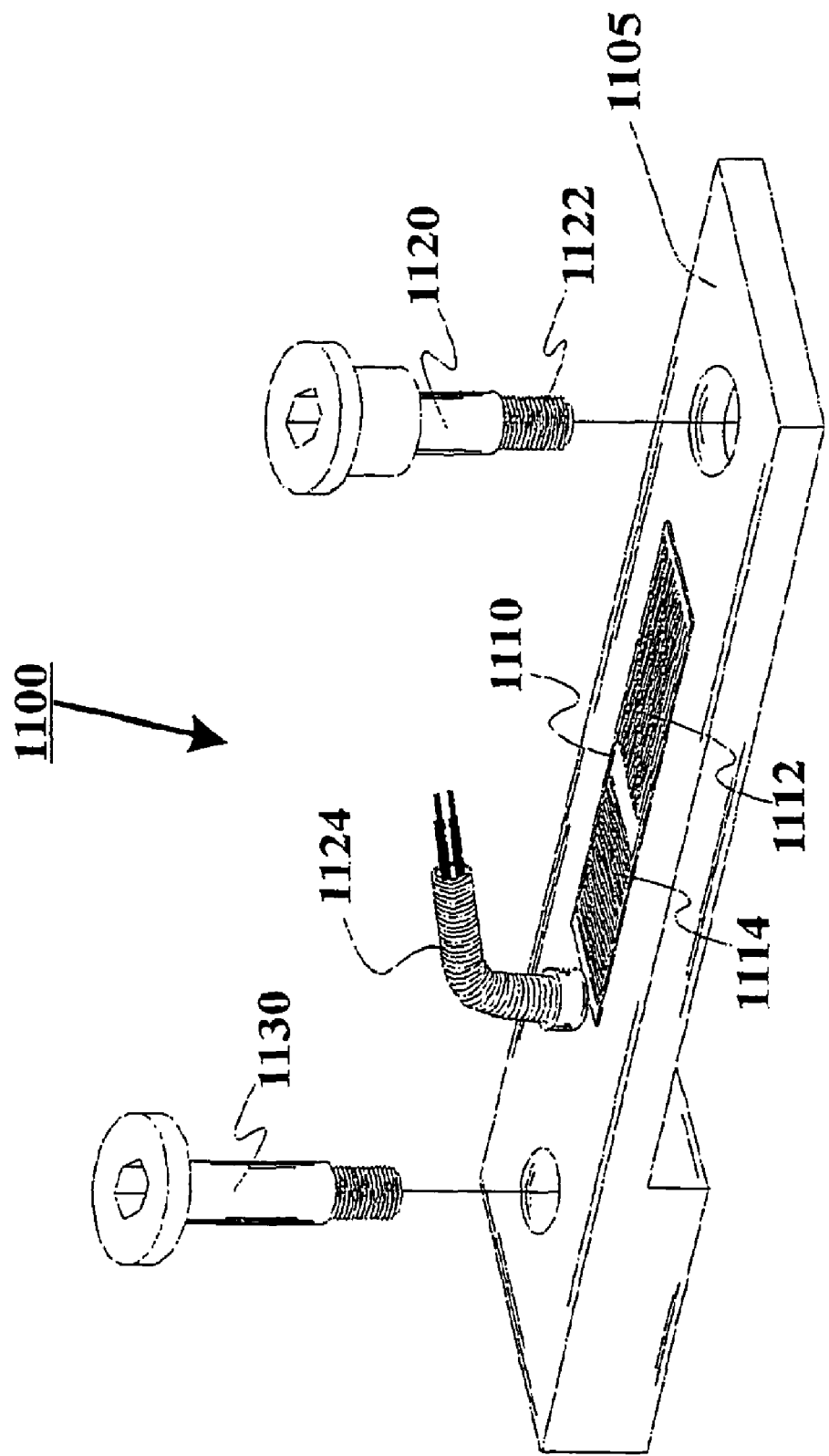
FIG. 22A is a perspective view of a cantilevered beam type load cell for use with the weight measurement system of this invention for mounting locations of FIG. 22, for example.

A cantilevered beam load cell design using a half bridge strain gage system 110 is shown in FIG. 22A. Fixed resistors mounted within the electronic package, which is not shown in this drawing, provide the remainder of the whetstone bridge system. The half bridge system is frequently used for economic reasons and where some sacrifice in accuracy is permissible. The load cell 110 includes a member on which the strain gage 1110 is situated. The strain gage 1100 includes strain-measuring elements 1112 and 1114 arranged on the load cell. The longitudinal element 1112 measures the tensile strain in the beam when it is loaded by the seat and its contents, not shown, which is attached to end 1122 of bolt 1120. The load cell is mounted to the vehicle or other substrate using bolt 1130. Temperature compensation is achieved in this system since the resistance change in strain elements 1112 and 1114 will vary the same amount with temperature and thus the voltage across the portions of the half bridge will remain the same. The strain gage 1100 is coupled to a control system (e.g., a microprocessor—not shown) via wires 1124 and receives the measured tensile strain and determines the weight of an occupying item of the seat based thereon.

One problem with using a cantilevered load cell is that it imparts a torque to the member on which it is mounted. One preferred mounting member on an automobile is the floor-pan which will support significant vertical loads but is poor at resisting torques since floor-pans are typically about 1 mm (0.04 inches) thick. This problem can be overcome through the use of a simply supported load cell design designated 1200 as shown in FIG. 22B.

In FIG. 22B, a full bridge strain gage system 1210 is used with all four elements 1212,1214 mounted on the top of a beam 1205. Elements 1212 are mounted parallel to the beam 1205 and elements 1214 are mounted perpendicular to it. Since the maximum strain is in the middle of the beam 1205, strain gage 1210 is mounted close to that location. The load cell, shown generally as 1200, is supported by the floor pan, not shown, at supports 1230 that are formed by bending the beam 1205 downward at its ends. Fasteners 1220 fit through holes 1222 in the beam 1205 and serve to hold the load cell 1200 to the floor pan without putting significant forces on the load cell 1200. Holes are provided in the floor-pan for bolt 1240 and for fasteners 1220. Bolt 1240 is attached to the load cell 1200 through hole 1250 of the beam 1205 which serves to transfer the force from the seat to the load cell 1200.

The electronics package is potted within hole 1262 using urethane potting compound 1244 and includes signal conditioning circuits, a microprocessor with integral ADCs 1280 and a flex circuit 1275 (FIG. 22C). The flex circuit 1275 terminates at an electrical connector 1290 for connection to other vehicle electronics, e.g., a control system. The beam 1205 is slightly tapered at location 1232 so that the strain is constant in the strain gage.

Figure 22D:
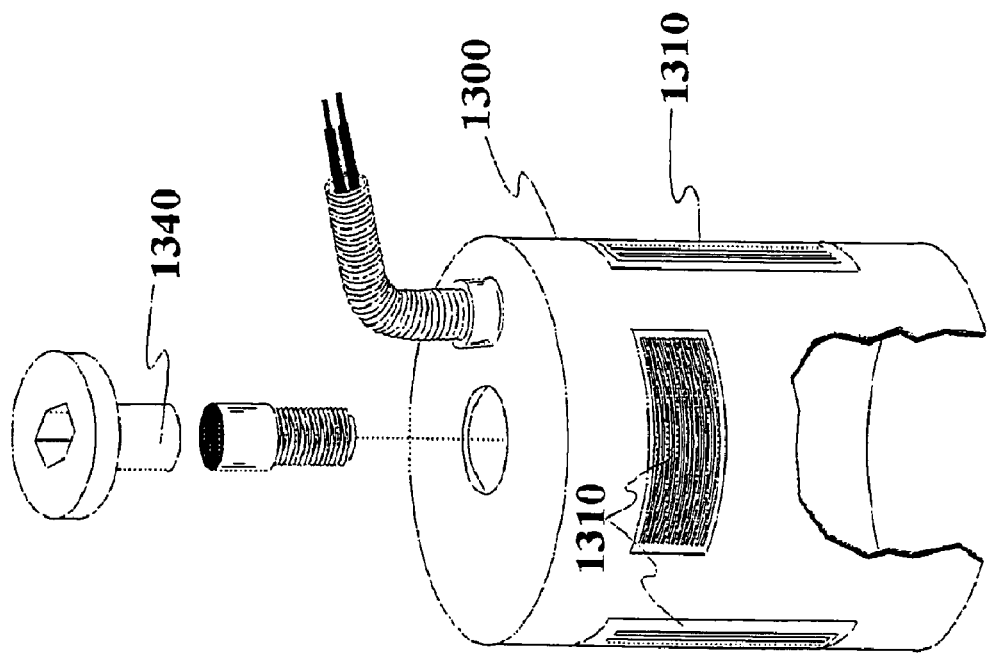
FIG. 22D is a perspective view of a tubular load cell for use with the weight measurement system of this invention as an alternate to the cantilevered load cell of FIG. 22A.

Although thus far only beam type load cells have been described, other geometries can also be used. One such geometry is a tubular type load cell. Such a tubular load cell is shown generally at 1300 in FIG. 22D and instead of an elongate beam, it includes a tube. It also comprises a plurality of strain sensing elements 1310 for measuring tensile and compressive strains in the tube as well as other elements, not shown, which are placed perpendicular to the elements 1310 to provide for temperature compensation. Temperature compensation is achieved in this manner, as is well known to those skilled in the art of the use of strain gages in conjunction with a whetstone bridge circuit, since temperature changes will affect each of the strain gage elements identically and the total effect thus cancels out in the circuit. The same bolt 1340 can be used in this case for mounting the load cell to the floor-pan and for attaching the seat to the load cell.

Figure 22E:
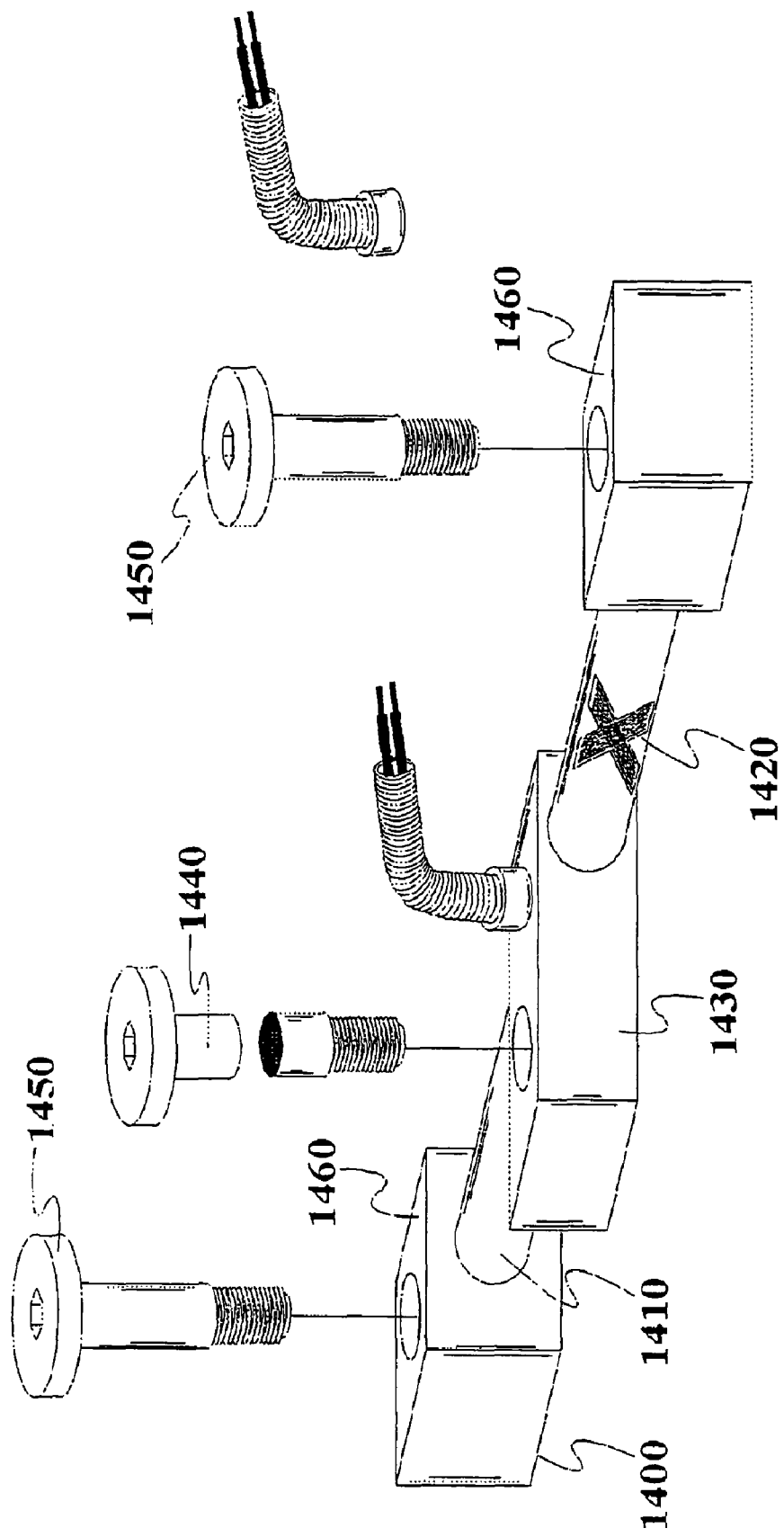
FIG. 22E is a perspective view of a torsional beam load cell for use with the weight measurement apparatus in accordance with the invention as an alternate to the cantilevered load cell of FIG. 22A.

Another alternate load cell design shown generally in FIG. 22E as 1400 makes use of a torsion bar 1410 and appropriately placed torsional strain sensing elements 1420. A torque is imparted to the bar 1410 by means of lever 1430 and bolt 1440 which attaches to the seat structure not shown. Bolts 1450 attach the mounting blocks 1460 at ends of the torsion bar 1410 to the vehicle floor-pan.

The load cells illustrated above are all preferably of the foil strain gage type. Other types of strain gages exist which would work equally which include wire strain gages and strain gages made from silicon. Silicon strain gages have the advantage of having a much larger gage factor and the disadvantage of greater temperature effects. For the high-volume implementation of this invention, silicon strain gages have an advantage in that the electronic circuitry (signal conditioning, ADCs, etc.) can be integrated with the strain gage for a low cost package. Other strain gage materials and load cell designs may, of course, be incorporated within the teachings of this invention. In particular, a surface acoustical wave (SAW) strain gage can be used in place of conventional wire, foil or silicon strain gages and the strain measured either wirelessly or by a wire connection. For SAW strain gages, the electronic signal conditioning can be associated directly with the gage or remotely in an electronic control module as desired. For SAW strain gages, the problems discussed above with low signal levels requiring bridge structures and the methods for temperature compensation may not apply. Generally, SAW strain gages are more accurate that other technologies but may require a separate sensor to measure the temperature for temperature compensation depending on the material used. Materials that can be considered for SAW strain gages are quartz, lithium niobate, lead zirconate, lead titenate, zinc oxide, polyvinylidene fluoride and other piezo-electric materials.

Many seat designs have four attachment points for the seat structure to attach to the vehicle. Since the plane of attachment is determined by three points, the potential exists for a significant uncertainty or error to be introduced. This problem can be compounded by the method of attachment of the seat to the vehicle. Some attachment methods using bolts, for example, can introduce significant strain in the seat supporting structure. Some compliance therefore must be introduced into the seat structure to reduce these attachment induced stresses to a minimum. Too much compliance, on the other hand, can significantly weaken the seat structure and thereby potentially cause a safety issue. This problem can be solved by rendering the compliance section of the seat structure highly nonlinear or significantly limiting the range of the compliance. One of the support members, for example, can be attached to the top of the seat structure through the use of the pinned joint wherein the angular rotation of the joint is severely limited. Methods will now be obvious to those skilled in the art to eliminate the attachment induced stress and strain in the structure which can cause inaccuracies in the strain measuring system.

In the examples illustrated above, strain measuring elements have been shown at each of the support members. This of course is necessary if an accurate measurement of the weight of the occupying item of the seat is to be determined. For this case, typically a single value is inputted into the neural network representing weight. Experiments have shown, however, for the four strain gage transducer system, that most of the weight and thus most of the strain occurs in the strain elements mounted on the rear seat support structural members. In fact, about 85 percent of the load is typically carried by the rear supports. Little accuracy is lost therefore if the forward strain measuring elements are eliminated. Similarly, for most cases, the two rear mounted support strain elements measure approximately the same strain. Thus, the information represented by the strain in one rear seat support is sufficient to provide a reasonably accurate measurement of the weight of the occupying item of the seat.

If a system consisting of eight transducers is considered, four ultrasonic transducers and four weight transducers, and if cost considerations require the choice of a smaller total number of transducers, it is a question of which of the eight transducers should be eliminated. Fortunately, the neural network technology provides a technique for determining which of the eight transducers is most important, which is next most important, etc. If the six most critical transducers are chosen, that is the six transducers which contain the most useful information as determined by the neural network, and a neural network can be trained using data from those six transducers and the overall accuracy of the system can be determined. Experience has determined, for example, that typically there is almost no loss in accuracy by eliminating two of the eight transducers, that is two of the strain gage weight sensors. A slight loss of accuracy occurs when one of the ultrasonic transducers is then eliminated.

This same technique can be used with the additional transducers described above. A transducer space can be determined with perhaps twenty different transducers comprised of ultrasonic, optical, electromagnetic, motion, heartbeat, weight, seat track, seatbelt payout, seatback angle etc. transducers. The neural network can then be used in conjunction with a cost function to determine the cost of system accuracy. In this manner, the optimum combination of any system cost and accuracy level can be determined.

In many situations where the four strain measuring weight sensors are applied to the vehicle seat structure, the distribution of the weight among the four strain gage sensors, for example, well very significantly depending on the position of the seat in the vehicle and particularly the fore and aft and secondarily the seatback angle position. A significant improvement to the accuracy of the strain gage weight sensors, particularly if less than four such sensors are used, can result by using information from a seat track position and/or a seatback angle sensor. In many vehicles, such sensors already exist and therefore the incorporation of this information results in little additional cost to the system and results in significant improvements in the accuracy of the weight sensors.

There have been attempts to use seat weight sensors to determine the load distribution of the occupying item and thereby reach a conclusion about the state of seat occupancy. For example, if a forward facing human is out of position, the weight distribution on the seat will be different than if the occupant is in position. Similarly a rear facing child seat will have a different weight distribution than a forward facing child seat. This information is useful for determining the seated state of the occupying item under static or slowly changing conditions. For example, even when the vehicle is traveling on moderately rough roads, a long term averaging or filtering technique can be used to determine the total weight and weight distribution of the occupying item. Thus, this information can be useful in differentiating between a forward facing and rear facing child seat.

It is much less useful however for the case of a forward facing human or forward facing child seat that becomes out of position during a crash. Panic braking prior to a crash, particularly on a rough road surface, will cause dramatic fluctuations in the output of the strain sensing elements. Filtering algorithms, which require a significant time slice of data, will also not be particularly useful. A neural network or other pattern recognition system, however, can be trained to recognize such situations and provide useful information to improve system accuracy.

Other dynamical techniques can also provide useful information especially if combined with data from the vehicle crash accelerometer. By studying the average weight over a few cycles, as measured by each transducer independently, a determination can be made that the weight distribution is changing. Depending on the magnitude of the change a determination can be made as to whether the occupant is being restrained by a seatbelt. It a seatbelt restraint is not being used, the output from the crash accelerometer can be used to accurately project the position of the occupant during pre crash braking and eventually the impact itself providing his or her initial position is known.

In this manner, a weight sensor with provides weight distribution information can provide useful information to improve the accuracy of the occupant position sensing system for dynamic out of position determination. Naturally, even without the weight sensor information, the use of the vehicle crash sensor data in conjunction with any means of determining the belted state of the occupant will dramatically improve the dynamic determination of the position of a vehicle occupant.

Figure 1A:
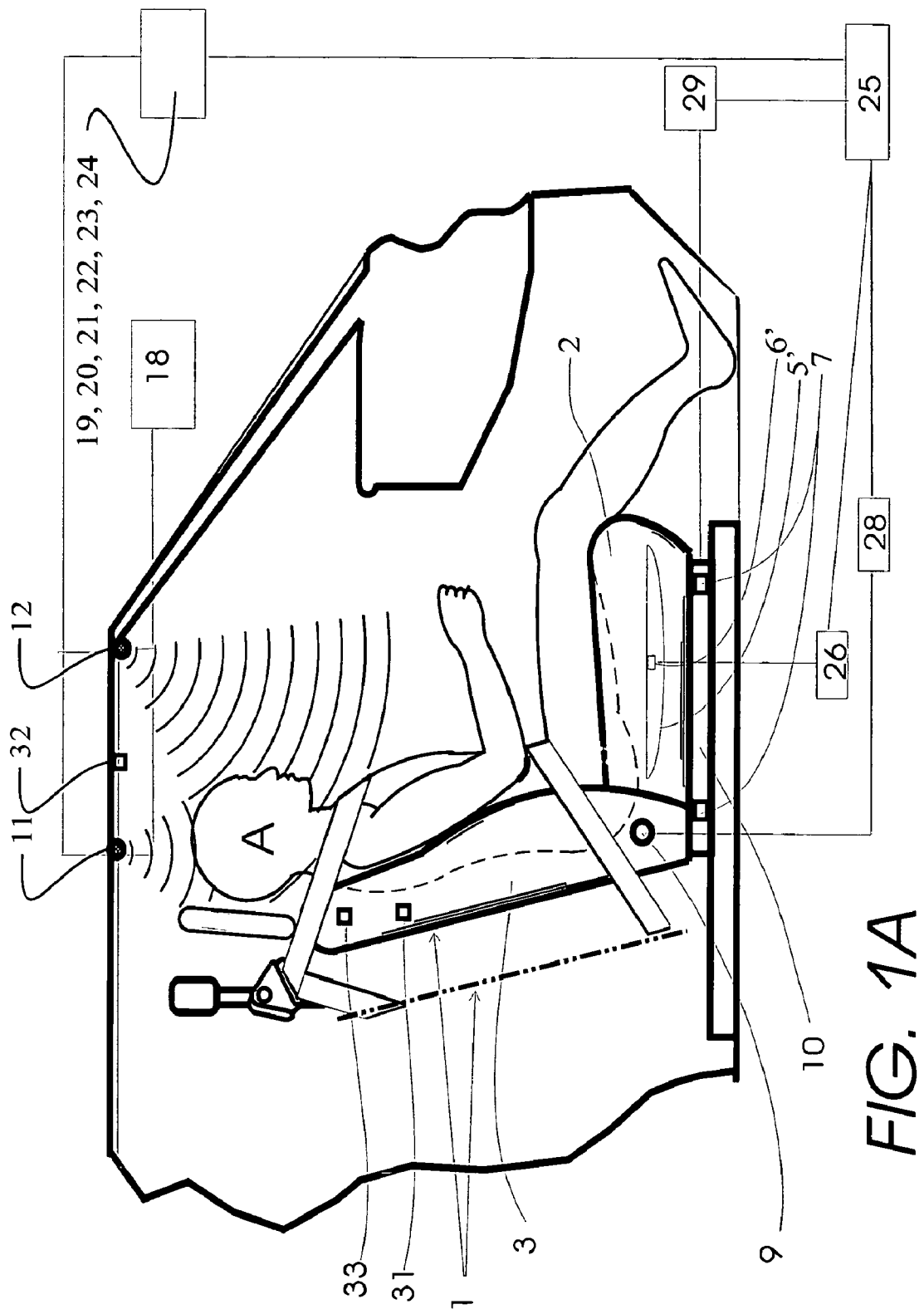
FIG. 1A is an illustration as in FIG. 1 with the replacement of a strain gage weight sensor within a cavity within the seat cushion for the bladder weight sensor of FIG. 1.

Strain gage weight sensors can also be mounted in other locations such as within a cavity within a seat cushion 2 as shown as 6' in FIG. 1A and described above. The strain gage can be mounted on a flexible diaphragm that flexes and thereby strains the strain gage as the seat is loaded. In the example of FIG. 1A, a single chamber 5', diaphragm and strain gage 6' is illustrated. Naturally, a plurality of such chambers can be used to provide a distribution of the load on the occupying item onto the seat.

Figure 23:
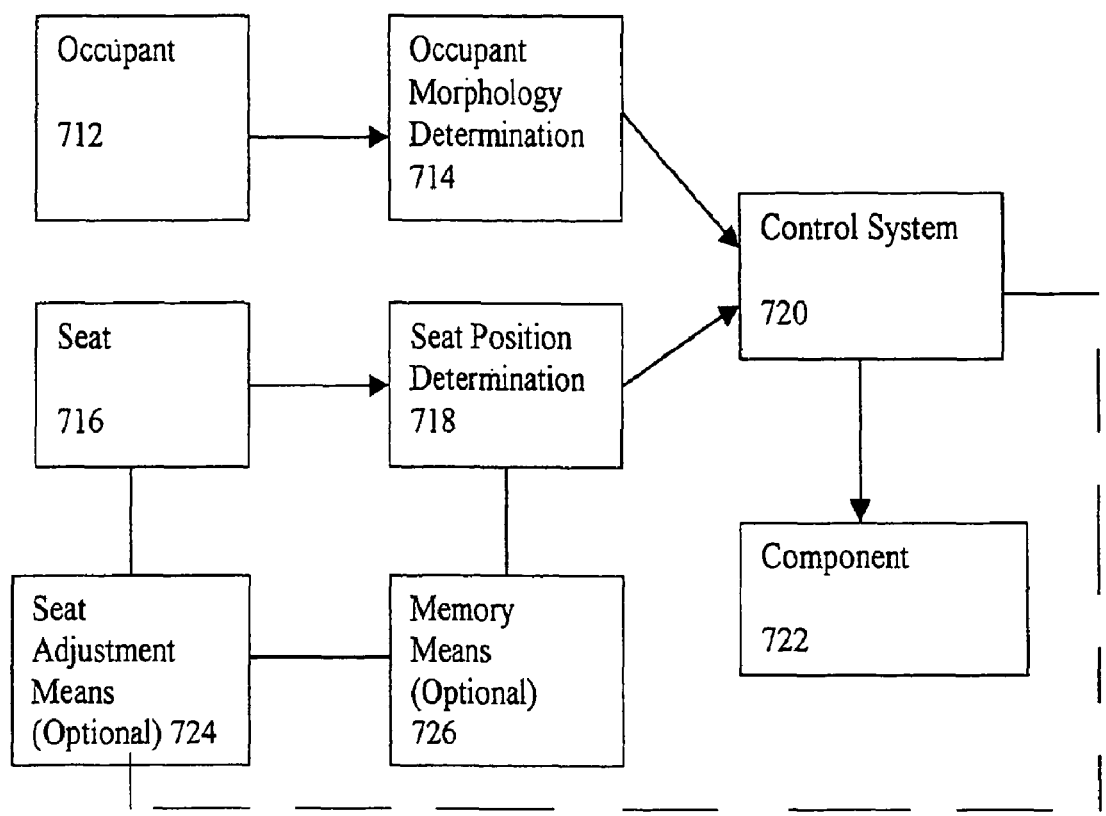
FIG. 23 is a flow chart of an arrangement for controlling a component in accordance with the invention.

FIG. 23 shows a flow chart of one manner in the arrangement and method for controlling a vehicle component in accordance with the invention functions. A measurement of the morphology of the occupant 710 is performed at 714, i.e., one or more morphological characteristics are measured in any of the ways described above. The position of the seat 716 is obtained at 718 and both the measured morphological characteristic of the occupant 712 and the position of the seat 716 are forwarded to the control system 720. The control system considers these parameters and determines the manner in which the component 722 should be controlled or adjusted, and even whether any adjustment is necessary.

Preferably, seat adjustment means 724 are provided to enable automatic adjustment of the seat 716. If so, the current position of the seat 716 is stored in memory means 726 (which may be a previously adjusted position) and additional seat adjustment, if any, is determined by the control system 720 to direct the seat adjustment means 724 to move the seat. The seat 716 may be moved alone, i.e., considered as the component, or adjusted together with another component, i.e., considered separate from the component (represented by way of the dotted line in FIG. 23).

Although several preferred embodiments are illustrated and described above, there are other possible combinations using different sensors which measure either the same or different morphological characteristics, such as knee position, of an occupant to accomplish the same or similar goals as those described herein.

It should be mentioned that the adjustment system may be used in conjunction with each vehicle seat. In this case, if a seat is determined to be unoccupied, then the processor means may be designed to adjust the seat for the benefit of other occupants, i.e., if a front passenger side seat is unoccupied but the rear passenger side seat is occupied, then adjustment system might adjust the front seat for the benefit of the rear-seated passenger, e.g., move the seat base forward.

Referring now to FIGS. 24-37, heads-up displays and inputs to such displays will now be described.

Touch screens based on surface acoustic waves are well known in the art. The use of this technology for a touch pad for use with a heads-up display is disclosed in the current assignee's U.S. patent application Ser. No. 09/645,709. The use of surface acoustic waves in either one or two dimensional applications has many other possible uses such as for pinch protection on window and door closing systems, crush sensing crash sensors, occupant presence detector and butt print measurement systems, generalized switches such as on the circumference or center of the steering wheel, etc. Since these devices typically require significantly more power than the micromachined SAW devices discussed above, most of these applications will require a power connection. On the other hand, the output of these devices can go through a SAW micromachined device or, in some other manner, be attached to an antenna and interrogated using a remote interrogator thus eliminating the need for a direct wire communication link. Other wireless communications systems can also be used.

One example is to place a surface acoustic wave device on the circumference of the steering wheel. Upon depressing a section of this device, the SAW wave would be attenuated. The interrogator could notify the acoustic wave device at one end of the device to launch an acoustic wave and then monitor output from the antenna. Depending on the phase, time delay, and/or amplitude of the output wave, the interrogator would know where the operator had depressed the steering wheel SAW switch and therefore know the function desired by the operator.

Figure 24:
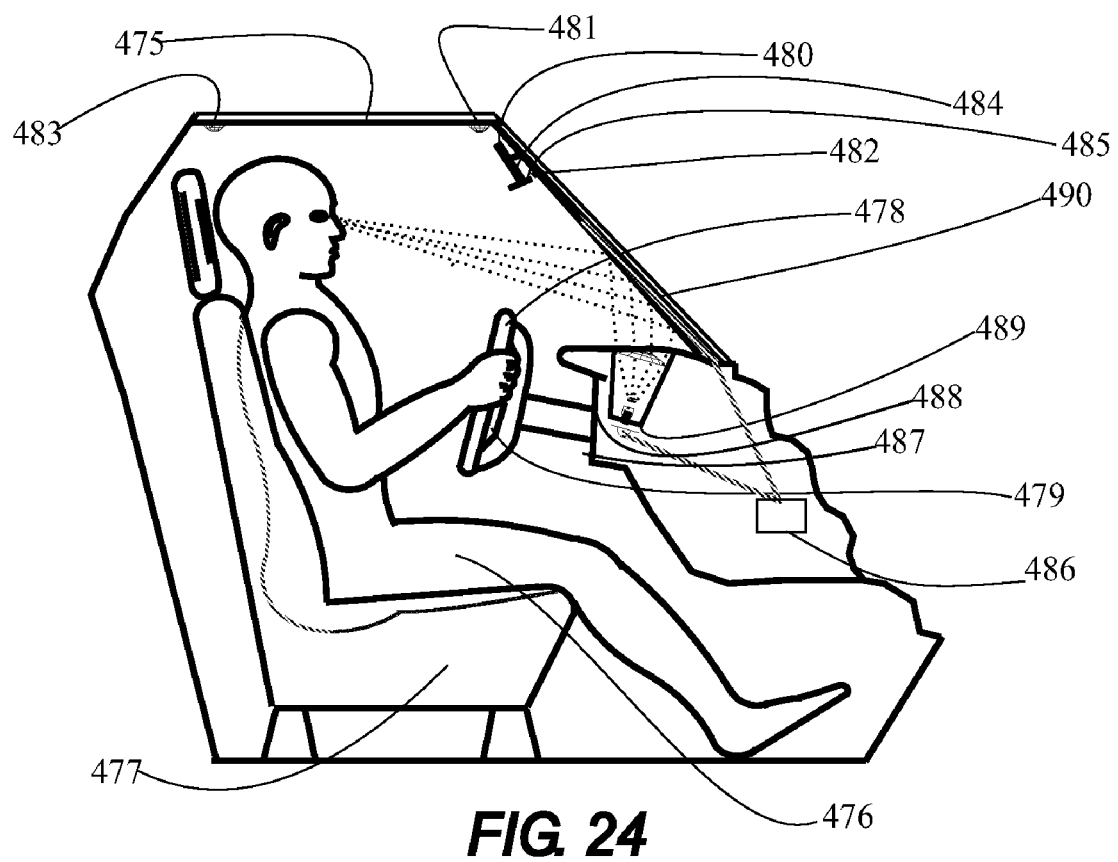
FIG. 24 is a cross section view of a vehicle with heads-up display and steering wheel having a touch pad.

A section of the passenger compartment of an automobile is shown generally as 475 in FIG. 24. A driver 476 of the automobile sits on a seat 477 behind a steering wheel 478 that contains an airbag assembly 479 with a touch pad data entry device, not shown. A heads-up display (HUD) 489 is positioned in connection with instrument panel 488 and reflects off of windshield 490. Three transmitter and/or receiver assemblies (transducers) 481, 482, 483 are positioned at various places in the passenger compartment to determine the height and location of the head of the driver relative to the heads-up display 489. Only three such transducers are illustrated in FIG. 24. In general, four such transducers are used for ultrasonic implementation, however, in some implementations as few as two and as many as six are used for a particular vehicle seat. For optical implementations, a single camera can be used.

FIG. 24 illustrates several of the possible locations of such occupant position devices. For example, transmitter and receiver 481 emits ultrasonic or infrared waves which illuminate the head of the driver. In the case of ultrasonic transducers, periodically a burst of ultrasonic waves at typically 40-50 kilohertz is emitted by the transmitter of the transducer and then the echo, or reflected signal, is detected by the receiver of the same transducer (or a receiver of a different device). An associated electronic circuit measures the time between the transmission and the reception of the ultrasonic waves and thereby determines the distance in the Z direction from the transducer to the driver based on the velocity of sound. When an infrared system is used, the receiver is a CCD, CMOS or similar device and measures the position of the occupant's head in the X and Y directions. The X, Y and Z directions make up an orthogonal coordinate system with Z lying along the axis of the transducer and X and Y lying in the plane of the front surface of the transducer.

It is contemplated that devices which use any part of the electromagnetic spectrum can be used to locate the head of an occupant and herein a CCD will be defined as any device that is capable of converting electromagnetic energy of any frequency, including infrared, ultraviolet, visible, radar, and lower frequency radiation capacitive devices, into an electrical signal having information concerning the location of an object within the passenger compartment of a vehicle. In some applications, an electric field occupant sensing system can locate the head of the driver.

The information from the transducers is then sent to an electronics control module that determines if the eyes of the driver are positioned at or near to the eye ellipse for proper viewing of the HUD 489. If not, either the HUD 489 is adjusted or the position of the driver is adjusted to better position the eyes of the driver relative to the HUD 489, as described in more detail below. Although a driver system has been illustrated, a system for the passenger would be identical for those installations where a passenger HUD is provided. The details of the operation of the occupant position system can be found in U.S. Pat. No. 5,653,462, U.S. Pat. No. 5,829,782, U.S. Pat. No. 5,845,000, U.S. Pat. No. 5,822,707, U.S. Pat. No. 5,748,473, U.S. Pat. No. 5,835,613, U.S. Pat. No. 5,943,295, and U.S. Pat. No. 5,848,802 among others. Although a HUD is disclosed herein, other displays are also applicable and this invention is not limited to HUD displays.

In addition to determining the location of the eyes of the driver, his or her mouth can also be simultaneously found. This permits, as described more detail below, the adjustment of a directional microphone to facilitate accurate voice input to the system.

Electromagnetic or ultrasonic energy can be transmitted in three modes in determining the position of the head of an occupant. In most of the cases disclosed in the above referenced patents, it is assumed that the energy will be transmitted in a broad diverging beam which interacts with a substantial portion of the occupant. This method has the disadvantage that it will reflect first off the nearest object and, especially if that object is close to the transmitter, it may mask the true position of the occupant. Generally, reflections from multiple points are used and this is the preferred ultrasonic implementation. The second mode uses several narrow beams that are aimed in different directions toward the occupant from a position sufficiently away from the occupant that interference is unlikely. A single receptor can be used provided the beams are either cycled on at different times or are of different frequencies. However, multiple receptors are in general used to eliminate the effects of signal blockage by newspapers etc. Another approach is to use a single beam emanating from a location that has an unimpeded view of the occupant such as the windshield header or headliner. If two spaced-apart CCD array receivers are used, the angle of the reflected beam can be determined and the location of the occupant can be calculated. The third mode is to use a single beam in a manner so that it scans back and forth and/or up and down, or in some other pattern, across the occupant. In this manner, an image of the occupant can be obtained using a single receptor and pattern recognition software can be used to locate the head, chest, eyes and/or mouth of the occupant. The beam approach is most applicable to electromagnetic energy but high frequency ultrasound can also be formed into a beam. The above-referenced patents provide a more complete description of this technology. One advantage of the beam technology is that it can be detected even in the presence of bright sunlight at a particular frequency.

Each of these methods of transmission or reception can be used, for example, at any of the preferred mounting locations shown in FIG. 24.

Directional microphone 485 is mounted onto mirror assembly 484 or at another convenient location. The sensitive direction of the microphone 485 can also be controlled by the occupant head location system so that, for voice data input to the system, the microphone 485 is aimed in the approximate direction of the mouth of the driver. A description of various technologies that are used in constructing directional microphones can be found in U.S. Pat. No. 4,528,426, U.S. Pat. No. 4,802,227, U.S. Pat. No. 5,216,711, U.S. Pat. No. 5,381,473, U.S. Pat. No. 5,226,076, U.S. Pat. No. 5,526,433, U.S. Pat. No. 5,673,325, U.S. Pat. No. 5,692,060, U.S. Pat. No. 5,703,957, U.S. Pat. No. 5,715,319, U.S. Pat. No. 5,825,898 and U.S. Pat. No. 5,848,172. A preferred design will be discussed in detail below.

Figure 25:
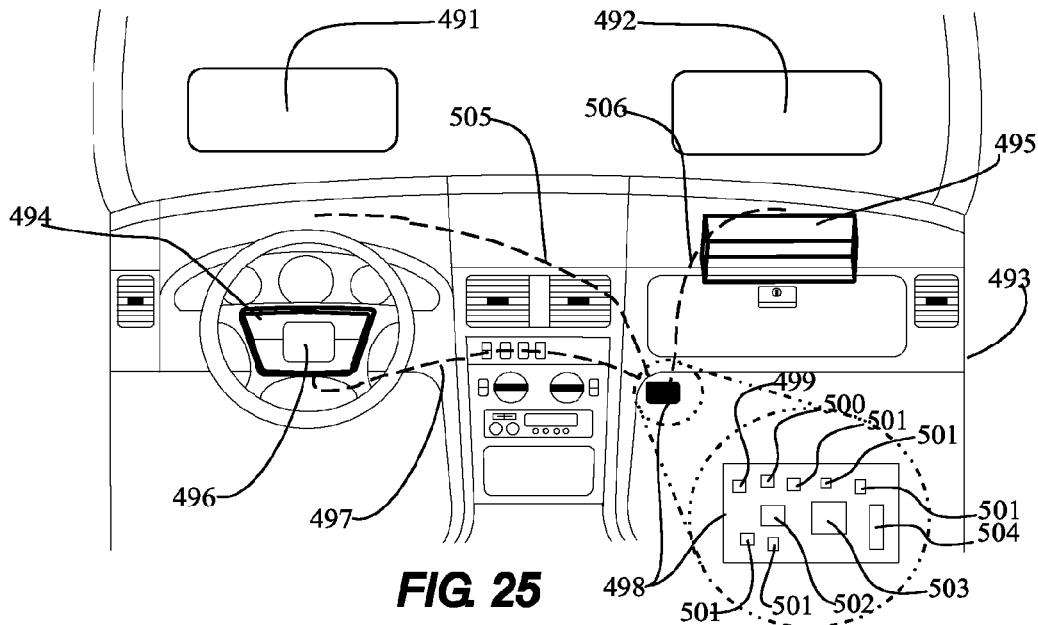
FIG. 25 is a view of the front of a passenger compartment of an automobile with portions cut away and removed showing driver and passenger heads-up displays and a steering wheel mounted touch pad.

FIG. 25 is a view of the front of a passenger compartment 493 of an automobile with portions cut away and removed, having dual airbags 494, 495 and an electronic control module 498 containing a HUD control system comprising various electronic circuit components shown generally as 499, 500, 501, 502 and microprocessor 503. The exact selection of the circuit components depends on the particular technology chosen and functions performed by the occupant sensor and HUDs 491,492. Wires 505 and 506 lead from the control module 498 to the HUD projection units, not shown, which projects the information onto the HUDs 491 and 492 for the driver and passenger, respectively. Wire 497 connects a touch pad 496 located on the driver steering wheel to the control module 498. A similar wire and touch pad are provided for the passenger but are not illustrated in FIG. 25.

The microprocessor 503 may include a determining system for determining the location of the head of the driver and/or passenger for the purpose of adjusting the seat to position either occupant so that his or her eyes are in the eye ellipse or to adjust the HUD 491,492 for optimal viewing by the occupant, whether the driver or passenger. The determining system would use information from the occupant position sensors such as 481, 482, 483 or other information such as the position of the vehicle seat and seat back. The particular technology used to determine the location of an occupant and particularly of his or her head is preferably based on pattern recognition techniques such as neural networks, combination neural networks or neural fuzzy systems, although other probabilistic, computational intelligence or deterministic systems can be used, including, for example, pattern recognition techniques based on sensor fusion. When a neural network is used, the electronic circuit may comprise a neural network processor. Other components on the circuit include analog to digital converters, display driving circuits, etc.

Figure 26A:
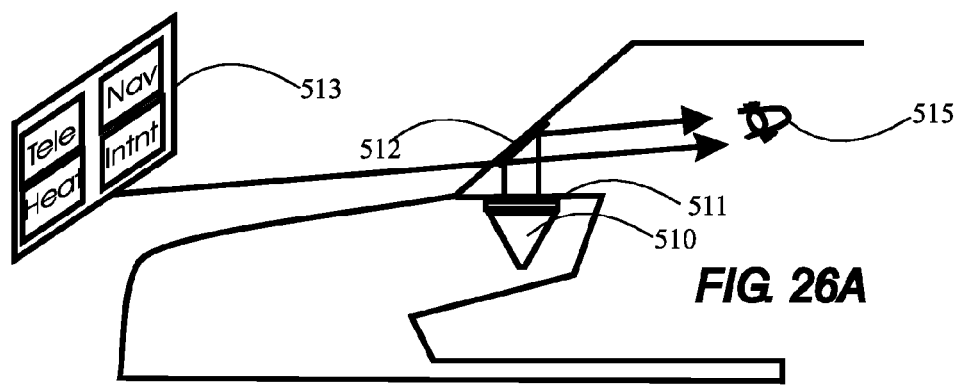
FIG. 26A is a view of a heads-up display shown on a windshield but seen by a driver projected in front of the windshield.

FIG. 26A is a view of a heads-up display shown on a windshield but seen by a driver projected in front of the windshield and FIGS. 26B-26G show various representative interactive displays that can be projected onto the heads-up display.

The heads-up display projection system 510 projects light through a lens system 511 through holographic combiner or screen 512, which also provides columniation, which reflects the light into the eyes 515 of driver. The focal point of the display makes it appear that it is located in front of the vehicle at 513. An alternate, preferred and equivalent technology that is now emerging is to use a display made from organic light emitting diodes (OLEDs). Such a display can be sandwiched between the layers of glass that make up the windshield and does not require a projection system.

The informational content viewed by the driver at 513 can take on the variety of different forms examples of which are shown in FIGS. 26B-26G. Naturally, many other displays and types of displays can be projected onto the holographic screen 512 in addition to those shown in FIGS. 26B-26G. The displays that are generally on the instrument panel such as the fuel and oil levels, engine temperature, battery condition, the status of seatbelts, doors, brakes, lights, high beams, and turn signals as well as fuel economy, distance traveled, average speed, distance to empty, etc. can be optionally displayed. Other conventional HUD examples include exception messages such as shut off engine, overheating, etc.

Figure 26B:
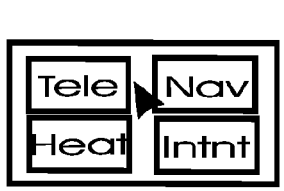
FIGS. 26B-26G show various representative interactive displays that can be projected on to the heads-up display.

FIG. 26B illustrates the simplest of the types of displays that are contemplated by this invention. In this display, the driver can select between the telephone system (Tele), heating system (Heat), navigation system (Nav) or Internet (Intnt). This selection can be made by either pressing the appropriate section of the touch pad or by using a finger to move the cursor to where it is pointing to one of the selections (see FIG. 26B), then by tapping on the touch pad at any location or by pushing a dedicated button at the side of the touch pad, or at some other convenient location. Alternately, a voice or gesture input can be used to select among the four options. The switch system can be located on the steering wheel rim, or at some other convenient place, as described above with reference to FIGS. 170A-171. The operation of the voice system will be described in more detail below. If the voice system is selected, then the cursor may automatically move to the selection and a momentary highlighting of the selection can take place indicating to the operator what function was selected.

For this elementary application of the heads-up display, a choice of one of the buttons may then result in a new display having additional options. If the heating option is selected, for example, a new screen perhaps having four new buttons would appear. These buttons could represent the desired temperature, desired fan level, the front window-defrost and the rear window defrost. The temperature button could be divided into two halves one for increasing the temperature and the other half for decreasing the temperature. Similarly, the fan button can be set so that one side increases the fan speed and the other side decreases it. Similar options can also be available for the defrost button. Once again, the operator could merely push at the proper point on the touch pad or could move the cursor to the proper point and tap anywhere on the touch pad or press a pre-assigned button on the steering wheel hub or rim, arm rest or other convenient location. When a continuous function is provided, for example, the temperature of the vehicle, each tap could represent one degree increase or decrease of the temperature.

Figure 26C:
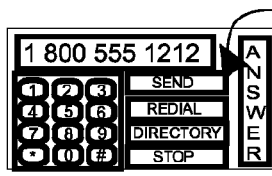
Figure 26D:
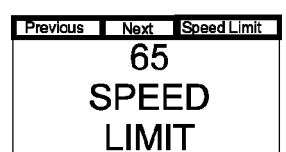

A more advanced application is shown in FIG. 26C where the operator is presented with a touch pad for dialing phone numbers after he or she has selected the telephone (Tele) from the first screen. The operator can either depress the numbers to the dial a phone number, in which case, the keypad or touch pad, or steering wheel rim, may be pre-textured to provide a tactile feel for where the buttons are located, or the driver can orally enunciated the numbers. In either case, as the numbers are selected they would appear in the top portion of the display. Once the operator is satisfied that the number is correct, he or she can push SEND to initiate the call. If the line is busy, a push of the STOP button stops the call and later a push of the REDIAL button can reinitiate the call. An automatic redial feature can also be included. A directory feature is also provided in this example permitting the operator to dial a number by selecting or saying a rapid-dial code number or by a mode such as the first name of the person. Depressing the directory button, or by saying "directory", would allow the directory to appear on the screen.

In congested traffic, bad weather, or other poor visibility conditions, a driver, especially in an unknown area, may fail to observe important road signs along the side of the road. Also, such signs may be so infrequent that the driver may not remember what the speed limit is on a particular road, for example. Additionally, emergency situations can arise where the driver should be alerted to the situation such as "icy road ahead", "accident ahead", "construction zone ahead", etc. There have been many proposals by the Intelligent Transportation Systems community to provide signs on the sides of roads that automatically transmit information to a car equipped with the appropriate reception equipment. In other cases, a vehicle which is equipped with a route guidance system would have certain unchanging information available from the in-vehicle map database. When the driver missed reading a particular sign, the capability can exist for the driver to review previous sign displays (see FIG. 26D). Similarly, when the driver wants to become aware of approaching signs, he or she can view the contents of signs ahead provided that information is in the route guidance database within the vehicle. This system permits the vehicle operator to observe signs with much greater flexibility, and without concern of whether a truck is blocking the view of signs on a heads-up display that can be observed without interfering with the driver's ability to drive the vehicle. This in-vehicle signage system can get its information from transmissions from road signs or from vehicle resident maps or even from an Internet connection if the vehicle is equipped with a GPS system so that it knows its location. If necessary, the signs can be translated into any convenient language.

Figure 26E:

FIG. 26E is a more sophisticated application of the system. In this case, the driver desires route guidance information which can be provided in many forms. A map of the area where the driver is driving appears on the heads-up or other display along with various options such as zoom-in (+) and zoom-out (−). With the map at his ready view, the driver can direct himself following the map and, if the vehicle has a GPS system or preferably a differential GPS system, he can watch his progress displayed on the map as he drives. When the driver needs assistance, he or she can activate the assistance button which will notify an operator, such as an OnStar™ operator, and send the vehicle location as well as the map information to the operator. The operator then can have the capability of taking control of the map being displayed to the driver and indicate on that map, the route that the driver is to take to get to his or her desired destination. The operator could also have the capability of momentarily displaying pictures of key landmarks that the driver should look for and additionally be able to warn the driver of any approaching turns, construction zones, etc. There are route guidance programs that can perform some of these functions and it is anticipated that in general, these programs would be used in conjunction with the heads-up display map system as taught herein. For drivers who prefer the assistance of an individual, the capability described above can be provided.

All of the commands that are provided with the cursor movement and buttons that would be entered through the touch pad can also be entered as voice or gesture commands. In this case, the selections could be highlighted momentarily so that the operator has the choice of canceling the command before it is executed. Another mouse pad or voice or gesture input can cause an e-mail to be read aloud to the vehicle occupant (see the discussion of FIG. 26F below). The heads-up display thus gives valuable feedback to the voice system again without necessitating the driver to look away from the road.

Figure 26F:
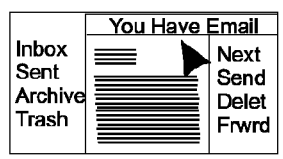
Figure 26G:

If the Internet option was chosen, the vehicle operator would have a virtually unlimited number of choices as to what functions to perform as he surfs the Internet. One example is shown in FIG. 26F where the operator has been informed that he has e-mail. It is possible, for example, to have as one of the interrupt display functions on the heads-up display at all times, an indicator that an e-mail has arrived. Thus, for example, if the driver was driving without the heads-up display activated, the receipt of the e-mail could cause activation of the heads-up display and a small message indicating to the driver that he or she had received e-mail. This is an example of a situation interrupt. Other such examples include the emergency in-vehicle signage described above. Another vehicle resident system can cause the HUD or other display to be suspended if the vehicle is in a critical situation such as braking, lane changing etc. where the full attention of the driver is required to minimize driver distraction.

Once the operator has selected e-mail as an option, he or she would then have the typical choices available on the Internet e-mail programs. Some of these options are shown on the display in FIG. 26F. There may be concern that drivers should not be reading e-mail while driving a vehicle. On the other hand, drivers have no problem reading signs as they drive down the highway including large numbers of advertisements. If the e-mail is properly formatted so that it is easy to read, a normal driver should have no problem reading e-mail any more than reading billboards as he or she operates the vehicle in a safe manner. It could also be read aloud to the driver using text-to-speech software. He or she can even respond to an e-mail message by orally dictating an answer into a speech to text program.

In the future when vehicles are autonomously guided, a vehicle operator may wish to watch his favorite television show or a movie while the trip is progressing. This is shown generally in FIG. 26G.

The above are just a few examples of the incredible capability that becomes available to the vehicle operator, and also to a vehicle passenger, through the use of an interactive heads-up display along with a device to permit interaction with heads-up display. The interactive device can be a touch pad or switches as described above or a similar device or a voice or gesture input system that will be described in more detail below.

Although the touch pad described above primarily relates to a device that resides in the center of the steering wheel. This need not be the case and a touch pad is generally part of a class of devices that rely on touch to transfer information to and from the vehicle and the operator. These devices are generally called haptic devices and such devices can also provide feedback to the operator. Such devices can be located at other convenient locations in association with the steering wheel and can be in the form of general switches that derive their function from the particular display that has been selected by the operator. In general, for the purposes herein, all devices that can have changing functions and generally work in conjunction with a display are contemplated. One example would be a joystick located at a convenient place on the steering wheel, for example, in the form of a small tip such as is commonly found of various laptop computers. Another example is a series of switches that reside on the steering wheel rim. Also contemplated is a voice input in conjunction with a HUD.

An audio feedback can be used along with or in place of a HUD display. As a person presses the switches on the steering wheel to dial a phone number, the audio feedback could announce the numbers that were dialed.

Many other capabilities and displays can be provided a few of which will now be discussed. In-vehicle television reception was discussed above which could come from either satellite transmissions or through the Internet. Similarly, video conferencing becomes a distinct possibility in which case, a miniature camera would be added to the system. Route guidance can be facilitated by various levels of photographs which depict local scenes as seen from the road. Additionally, tourist spots can be highlighted with pictures that are nearby as the driver proceeds down the highway. The driver could have the capability of choosing whether or not he or she wishes to hear or see a description of upcoming tourist attractions.

Various functions that enhance vehicle safety can also make use of the heads-up display. These include, for example, images of or icons representing objects which occupy the blind spots which can be supplemented by warning messages should the driver attempt to change lanes when the blind spot is occupied. Many types of collision warning aids can be provided including images or icons which can be enhanced along with projected trajectories of vehicles on a potential collision path with the current vehicle. Warnings can be displayed based on vehicle-mounted radar systems, for example, those which are used with intelligent cruise control systems, when the vehicle is approaching another vehicle at too high a velocity. Additionally, when passive infrared sensors are available, images of or icons representing animals that may have strayed onto the highway in front of the vehicle can be projected on the heads-up display along with warning messages. In more sophisticated implementations of the system, as described above, the position of the eyes of the occupant will be known and therefore the image or icon of such animals or other objects which can be sensed by the vehicle's radar or infrared sensors, can be projected in the proper size and at the proper location on the heads-up display so that the object appears to the driver approximately where it is located on the highway ahead. This capability is difficult to accomplish without an accurate knowledge of the location of the eyes of the driver.

In U.S. Pat. No. 5,845,000, and other related patents on occupant sensing, the detection of a drowsy or otherwise impaired or incapacitated driver is discussed. If such a system detects that the driver may be in such a condition, the heads-up display can be used to test the reaction time of the driver by displaying a message such as "Touch the touch pad" or "sound the horn". If the driver fails to respond within a predetermined time, a warning signal can be sounded and the vehicle slowly brought to a stop with the hazard lights flashing. Additionally, the cellular phone or other telematics system can be used to summon assistance.

There are a variety of other services that can be enhanced with the heads-up display coupled with the data input systems described herein. These include the ability using either steering wheel switches, the touch pad or the voice or gesture input system to command a garage door to be opened. Similarly, lights in a house can be commanded either orally, through gestures or through the touch pad or switches to be turned on or off as the driver approaches or leaves the house. When the driver operates multiple computer systems, one at his or her house, another in the automobile, and perhaps a third at a vacation home or office, upon approaching one of these installations, the heads-up display can interrogate the computer at the new location, perhaps through Bluetooth™ or other wireless system to determine which computer has the latest files and then automatically synchronize the files. A system of this type would be under a security system that could be based on recognition of the driver's voiceprint, or other biometric measure for example. A file transfer would be initiated then either orally, by gesture or through the touch pad or switches prior to the driver leaving the vehicle that would synchronize the computer at the newly arrived location with the computer in the vehicle. In this manner, as the driver travels from location to location, wherever he or she visits as long as the location has a compatible computer, the files on the computers can all be automatically synchronized.

There are many ways that the information entered into the touch pad or switches can be transmitted to the in-vehicle control system or in-vehicle computer. All such methods including multiple wire, multiplex signals on a single wire pair, infrared or radio frequency are contemplated by this invention. Similarly, it is contemplated that this information system will be part of a vehicle data bus that connects many different vehicle systems into a single communication system.

In the discussion above, it has been assumed that the touch pad or switches would be located on the steering wheel, at least for the driver, and that the heads-up display would show the functions of the steering wheel touch pad areas, which could be switches, for example. With the heads-up display and touch pad technology it is also now possible to put touch pads or appropriate switches at other locations in the vehicle and still have their functions display on the heads-up display. For example, areas of the perimeter of steering wheel could be designed to act as touch pads or as switches and those switches can be displayed on the heads-up display and the functions of those switches can be dynamically assigned. Therefore, for some applications, it would be possible to have a few switches on the periphery of steering wheel and the functions of those switches could be changed depending upon the display of the heads-up display and of course the switches themselves can be used to change contents of that display. Through this type of a system, the total number of switches in the vehicle can be dramatically reduced since a few switches can now perform many functions. Similarly, if for some reason one of the switches becomes inoperable, another switch can be reassigned to execute the functions that were executed by the inoperable switch. Furthermore, since the touch pad technology is relatively simple and unobtrusive, practically any surface in the vehicle can be turned into a touch pad. In the extreme, many if not most of the surfaces of the interior of the vehicle could become switches as a sort of active skin for the passenger compartment. In this manner, the operator could choose at will where he would like the touch pad or switches to be located and could assign different functions to that touch pad or switch and thereby totally customize the interior of the passenger compartment of the vehicle to the particular sensing needs of the individual. This could be especially useful for people with disabilities.

The communication of the touch pad with the control systems in general can take place using wires. As mentioned above, however, other technologies such as wireless technologies using infrared or radio frequency can also be used to transmit information from the touch pad or switches to the control module (both the touch pad and control module thereby including a wireless transmission/reception unit which is known in the art). In the extreme, the touch pad or switches can in fact be totally passive devices that receive energy to operate from a radio frequency or other power transmission method from an antenna within the automobile. In this manner, touch pads or switches can be located at many locations in the vehicle without necessitating wires. If a touch pad were energized for the armrest, for example, the armrest can have an antenna that operates very much like an RFID or SAW tag system as described in U.S. Pat. No. 6,662,642. It would receive sufficient power from the radio waves broadcast within the vehicle, or by some other wireless method, to energize the circuits, charge a capacitor and power the transmission of a code represented by pressing the touch pad switch back to the control module. In some cases, a cable can be placed so that it encircles the vehicle and used to activate many wireless input devices such as tire gages, occupant seat weight sensors, seat position sensors, temperature sensors, switches etc. In the most advanced cases, the loop can even provide power to motors that run the door locks and seats, for example. In this case, an energy storage device such as a rechargeable battery or ultra-capacitor could, in general, be associated with each device.

When wireless transmission technologies are used, many protocols exist for such information transmission systems with Bluetooth™ or Wi-Fi as preferred examples. The transmission of information can be at a single frequency, in which case, it could be frequency modulated or amplitude modulated, or it could be through a pulse system using very wide spread spectrum technology or any other technology between these two extremes.

When multiple individuals are operators of the same vehicle, it may be necessary to have some kind of password or security system such that the vehicle computer system knows or recognizes the operator. The occupant sensing system, especially if it uses electromagnetic radiation near the optical part of spectrum, can probably be taught to recognize the particular operators of the vehicle. Alternately, a simple measurement of morphological characteristics such as weight, height, fingerprint, voiceprint and other such characteristics, could be used to identify the operator. Alternately, the operator can orally enunciate the password or use the touch pad or switches to enter a password. More conventional systems, such as a coded ignition key or a personal RFID card, could serve the same purpose. By whatever means, once the occupant is positively identified, then all of the normal features that accompany a personal computer can become available such as bookmarks or favorites for operation of the Internet and personalized phonebooks, calendars, agendas etc. Then, by the computer synchronization system described above, all computers used by a particular individual can contain the same data. Updating one has the effect of updating them all. One could even imagine that progressive hotels would have a system to offer the option to synchronize a PC in a guest's room to the one in his or her vehicle.

One preferred heads-up projection system will now be described. This system is partially described in U.S. Pat. Nos. 5,473,466 and 5,051,738. A schematic of a preferred small heads-up display projection system 510 is shown in FIG. 27. A light source such as a high-power monochromatic coherent laser is shown at 520. Output from this laser 520 is passed through a crystal 521 of a material having a high index of refraction such as the acoustic-optical material paratellurite. An ultrasonic material 522 such as lithium niobate is attached to two sides of the paratellurite crystal, or alternately two in series crystals. When the lithium niobate 522 is caused to vibrate, the ultrasonic waves are introduced into the paratellurite 521 causing the laser beam to be diffracted. With a properly chosen set of materials, the laser beam can be caused to diffract by as much as about 3 to 4 degrees in two dimensions. The light from the paratellurite crystal 521 then enters lens 523 which expands the scanning angle to typically 10 degrees where it is used to illuminate a 1 cm square garnet crystal 524. The garnet crystal 524 contains the display to be projected onto the heads-up display as described in the aforementioned patents. The laser light modulated by the garnet crystal 524 now enters lens 525 where the scanning angle is increased to about 60 degrees. The resulting light travels to the windshield that contains a layer of holographic and collimating material 512 that has the property that it totally reflects the monochromatic laser light while passing light of all other frequencies. The light thus reflects off the holographic material into the eyes of the driver 515 (see FIG. 26A).

The intensity of light emitted by light source 520 can be changed by manually adjustment using a brightness control knob, not shown, or can be set automatically to maintain a fixed display contrast ratio between the display brightness and the outside world brightness independent of ambient brightness. The automatic adjustment of the display contrast ratio is accomplished by one or more ambient light sensors, not shown, whose output current is proportional to the ambient light intensity. Appropriate electronic circuitry is used to convert the sensor output to control the light source 520. In addition, in some cases it may be necessary to control the amount of light passing through the combiner, or the windshield for that matter, to maintain the proper contrast ratio. This can be accomplished through the use of electrochromic glass or a liquid crystal filter, both of which have the capability of reducing the transmission of light through the windshield either generally or at specific locations. Another technology that is similar to liquid crystals is "smart glass" manufactured by Frontier Industries.

Naturally, corrections must be made for optical aberrations resulting from the complex aspheric windshield curvature and to adjust for the different distances that the light rays travel from the projection system to the combiner so that the observer sees a distortion free image. Methods and apparatus for accomplishing these functions are described in assignee's patents mentioned above. Thus, a suitable optical assembly can be designed in view of the disclosure above and in accordance with conventional techniques by those having ordinary skill in the art.

Most of the heads-up display systems described in the prior art patents can be used with the invention described herein. The particular heads-up display system illustrated in FIG. 27 has advantages when applied to automobiles. First, the design has no moving parts such as rotating mirrors, to create the laser scanning pattern. Second, it is considerably smaller and more compact than all other heads-up display systems making it particularly applicable for automobile instrument panel installation where space is at a premium. The garnet crystal 524 and all other parts of the optics are not significantly affected by heat and therefore sunlight which happens to impinge on the garnet crystal 524, for example, will not damage it. A filter (not shown) can be placed over the entire system to eliminate all light except that of the laser frequency. The garnet crystal display system has a further advantage that when the power is turned off, the display remains. Thus, when the power is turned on the next time the vehicle is started, the display will be in the same state as it was when the vehicle was stopped and the ignition turned off.

U.S. Pat. No. 5,414,439 states that conventional heads-up displays have been quite small relative to the roadway scene due to the limited space available for the required image source and projection mirrors. The use of the garnet crystal display as described herein permits a substantial increase in the image size solving a major problem of previous designs. There are additional articles and patents that relate to the use of OLEDs for display purposes. The use of OLEDs for automotive windshield displays is unique to the invention herein and contemplated for use with any and all vehicle windows.

An airbag-equipped steering wheel 528 containing a touch pad 529 according to the teachings of this invention is shown in FIG. 28. A variety of different touch pad technologies will now be described.

A touch pad based on the principle of reflection of ultrasonic waves is shown in FIG. 29 where once again the steering wheel is represented by reference numeral 528 and the touch pad in general is represented by reference numeral 529. In FIG. 29A, a cross-section of the touch pad is illustrated. The touch pad 529 comprises a semi-rigid material 530 having acoustic cavities 531 and a film of PVDF 533 containing conductors, i.e., strips of conductive material with one set of strips 532 running in one direction on one side of the film 533 and the other set of strips 534 running in an orthogonal direction on the opposite side of the film 533. Foam 535 is attached to the film 533. When a voltage difference is applied across the film 533 by applying a voltage drop across an orthogonal pair of conductors, the area of the film 533 where the conductors 532,534 cross is energized. If a 100 kHz signal is applied across that piece of film, it is caused to vibrate at 100 kHz emitting ultrasound into the foam 535. If the film 533 is depressed by a finger, for example, the time of flight of the ultrasound in the foam 535 changes, which also causes the impedance of the film 533 to change at that location. This impedance change can be measured across the two exciting terminals and the fact that the foam 535 was depressed can thereby be determined. A similar touch pad geometry is described in U.S. Pat. No. 4,964,302. The basic principles of operation of such a touch pad are described in detail in that patent and therefore will not be repeated here. FIG. 29A also shows a portion of the film and conductive strips of the touch pad including the film 533 and conductive strips 532 and 534. The film 533 is optionally intentionally mechanically weakened at 536 to facilitate opening during the deployment of the airbag.

Another touch pad design based on ultrasound in a tube as disclosed in U.S. Pat. No. 5,629,681 is shown generally at 529 in the center of steering wheel 528 in FIG. 30. In FIG. 30, the cover of the touch pad 529 has been removed to permit a view of the serpentine tube 537. The tube 537 is manufactured from rubber or another elastomeric material. The tube 537 typically has an internal diameter between about ⅛ and about ¼ inches. Two ultrasonic transducers 538 and 539 are placed at the ends of the tube 537 such as Murata 40 kHz transducer part number MA40S4R/S. Periodically and alternately, each transducer 538,539 will send a few cycles of ultrasound down the tube 537 to be received by the other transducer if the tube 537 is not blocked. If a driver places a finger on the touch pad 529 and depresses the cover sufficiently to begin collapsing one or more of the tubes 537, the receiving transducer will receive a degraded signal or no signal at all at the expected time. Similarly, the depression will cause a reflection of the ultrasonic waves back to the sending transducer. By measuring the time of flight of the ultrasound to the depression and back, the location on the tube 537 where the depression occurs can be determined. During the next half cycle, the other transducer will attempt to send ultrasound to the first transducer. If there is a partial depression, a reduced signal will be received at the second transducer and if the tube 537 is collapsed, then no sound will be heard by the second transducer. With this rather simple structure, the fact that a small depression takes place anywhere in the tube labyrinth can be detected sufficiently to activate the heads-up display. Then, when the operator has chosen a function to be performed and depressed the cover of the touch pad sufficiently to substantially or completely close one or more tubes 537, indicating a selection of a particular service, the service may be performed as described in more detail above. This particular implementation of the invention does not readily provide for control of a cursor on the heads-up display. For this implementation, therefore, only the simpler heads-up display's involving a selection of different switching functions can be readily performed.

In FIGS. 31 and 31A, a force sensitive touch pad is illustrated generally at 529 and comprises a relatively rigid plate which has been pre-scored at 540 so that it opens easily when the airbag is deployed. Load or force sensing pads 541 are provided at the four corners of the touch pad 529 (FIG. 31A). Pressing on the touch pad 529 causes a force to be exerted on the four load sensing pads 541 and by comparing the magnitudes of the force, the position and force of a finger on the touch pad 529 can be determined as described in U.S. Pat. No. 5,673,066.

In FIG. 32, a thin capacitive mounted touch pad is illustrated and is similar to the touch pad described in FIG. 3A of U.S. Pat. No. 5,565,658. Steering wheel 528 contains the touch pad assembly 529. The touch pad assembly 529 comprises a ground conductor 547, a first insulating area 546, which can be in the form of a thin coating of paint or ink, a first conducting layer or member 545, which can be a screen printed conducting ink, a second insulating area of 544 which also can be in the form of a paint or ink and a second conducting layer or member 543, which again can be a screen printed ink. The two conducting layers 543, 545 are actually strips of conducting material and are placed orthogonal to each other. Finally, there is an insulating overlay 542 which forms the cover of the touch pad assembly 529. Although the assembly 529 is very thin, typically measuring less than about 0.1 inches thick, one area of the assembly at 548 is devoid of all of the layers except the conductive layer 545. In this manner, when the airbag (mounted under the tough pad 529) deploys, the assembly 529 will easily split (at 548) permitting the airbag cover to open and the airbag to be deployed. The operation of capacitive touch pads of this type is adequately described in the above referenced patent and will not be repeated here.

FIGS. 33 and 33A show an alternate touch pad design similar to FIG. 12 of U.S. Pat. No. 4,198,539. This touch pad design 529 comprises an insulating area 549, a conductive area 550, a semi-conductive or pressure sensitive resistive layer 551, a thin conducting foil 552 and an insulating cover 553, which forms the cover of the airbag assembly. The operation of touch pads of this type is disclosed in detail in the above referenced patent and will not be repeated here.

The interior of a passenger vehicle is shown generally at 560 in FIGS. 34A and 34B. These figures illustrate two of the many alternate positions for touch pads, in this case for the convenience of the passenger. One touch pad 561 is shown mounted on the armrest within easy reach of the right hand of the passenger (FIG. 34A). The second installation 562 is shown projected out from the instrument panel 563. When not in use, this assembly can be stowed in the instrument panel 563 out of sight. When the passenger intends on using the touch pad 562, he or she will pull the touch pad assembly 562 by handle 564 bringing the touch pad 562 toward him or her. For prolonged use of the touch pad 562, the passenger can remove the touch pad 562 from the cradle and even stow the cradle back into the instrument panel 563. The touch pad 562 can then be operated from the lap of the passenger. In this case, the communication of the touch pad 562 to the vehicle is done by either infrared or radio frequency transmission or by some other convenient wireless method or with wires.

Referring now to FIG. 35, an automatic seat adjustment system is shown generally at 570 with a movable headrest 572 and ultrasonic sensor 573 and ultrasonic receiver 574 for measuring the height of the occupant of the seat as taught in U.S. Pat. No. 5,822,707. Motors 592, 593, and 594 connected to the seat for moving the seat, a control circuit or module 577 connected to the motors and a headrest actuation mechanism using motors 578 and 586, which may be servo-motors, are also illustrated. The seat 571 and headrest 572 are shown in phantom. Vertical motion of the headrest 572 is accomplished when a signal is sent from control module 577 to servo motor 578 through a wire 575. Servo motor 578 rotates lead screw 580 which engages with a threaded hole in member 581 causing it to move up or down depending on the direction of rotation of the lead screw 580. Headrest support rods 582 and 583 are attached to member 581 and cause the headrest 572 to translate up or down with member 581. In this manner, the vertical position of the headrest can be controlled as depicted by arrow A-A.

Wire 576 leads from control module 577 to servo motor 586 which rotates lead screw 588. Lead screw 588 engages with a threaded hole in shaft 589 which is attached to supporting structures within the seat shown in phantom. The rotation of lead screw 588 rotates servo motor support 579, upon which servo-motor 578 is situated, which in turn rotates headrest support rods 582 and 583 in slots 584 and 585 in the seat 571. Rotation of the servo motor support 579 is facilitated by a rod 587 upon which the servo motor support 579 is positioned. In this manner, the headrest 572 is caused to move in the fore and aft direction as depicted by arrow B-B. There are other designs which accomplish the same effect in moving the headrest up and down and fore and aft.

The operation of the system is as follows. When an occupant is seated on a seat containing the headrest and control system described above, the ultrasonic transmitter 573 emits ultrasonic energy which reflects off of the head of the occupant and is received by receiver 574. An electronic circuit in control module 577 contains a microprocessor which determines the distance from the head of the occupant based on the time between the transmission and reception of an ultrasonic pulse. The headrest 572 moves up and down until it finds the top of the head and then the vertical position closest to the head of the occupant and then remains at that position. Based on the time delay between transmission and reception of an ultrasonic pulse, the system can also determine the longitudinal distance from the headrest to the occupant's head. Since the head may not be located precisely in line with the ultrasonic sensors, or the occupant may be wearing a hat, coat with a high collar, or may have a large hairdo, there may be some error in this longitudinal measurement.

When an occupant sits on seat 571, the headrest 572 moves to find the top of the occupant's head as discussed above. This is accomplished using an algorithm and a microprocessor which is part of control circuit 577. The headrest 572 then moves to the optimum location for rear impact protection as described in U.S. Pat. No. 5,694,320. Once the height of the occupant has been measured, another algorithm in the microprocessor in control circuit 577 compares the occupant's measured height with a table representing the population as a whole and from this table, the appropriate positions for the seat corresponding to the occupant's height is selected. For example, if the occupant measured 33 inches from the top of the seat bottom, this might correspond to a 85% human, depending on the particular seat and statistical tables of human measurements.

Careful study of each particular vehicle model provides the data for the table of the location of the seat to properly position the eyes of the occupant within the "eye-ellipse", the steering wheel within a comfortable reach of the occupant's hands and the pedals within a comfortable reach of the occupant's feet, based on his or her size, as well as a good view of the HUD.

Once the proper position has been determined by control circuit 577, signals are sent to motors 592, 593, and 594 to move the seat to that position. The seat 571 also contains two control switch assemblies 590 and 591 for manually controlling the position of the seat 571 and headrest 572. The seat control switches 590 permits the occupant to adjust the position of the seat if he or she is dissatisfied with the position selected by the algorithm.

U.S. Pat. No. 5,329,272 mentions that by the methods and apparatus thereof, the size of the driver's binocular or eye box is 13 cm horizontal by 7 cm vertical. However, the chances of the eyes of the driver being in such an area are small, therefore, for proper viewing, either the driver will need to be moved or the heads-up display adjusted.

As an alternative to adjusting the seat to properly position the eyes of the driver or passenger with respect to the heads-up display, the heads-up display itself can be adjusted as shown in FIG. 36. The heads-up display assembly 595 is adapted to rotate about its attachment to an upper surface of the instrument panel 596 through any of a variety of hinging or pivoting mechanisms. The bottom of the heads-up display assembly 595 is attached to an actuator 597 by means of activating rod 598 and an appropriate attachment fastener. Control module 486, in addition to controlling the content of the heads-up display, also contains circuitry which adjusts the angle of projection of the heads-up display assembly 595 based on the determined location of the occupant's eyes. Other means for enabling displacement of the heads-up display assembly 595 are also within the scope of the invention.

There are many cases in a vehicle where it is desirable to have a sensor capable of receiving an information signal from a particular signal source where the environment includes sources of interference signals at locations different from that of the signal source. The view through a HUD is one example and another is use of a microphone for hands-free telephoning or to issue commands to various vehicle systems.

If the exact characteristics of the interference are known, then a fixed-weight filter can be used to suppress it. Such characteristics are usually not known since they may vary according to changes in the interference sources, the background noise, acoustic environment, orientation of the microphone with respect to the driver's mouth, the transmission paths from the signal source to the microphone, and many other factors. Therefore, in order to suppress such interference, an adaptive system that can change its own parameters in response to a changing environment is needed. The concept of an adaptive filter is discussed in detail in U.S. Pat. No. 5,825,898.

The use of adaptive filters for reducing interference in a received signal, as taught in the prior art, is known as adaptive noise canceling. It is accomplished by sampling the noise independently of the source signal and modifying the sampled noise to approximate the noise component in the received signal using an adaptive filter. For an important discussion on adaptive noise canceling, see B. Widrow et al., Adaptive Noise Canceling: Principles and Applications, Proc. IEEE 63:1692-1716, 1975.

In a typical configuration, a primary input is received by a microphone directed to or oriented toward a desired signal source and a reference input is received independently by another microphone oriented in a different direction. The primary signal contains both a source component and a noise component.

The independent microphone, due to its angular orientation, is less sensitive to the source signal. The noise components in both microphones are correlated and of similar magnitude since both originate from the same noise source. Thus, a filter can be used to filter the reference input to generate a canceling signal approximating the noise component. The adaptive filter does this dynamically by generating an output signal that is the difference between the primary input and the canceling signal, and by adjusting its filter weights to minimize the mean-square value of the output signal. When the filter weights converge, the output signal effectively replicates the source signal substantially free of the noise component.

What is presented here, as part of this invention, is an alternative but similar approach to the adaptive filter that is particularly applicable to vehicles such as automobiles and trucks. The preferred approach taken here will be to locate the mouth of the driver and physically aim the directional microphone toward the driver's mouth. Alternately, a multi-microphone technique known in the literature as "beam-forming", which is related to phase array theory, can be used. Since the amount of motion required by the microphone is in general small, and for some vehicle applications it can be eliminated altogether, this is the preferred approach. The beam-forming microphone array can effectively be pointed in many directions without it being physically moved and thus it may have applicability for some implementations.

The sources of the background noise in an automobile environment are known and invariant over short time periods. For example wind blowing by the edge of the windshield at high speed is known to cause substantial noise within most vehicles. This noise is quite directional and varies significantly depending on vehicle speed. Therefore the noise cancellation systems of U.S. Pat. No. 5,673,325 cannot be used in its simplest form but the adaptive filter with varying coefficients that take into account the directivity of sound can be used, as described in U.S. Pat. No. 5,825,898. That is, a microphone placed on an angle may hear a substantially different background noise then the primary microphone because of the directionality of the sources of the noise. When the speaker is not speaking and the vehicle is traveling at a constant velocity, these coefficients perhaps can be determined. Therefore, one approach is to characterize the speech of the speaker so that it is known when he or she is speaking or not. Since most of the time he or she will not be speaking, most of the time, the correlation coefficients for an adaptive filter can be formed and the noise can be substantially eliminated.

If two or more microphones have different directional responses, then the direction of sound can be determined by comparing the signals from the different microphones. Therefore, it is theoretically possible to eliminate all sound except that from a particular direction. If six microphones are used on the six faces of a cube, it is theoretically possible to eliminate all sound except that which is coming from a particular direction. This can now be accomplished in a very small package using modern silicon microphones.

An alternate approach, and the preferred approach herein, is to use two microphones that are in line and separated by a known amount such as about 6 inches. This is similar to but simpler than the approach described in U.S. Pat. No. 5,715,319.

U.S. Pat. No. 5,715,319 describes a directional microphone array including a primary microphone and two or more secondary microphones arranged in line and spaced predetermined distances from the primary microphone. Two or more secondary microphones are each frequency filtered with the response of each secondary microphone limited to a predetermined band of frequencies. The frequency filtered secondary microphone outputs are combined and inputted into a second analog-to-digital converter. Further aspects of this invention involve the use of a ring of primary microphones which are used to steer the directionality of the microphones system toward a desired source of sound. This patent is primarily concerned with developing a steerable array of microphones that allow electronics to determine the direction of the preferred signal source and then to aim the microphones in that general direction. The microphone signals in this patent are linearly combined together with complex weights selected to maximize the signal to noise ratio.

In contrast to U.S. Pat. No. 5,715,319, the microphone of the present invention merely subtracts all signals received by both the first and the second microphones which are not at the precise calculated phase indicating that the sound is coming from a different direction, rather than a direction in line with the microphones. Although in both cases the microphones are placed on an axis, the method of processing the information is fundamentally different as described in more detail below.

If it is known that the microphone assembly is pointing at the desired source, then both microphones will receive the same signals with a slight delay. This delay will introduce a known phase shift at each frequency. All signals that do not have the expected phase shift can then be eliminated resulting in the cancellation of all sound that does not come from the direction of the speaker.

For the purposes of telephoning and voice recognition commands, the range of frequencies considered can be reduced to approximately 800 Hz to 2000 Hz. This further serves to eliminate much of the noise created by the sound of tires on the road and wind noise that occurs mainly at lower and higher frequencies. If further noise reduction is desired, a stochastic approach based on a sampling of the noise when the occupant is not talking can be effective.

By looking at the phases of each of the frequencies, the direction of the sound at that frequency can be determined. The signals can then be processed to eliminate all sound that is not at the exact proper phase relationship indicating that it comes from the desired particular direction. With such a microphone arrangement, it does not in general require more than two microphones to determine the radial direction of the sound source.

A directional microphone constructed in accordance with this invention is shown generally at 600 in FIG. 37. Two microphones 601 and 602 are displaced an appropriate distance apart which can vary from about 0.5 to about 9 inches depending on the application and the space available, with a preferred spacing of about 3 inches. The two microphones 601, 602 are surrounded by acoustic transparent foam 603 and the assembly is held by a holder 604. Wire 605 connects the microphones to the appropriate electronic circuitry (not shown).

Although several preferred embodiments are illustrated and described above, there are possible combinations using other geometries, sensors, materials and different dimensions for the components that perform the same functions. This invention is not limited to the above embodiments and should be determined by the following claims. For example, the weight measuring apparatus and methods described above could be used in conjunction with a seat position sensor to provide for an accurate determination of the identification and location of the occupying item of the seat. There are also numerous additional applications in addition to those described above. This invention is not limited to the above embodiments and should be determined by the following claims.

The invention claimed is:

1. A vehicle including a passenger compartment in which an occupant is situated when present in the vehicle, comprising:
   a display system that generates a display in a field of view of the occupant of the vehicle when facing outward of the vehicle;
   an occupant monitoring system that monitors an area of the passenger compartment in which the occupant may be situated, said occupant monitoring system detecting audible sounds generated by the occupant or gestures made by the occupant; and
   a control system coupled to said display system and said occupant monitoring system and controlling content of the display being generated by said display system based on the audible sounds and gestures detected by said occupant monitoring system.

2. The vehicle of claim 1, further comprising an in-vehicle signage system containing information about roads being traveled by the vehicle and signs along the roads, said control system being coupled to said in-vehicle signage system and controlling said display system to display information from said in-vehicle signage system, said control system converting detected audible sounds or gestures into requests by the occupant for information from said in-vehicle signage system to be displayed on said display of said display system.

3. The vehicle of claim 1, wherein said control system enables surfing on the Internet and display of television programs and converts detected audible sounds or gestures into requests by the occupant to effect the Internet surfing or control over one or more television programs being displayed on said display of said display system.

4. The vehicle of claim 1, further comprising a windshield having a plurality of layers of glass, said display system comprising organic light emitting diodes arranged between a pair of said layers of glass.

5. The vehicle of claim 1, wherein said occupant monitoring system comprises a voice-reception system that is arranged to detect vocal commands from the occupant.

6. The vehicle of claim 1, wherein said occupant monitoring system comprises a gesture-detection system that is arranged to detect gestures by the occupant.

7. The vehicle of claim 6, wherein said gesture-detection system comprises a camera having a field of view of hands or an upper body region of the occupant expected to exercise control of said display system and a processor that receives images from said camera, detects movement of a head, hand or arm of the occupant in one of predetermined number of areas and performs a function based on the detection of movement in the predetermined area.

8. The vehicle of claim 1, further comprising an in-vehicle signage system containing information about roads being traveled by the vehicle and signs along the roads, said control system being coupled to said in-vehicle signage system and controlling said display system to display information from said in-vehicle signage system.

9. The vehicle of claim 8, wherein said in-vehicle signage system contains a map database with road signs and enables said control system to control said display system to display current signs, previous signs and future signs upon request by the occupant, said in-vehicle signage system receiving transmissions from road signs along the road being traveled by the vehicle and converting the transmissions into information to be displayed by said display system.

10. The vehicle of claim 8, further comprising a location determining system arranged to determine the location of the vehicle, said in-vehicle signage system obtaining information from the Internet based on its determined location.

11. The vehicle of claim 8, wherein said in-vehicle signage system translates the signs into a different language or annunciates content of the signs upon request by the occupant.

12. The vehicle of claim 1, further comprising:
a route guidance system containing a map database; and
a location determining system for determining the location of the vehicle,
said control system being coupled to said route guidance system and said location determining system and controlling said display system to display a map of the area around the vehicle with an indication of the vehicle's location on the map.

13. The vehicle of claim 12, wherein said control system enables remote control thereof by a remote party upon request by the occupant such that assistance with vehicle navigation is available to the occupant by the remote party.

14. The vehicle of claim 12, wherein said control system controls said display system to display a view of the road ahead at a location at which it is an overlay onto a view of the same road seen by the occupant with an indication of a path to follow to guide the vehicle.

15. The vehicle of claim 1, wherein said control system provides an interrupt display function which causes an interruption of content currently being displayed on said display system.

16. The vehicle of claim 15, further comprising an e-mail message receiving unit that receives e-mail messages, said control system being arranged to initiate the interrupt display function when said e-mail message receiving unit receives an incoming e-mail message.

17. The vehicle of claim 1, wherein said control system enables surfing on the Internet and controls said display system to display web pages from the Internet arising from the surfing and display of television programs.

18. The vehicle of claim 1, wherein said display system is a heads-up display system that projects light through a lens system through a holographic combiner or screen.

19. A vehicle, comprising:
a display system that generates a display in a field of view of an occupant of the vehicle when facing outward of the vehicle;
a route guidance system containing a map database;
a location determining system that determines a location of the vehicle; and
a control system coupled to said display system and that detects gestures by the occupant and controls content of the display being generated by said display system based on the detected gestures,
said control system being coupled to said route guidance system and said location determining system and controlling said display system to display a map of the area around the vehicle using data from said map database of said route guidance system with an indication of the vehicle's location as determined by said location determining system on the map.

20. The vehicle of claim 19, wherein said control system enables remote control thereof by a remote party upon request by the occupant such that assistance with vehicle navigation is available to the occupant by the remote party.

21. The vehicle of claim 19, wherein said control system controls said heads-up display system to display a view of the road ahead at a location at which it is an overlay onto a view of the same road seen by the occupant with an indication of a path to follow to guide the vehicle.

22. A vehicle, comprising:
a display system that generates a display in a field of view of an occupant of the vehicle when facing outward of the vehicle; and
a control system coupled to said display system that detects gestures by the occupant and controls content of the display being generated by said display system based on the detected gestures,
said control system enabling surfing on the Internet and converting the gestures detected by said control system into requests by the occupant to effect the Internet surfing and thus variation of web pages displayed on said display of said display system.

* * * * *